United States Patent
Gotou et al.

(10) Patent No.: US 6,958,877 B2
(45) Date of Patent: Oct. 25, 2005

(54) BRUSHLESS MOTOR AND DISK DRIVE APPARATUS

(75) Inventors: Makoto Gotou, Nishinomiya (JP); Hisanori Nagase, Hirakata (JP); Masaki Tagome, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 336 days.

(21) Appl. No.: 10/329,849

(22) Filed: Dec. 26, 2002

(65) Prior Publication Data
US 2003/0123178 A1 Jul. 3, 2003

(30) Foreign Application Priority Data
Dec. 28, 2001 (JP) .............................. 2001-399931

(51) Int. Cl.[7] ........................................... G11B 15/46
(52) U.S. Cl. .................................................. 360/73.03
(58) Field of Search ....................... 360/73.03; 318/254; 363/41

(56) References Cited

U.S. PATENT DOCUMENTS

| | | | |
|---|---|---|---|
| 4,535,276 A * | 8/1985 | Yokobori ..................... | 318/254 |
| 5,473,232 A | 12/1995 | Tamaki et al. | |
| 5,661,382 A * | 8/1997 | Enami et al. ............... | 318/439 |
| 5,729,102 A | 3/1998 | Gotou et al. | |
| 5,798,623 A * | 8/1998 | El-Sadi ........................ | 318/254 |
| 5,959,418 A * | 9/1999 | Gotou ......................... | 318/254 |
| 5,982,118 A | 11/1999 | Gotou et al. | |
| 6,255,789 B1 * | 7/2001 | Ochi et al. ................... | 318/254 |

* cited by examiner

Primary Examiner—David Hudspeth
Assistant Examiner—K. Wong
(74) Attorney, Agent, or Firm—Akin Gump Strauss Hauer & Feld, LLP

(57) ABSTRACT

A brushless motor has first and second power transistors which form current paths to three-phase windings so as to rotate a rotor. A position detecting part produces a position signal in response to a rotation of the rotor. An activation operation block controls active operation of the first and second power transistors in response to the position signal. The activation operation block includes a starting operation part which comprises an initial phase setting part, phase changing part and a phase correcting part. The initial phase setting part sets an initial phase of drive signals to the three-phase windings in response to the level of the position signal at the timing of a start signal. The phase changing part changes sequentially the phase of the drive signals to the three-phase windings in the positive direction in response to time. The phase correcting part corrects the phase of the drive signals to the three-phase windings in response to the occurrence of the rising and falling edges of the position signal. Therefore, the brushless motor with reduced position sensor can stably start the rotation of the rotor by using one position signal of one position sensor.

40 Claims, 32 Drawing Sheets

BRUSHLESS MOTOR AND DISK DRIVE APPARATUS

FIELD OF THE INVENTION

The present invention relates to a brushless motor and a disk drive apparatus including the brushless motor.

BACKGROUND OF THE INVENTION

In recent years, a motor wherein current paths are electronically altered by plural transistors has been widely used as a drive motor in office automation equipment and audio-visual equipment. A disk drive apparatus, such as an optical disc drive apparatus (DVD, CD, and the like) and a magnetic disk drive apparatus (HDD, FDD, and the like), includes such a motor. As an example of such a conventional motor, a motor wherein current paths are altered by PNP-type and NPN-type bipolar power transistors is disclosed on lines 16 to 31 in the first column and FIG. 34 in the specification of the U.S. Pat. No. 5,982,118.

FIG. 35 shows a prior art motor, and the operation of the prior art motor is described below. A rotor 2011 has a field part formed by a permanent magnet. In a position detector 2041, three position sensors detect the magnetic field of the field part of the rotor 2011. In other words, the position detector 2041 produces two sets of three-phase voltage signals, that is, Kp1, Kp2 and Kp3, and Kp4, Kp5 and Kp6, in response to the three-phase output signals of the three position sensors in response to the rotation of the rotor 2011. A first distributor 2042 produces three-phase lower-side signals Mp1 Mp2 and Mp3 in response to the voltage signals Kp1, Kp2 and Kp3, thereby controlling the activation of lower-side NPN-type bipolar power transistors 2021, 2022 and 2023. A second distributor 2043 produces three-phase higher-side signals Mp4, Mp5 and Mp6 in response to the voltage signals Kp4, Kp5 and Kp6, thereby controlling the activation of the upper-side PNP-type bipolar power transistors 2025, 2026 and 2027. Accordingly, three-phase drive voltages are supplied to windings 2012, 2013 and 2014.

In the prior art configuration shown in FIG. 35, the position detector 2041 comprises three position sensors for detecting the rotational position of the rotor 2011. This has caused the necessity of a substantial space for installing these position sensors and the complexity of the wiring, resulting in an increase in cost. On the other hand, a motor with no position sensor is disclosed on line 54 of the second column to line 45 of the third column and FIG. 1 in the specification of the U.S. Pat. No. 5,473,232. In the motor, the back-electromotive forces of the windings are detected so as to obtain the rotational position of the rotor. In the motor with no position sensor, however, the rotational position cannot be detected correctly at a low rotational speed of the motor, since the magnitudes of the back-electromotive forces become too small to detect at a low rotational speed of the motor. So, it is difficult to drive and control the motor at a low speed. In particular, in the case when the rotational speed is controlled by using a pulse signal which responds with the detected back-electromotive forces, a large fluctuation occurs in the rotational speed of the motor at a low speed because of the inaccurate detection of the pulse signal.

A motor with a single position sensor is disclosed on line 30 of the fifth column to line 41 of the 12th column and FIG. 1 in the specification of the U.S. Pat. No. 5,729,102. In the motor, the rotational electrical angle is estimated from the output of the single position sensor, and sinusoidal currents are supplied to the windings in response to the estimated rotational electrical angle. However, in the case of the motor with the single position sensor, positional information in the stop state of the rotor is insufficient, thereby starting and acceleration of the motor with the single position sensor becomes unstable. Accordingly, the starting and acceleration of the rotor are not carried out smoothly, resulting in a starting failure. Furthermore, in the configuration of the motor according to the specification of the U.S. Pat. No. 5,729,102, it is difficult to estimate the rotational electrical angle with a fine step resolution. In particular, the error in the estimated electrical angle becomes larger at a higher rotational speed. Accordingly, precise rotation control of the motor has been difficult.

In an optical disc drive apparatus for reproducing signals from DVD-ROM, CD-ROM, and CD disks, stable operation is required over a wide range of rotational speed from 10,000 rpm for high-speed reproduction to 200 rpm for CD reproduction. In a rewritable disk drive apparatus for recording information on a high-density disk and/or reproducing information from a high-density disk such as DVD-RAM/RW and CD-R/RW, the disk is required to be rotated precisely. In these disc drive apparatuses, it is necessary to smoothly start and accelerate the disk and to carry out information reproduction in a short time. In addition to the optical disc drive apparatuses, magnetic disc drive apparatuses such as HDD and FDD are also required to be low cost and to carry out stable rotation of the disk during the whole operation which includes the operation of the starting and acceleration thereof.

BRIEF SUMMARY OF THE INVENTION

The object of the present invention is to provide a motor and a disk drive apparatus including the motor wherein the above-mentioned problems have been solved individually or concurrently.

A motor in accordance with one aspect of the present invention comprises:

a rotor having a field part which generates field fluxes;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means includes starting operation means which starts activation of said Q first power amplifying means and said Q second power amplifying means in response to a start signal, and said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal.

In this configuration, activation to the Q-phase windings can be accurately controlled in response to a substantially single position signal, whereby the rotor can be started stably. Accordingly, it is possible to realize a motor wherein current paths to the Q-phase windings are altered by using only the output signal of the single position sensor so that the rotor is stably rotated in a predetermined direction. As a result, it is possible to realize a motor capable of stably rotating the rotor, although its position detecting means is simplified. The level change of the position signal is classified as a positive level change and a negative level change. The positive level change means a change wherein the value of the position signal changes from a first predetermined value to a value more than the first predetermined value. The negative level change means a change wherein the value of the position signal changes from a second predetermined value to a value less than the second predetermined value. The first predetermined value and the second predetermined value can be identical.

A motor in accordance with another aspect of the present invention comprises:

a rotor having a field part which generates field fluxes;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means includes:

starting operation means for starting activation of said Q first power amplifying means and said Q second power amplifying means in response to a start signal; and rotation control means for controlling activation of said Q first power amplifying means and said Q second power amplifying means in response to said position signal after the operation of said starting operation means, said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal; and mode select means for selecting said rotation control means in response to occurrences of said position signal, and said rotation control means comprises:

time measuring means for measuring a time interval T0 which responds with an interval of said position signal; and phase adjusting means for changing the activation phase of the drive signals to said Q-phase windings in time in response to the measured value of said measuring means.

In this configuration, activation to the Q-phase windings can be accurately controlled in response to a substantially single position signal, whereby the rotor can be started stably. Accordingly, it is possible to realize a motor wherein current paths to the Q-phase windings are altered by using only the output signal of the single position sensor so that the rotor is stably rotated in a predetermined direction. Furthermore, starting operation is altered smoothly to steady rotation operation by the operation of the mode select means. Accordingly, quick smooth starting and acceleration can be carried out. Furthermore, since the activation phase of the drive signals supplied to the Q-phase windings is altered with respect to time in response to the time interval of the position signal, the activation phase is not shifted even when the rotor speed changes. This reduces the fluctuation of the generated drive force of the motor and also reduces the vibration and acoustic noise thereof. As a result, it is possible to realize a motor wherein its rotor is driven stably, thereby reducing vibration and acoustic noise, although its position detection means is simplified.

The mode select means can have a configuration which selects either activation by the phase changing means or activation by the rotation control means in response to the occurrences of level changes of the position signal. For example, the mode select means can have a configuration which counts the number of level changes of the position signal, and changes the mode of activation by the phase changing means to the mode of activation by the rotation control means when the counting result reaches a predetermined value or more. Alternatively, the mode select means can have a configuration which measures the time interval of level changes of the position signal, and changes the mode of activation by the phase changing means to the mode of activation by the rotation control means when the measurement result reaches the predetermined value or less. It is thus possible to realize stable change from the starting control operation to the rotation control operation.

The phase adjusting means can comprise signal producing means for controlling activation to at least one of Q first power amplifying means and Q second power amplifying means in response to at least one activation control signal. The signal producing means can comprise slope means for producing a slope signal changing repeatedly every time responding with the time interval T0 of the position signal and having substantially a slope and shaping means for changing the activation control signal in response to at least one of the rising and falling portions of the slope signal. This configuration can supply smooth drive current to the Q-phase windings and can reduce vibration and acoustic noise remarkably.

The phase adjusting means can comprise first timing adjust means for changing a first state signal every first adjust time T1 (T1<T0/2) which responds with the time interval T0 of the position signal, second timing adjust means for changing a second state signal every second adjust time T2 (T2<T1/2) which responds with the time interval T0, and the signal producing means for producing at least one activation control signal responding with the first state signal and the second state signal and for controlling activation to at least one of the Q first power amplifying means and the Q second power amplifying means in response to at least one activation control signal. Hence, activation phases can be altered in accurate timing synchronized with the position signal, and it is possible to attain stable secure rotational drive.

The signal producing means can be configured to produce a slope signal responding with the second state signal, to produce Q-phase first activation control signals responding with the first state signal and the slope signal, and to control the activation to the Q first power amplifying means in response to the Q-phase first activation control signals. Furthermore, the signal producing means can also be configured to produce Q-phase second activation control signals responding with the second state signal and the slope signal, and to control the activation to the Q second power amplifying means in response to the Q-phase second activation control signals. This configuration can supply smooth drive current to the windings, and can reduce vibration and acoustic noise remarkably.

Furthermore, the motor can comprise commanding means for producing a command signal responding with the rotational speed of the rotor and switching means for subjecting at least one of the Q first power amplifying means and the Q second power amplifying means to high-frequency switching operation in response to the command signal. This reduces the power losses of the power transistors and can realize a motor with low power consumption.

The switching means can comprise current detection means for producing a current detection signal responding with a composed supply current supplied from the voltage supplying means to the Q-phase windings, and switching control means for subjecting at least one power amplifying means to high-frequency switching operation in response to the command signal and the current detection signal. As a result, the drive current can be controlled accurately in response to the command signal, and the pulsation of the generated drive force can be reduced.

A disk drive apparatus in accordance with one aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving said disk;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means includes starting operation means which starts activation of said Q first power amplifying means and said Q second power amplifying means in response to a start signal, and said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal.

In this configuration, activation to the Q-phase windings can be accurately controlled in response to a substantially single position signal, whereby the disk can be started stably. Accordingly, it is possible to realize a disk drive apparatus wherein current paths to the Q-phase windings are altered by using only the output signal of the single position sensor so that the disk is stably rotated in a predetermined direction. As a result, it is possible to realize a disk drive apparatus capable of stably rotating the disk, although its position detecting means is simplified.

A disk drive apparatus in accordance with another aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving said disk;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means includes:

starting operation means for starting activation of said Q first power amplifying means and said Q second power amplifying means in response to a start signal; and rotation control means for controlling activation of said Q first power amplifying means and said Q second power amplifying means in response to said position signal after the operation of said starting operation means, said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal; and mode select means for selecting said rotation control means in response to occurrences of said position signal, and said rotation control means comprises:

time measuring means for measuring a time interval T0 which responds with an interval of said position signal; and phase adjusting means for changing the activation phase of the drive signals to said Q-phase windings in time in response to the measured value of said measuring means.

In this configuration, activation to the Q-phase windings can be accurately controlled in response to a substantially single position signal, whereby the disk can be started stably. Accordingly, it is possible to realize a disk drive apparatus wherein current paths to the Q-phase windings are altered by using only the output signal of the single position sensor so that the disk is stably rotated in a predetermined direction. Furthermore, starting operation is altered smoothly to steady rotation operation by the operation of the mode select means. Accordingly, quick smooth starting and acceleration can be carried out. Furthermore, since the activation phase of the drive signals supplied to the Q-phase windings is altered with respect to time in response to the time interval of the position signal, the activation phase is not shifted even when the disk speed changes. This reduces the fluctuation of the generated drive force of the disk drive apparatus and also reduces the vibration and acoustic noise thereof. As a result, it is possible to realize a disk drive apparatus wherein its rotor is driven stably, thereby reducing vibration and acoustic noise, although its position detection means is simplified.

The mode select means can have a configuration which selects either activation by the phase changing means or activation by the rotation control means in response to the occurrences of level changes of the position signal. For example, the mode select means can have a configuration which counts the number of level changes of the position signal, and changes the mode of activation by the phase changing means to the mode of activation by the rotation control means when the counting result reaches a predetermined value or more. Alternatively, the mode select means can have a configuration which measures the time interval of level changes of the position signal, and changes the mode of activation by the phase changing means to the mode of activation by the rotation control means when the measurement result reaches the predetermined value or less. It is thus possible to realize stable change from the starting control operation to the rotation control operation of the disk.

The phase adjusting means can comprise signal producing means for controlling activation to at least one of Q first power amplifying means and Q second power amplifying means in response to at least one activation control signal. The signal producing means can comprise slope means for producing a slope signal changing repeatedly every time responding with the time interval T0 of the position signal and having substantially a slope and shaping means for changing the activation control signal in response to at least one of the rising and falling portions of the slope signal. This configuration can supply smooth drive current to the Q-phase windings and can reduce vibration and acoustic noise remarkably.

The phase adjusting means can comprise first timing adjust means for changing a first state signal every first adjust time T1 (T1<T0/2) which responds with the time interval T0 of the position signal, second timing adjust means for changing a second state signal every second adjust time T2 (T2<T1/2) which responds with the time interval T0, and the signal producing means for producing at least one rotation activation control signal responding with the first state signal and the second state signal and for controlling the period of activation to at least one of the Q first power amplifying means and the Q second power amplifying means in response to at least one activation control signal. Hence, activation phases can be altered in accurate timing synchronized with the position signal, and it is possible to attain stable secure rotational drive.

The signal producing means can be configured to produce a slope signal responding with the second state signal, to produce Q-phase first activation control signals responding with the first state signal and the slope signal, and to control the activation to the Q first power amplifying means in response to the Q-phase first activation control signals. Furthermore, the signal producing means can also be configured to produce Q-phase second activation control signals responding with the second state signal and the slope signal, and to control the activation to the Q second power amplifying means in response to the Q-phase second activation control signals. This configuration can supply smooth drive current to the windings, and can reduce the vibration and acoustic noise of the disk remarkably.

Furthermore, the disk drive apparatus can comprise commanding means for producing a command signal responding with the rotational speed of the rotor and switching means for subjecting at least one of the Q first power amplifying means and the Q second power amplifying means to high-frequency switching operation in response to the command signal. This reduces the power losses of the power transistors and can realize a disk drive apparatus with low power consumption.

The switching means can comprise current detection means for producing a current detection signal responding with a composed supply current supplied from the voltage supplying means to the Q-phase windings, and switching control means for subjecting at least one power amplifying means to high-frequency switching operation in response to the command signal and the current detection signal. As a result, the drive current can be controlled accurately in response to the command signal, and the pulsation of the generated drive force can be reduced.

These and other configurations and operations will be described in detailed in the explanations of embodiments.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representation for purposes of illustration and do not necessarily depict the actual relative sizes or locations of the elements shown.

DETAILED DESCRIPTION OF THE INVENTION

Preferred embodiments of the present invention are described below with reference to the accompanying drawings.

<<Embodiment 1>>

Figure 1:
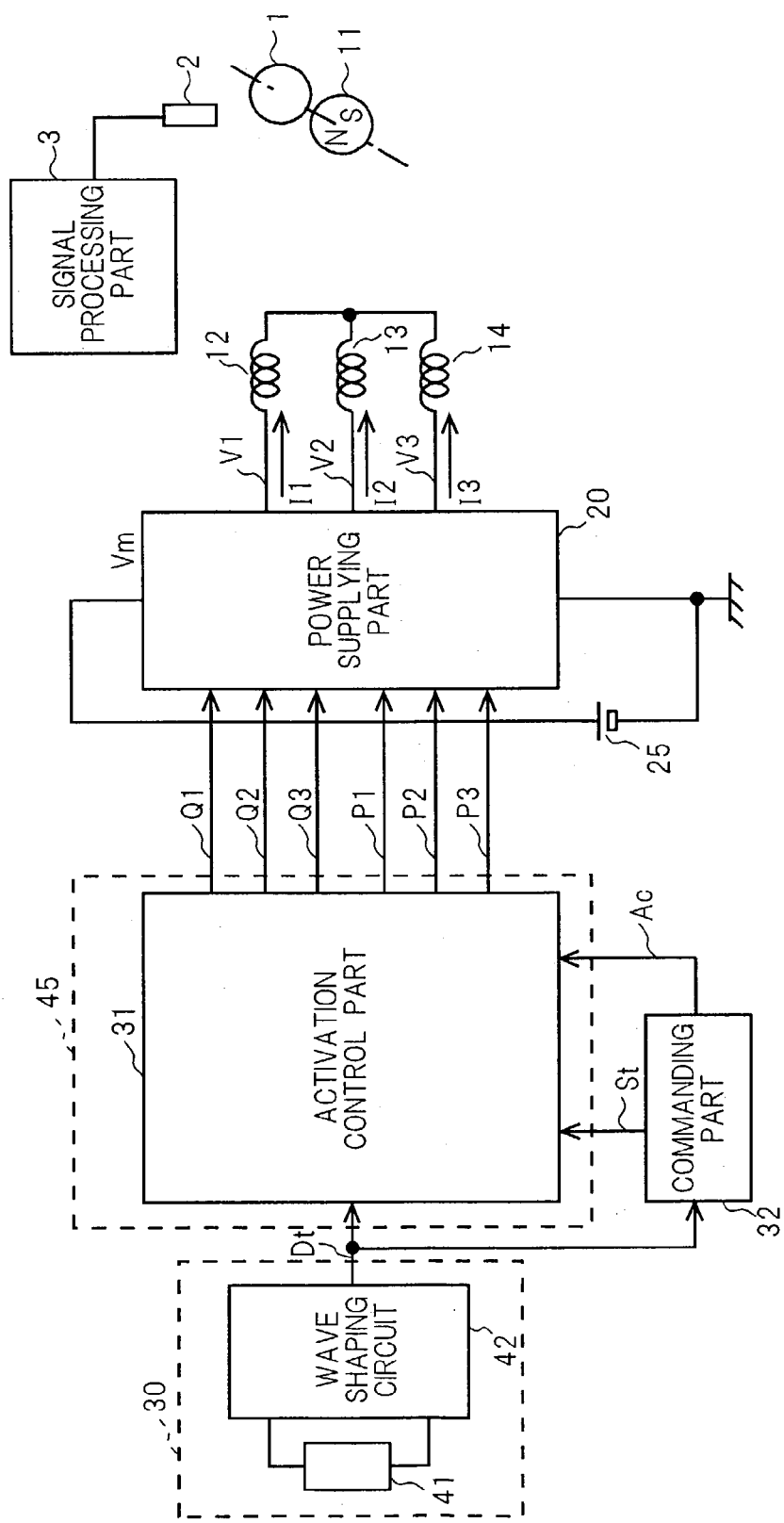
FIG. 1 is a block diagram showing the overall configuration in accordance with Embodiment 1 of the present invention.

FIGS. 1 to 16 show a motor and a disk drive apparatus including the motor in accordance with Embodiment 1 of the present invention. FIG. 1 is a block diagram showing the overall configuration of the motor in accordance with Embodiment 1. A rotor 11 is provided with a field part which produces a multipole magnetic field by using the magnetic fluxes of a magnet. In this embodiment, the field part has the magnetic fluxes of a two-pole permanent magnet. The field part, however, can generally have multi-poles, such as two, four and six poles. Three-phase windings 12, 13 and 14 are disposed on a stator at a displacement interval of 120 electrical degrees with respect to the field part of the rotor 11. The electrical angle of 360 degrees herein corresponds to the angle formed by one set of the N and S poles of the field part of the rotor 11. The windings 12, 13 and 14 are connected in common at one ends. The other ends thereof are connected respectively to the output terminals of a power supplying part 20, which are used as power supply terminals. The three-phase windings 12, 13 and 14 generate three-phase magnetic fluxes by using three-phase drive current signals I1, I2 and I3. A drive force is generated by the interaction with the field part of the rotor 11, and this drive force is applied to the rotor 11. A disk 1 is integrally fixed to the rotor 11 and is directly driven by the rotor 11.

In the case of reproducing a digital information signal (such as a high-quality audio-visual signal) recorded on the disk 1, the signal on the disk 1 is reproduced by a head 2 formed of an optical head or a magnetic head. A signal processing part 3 processes the output signal of the head 2 and outputs a reproduced information signal (such as a high-quality audio-visual signal).

In addition, in the case of recording a digital information signal (such as a high-quality audio-visual signal) on the disk 1, the signal is recorded on the disk 1 by the head 2 formed of an optical head or a magnetic head. The signal processing part 3 processes the recorded information signal input thereto and supplies a recording signal to the head 2, whereby the signal is recorded on the disk 1 by the head 2.

Figure 11A:
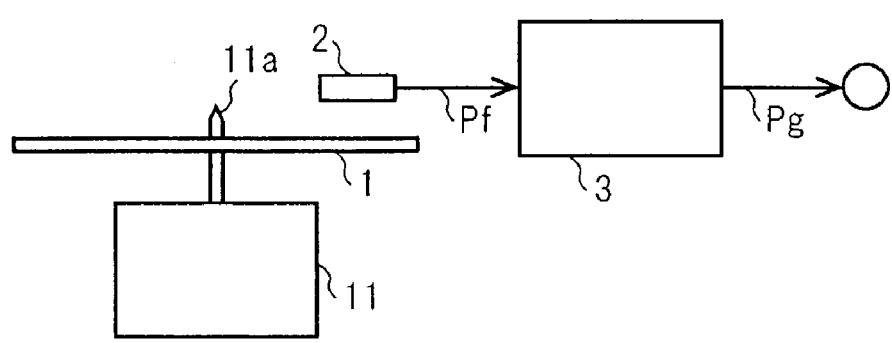
FIG. 11A is a block diagram showing signal reproduction on a disk drive apparatus in accordance with Embodiment 1.

FIG. 11A shows an example of a disk drive apparatus which reproduces a signal on a disk. The disk 1 is directly driven with the rotor 11. An information signal has been recorded on the disk 1 at high density. The head 2 reproduces the information signal on the disk 1 and outputs a reproduced signal Pf. The signal processing part 3 digitally processes the reproduced signal Pf from the head 2 and outputs a reproduced information signal Pg. In the figure, the stator and the windings are not shown.

Figure 11B:
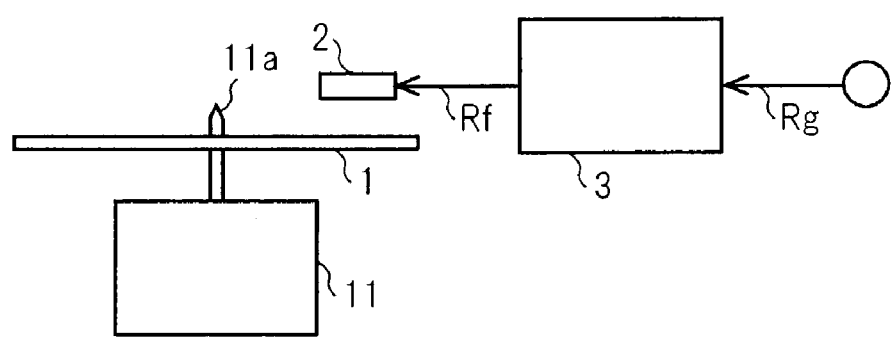
FIG. 11B is a block diagram showing signal recording on a disk drive apparatus in accordance with Embodiment 1.

FIG. 11B shows an example of a disk drive apparatus which records a signal on a disk. The disk 1 is directly driven with the rotor 11. The disk 1 can record a digital information signal at high density. The signal processing part 3 digitally processes an information signal Rg and outputs a recording signal Rf to the head part 2. The head part 2 records the recording signal Rf on the disk 1 at high density and forms a new information signal on the disk 1.

A reproducing-only head, a recording-reproducing head or a recording-only head is used as the above-mentioned head part 2 depending on the situation.

Figure 8:
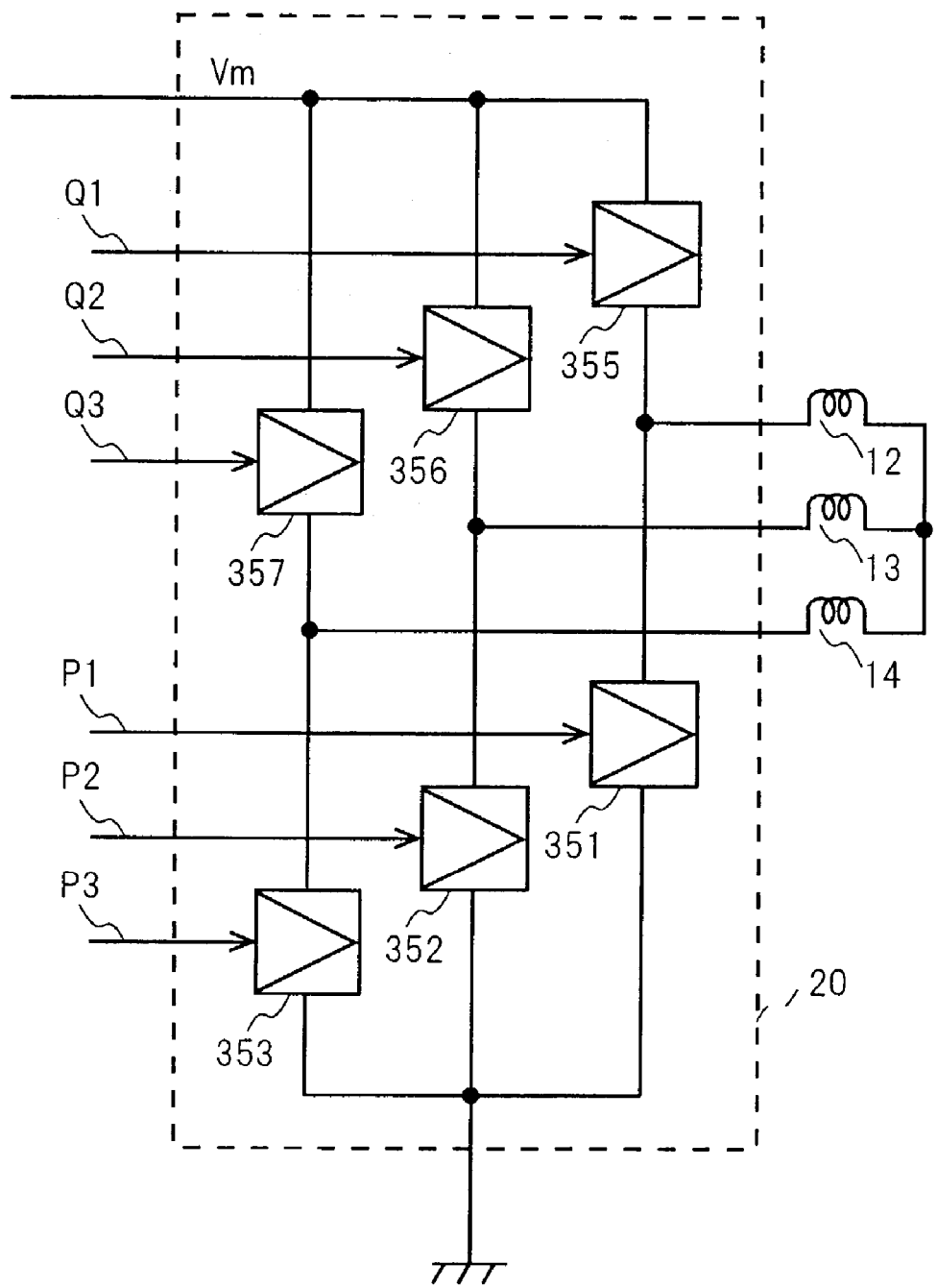
FIG. 8 is a view showing the configuration of a power supplying part 20 in accordance with Embodiment 1.

The power supplying part 20 shown in FIG. 1 alters current paths to the three-phase windings 12, 13 and 14 in response to the three-phase first activation control signals P1, P2 and P3 and the three-phase second activation control signals Q1, Q2 and Q3 of the activation control part 31 of the activation operation block 45. FIG. 8 is a circuit diagram showing the detailed configuration of the power supplying part 20. The power supplying part 20 comprises three first power amplifying parts 351, 352 and 353 and three second power amplifying parts 355, 356 and 357 as shown in FIG. 8.

Figure 9:
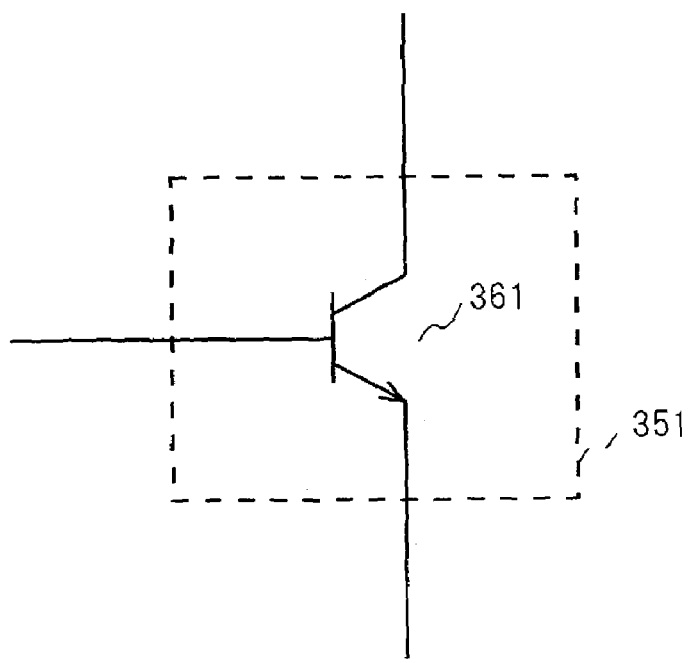
FIG. 9 is a circuit diagram showing a first power amplifying part 351 in accordance with Embodiment 1.

The first power amplifying part 351 comprises a first power transistor for forming a current path from the negative output terminal side of the voltage supplying part 25 to the power supply terminal side of the winding 12. The first power amplifying part 351 amplifies the first activation control signal P1 and outputs the amplified signal thereof. Similarly, the first power amplifying part 352 comprises a first power transistor for forming a current path from the negative output terminal side of the voltage supplying part 25 to the power supply terminal side of the winding 13. The first power amplifying part 352 amplifies the first activation control signal P2 and outputs the amplified signal thereof. Similarly, the first power amplifying part 353 comprises a first power transistor for forming a current path from the negative output terminal side of the voltage supplying part 25 to the power supply terminal side of the winding 14. The first power amplifying part 353 amplifies the first activation control signal P3 and outputs the amplified signal thereof. As an example, FIG. 9 shows the detailed configuration of the first power amplifying part 351. This first power amplifying part 351 comprises an NPN-type bipolar first power transistor 361, amplifies the current input to the base and outputs an amplified signal.

Figure 10:
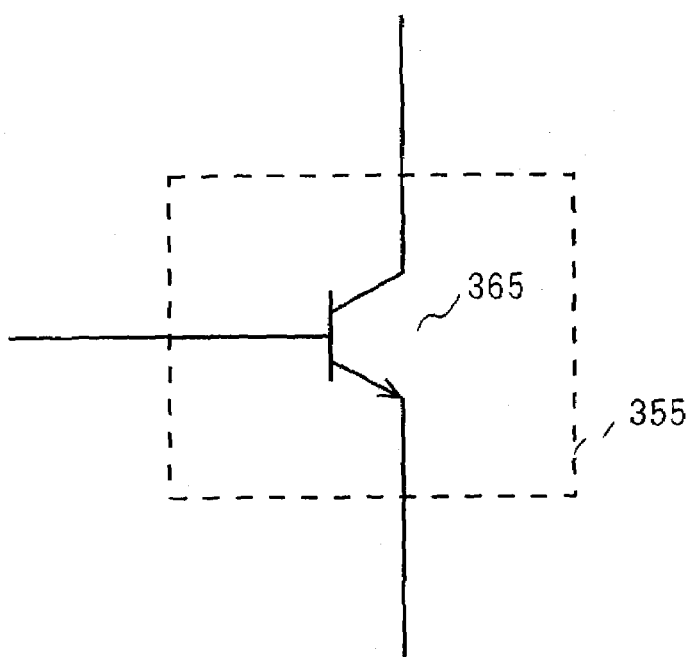
FIG. 10 is a circuit diagram showing a second power amplifying part 355 in accordance with Embodiment 1.

The second power amplifying part 355 comprises a second power transistor for forming a current path from the positive output terminal side of the voltage supplying part 25 to the power supply terminal side of the winding 12. The second power amplifying part 355 amplifies the second activation control signal Q1 and outputs the amplified signal thereof. Similarly, the second power amplifying part 356 comprises a second power transistor for forming a current path from the positive output terminal side of the voltage supplying part 25 to the power supply terminal side of the winding 13. The second power amplifying part 356 amplifies the second activation control signal Q2 and outputs the amplified signal thereof. Similarly, the second power amplifying part 357 comprises a second power transistor for forming a current path from the positive output terminal side of the voltage supplying part 25 to the power supply terminal side of the winding 14. The second power amplifying part 357 amplifies the second activation control signal Q3 and outputs the amplified signal thereof. As an example, FIG. 10 shows the detailed configuration of the second power amplifying part 355. This second power amplifying part 355 comprises an NPN-type bipolar second power transistor 365, amplifies the current input to the base and outputs an amplified signal.

A position detecting part 30 shown in FIG. 1 comprises a position sensor 41 and a wave shaping circuit 42. The position sensor 41 is a Hall device serving as a magneto-electric conversion device, for example. The position sensor 41 detects the magnetic flux of the field part of the rotor 11 and outputs a position detected signal (a position signal) in an analog manner in response to the rotational position of the rotor 11. The wave shaping circuit 42 shapes the waveform of the position detected signal of the position sensor 41 and outputs a position pulse signal Dt (a position signal). In this embodiment, each of the position detected signal of the position sensor 41 and the position pulse signal Dt of the shaping circuit 42 is a position signal which represents the rotational position of the rotor 11. The positive level change (rising edge) of the position pulse signal Dt from "L" (a low potential state) to "H" (a high potential state) occurs when the value of the position detected signal becomes larger from a first predetermined value or less to the first predetermined value or more. The negative level change (falling edge) of the position pulse signal Dt from "H" to "L" occurs when the value of the position detected signal becomes smaller from a second predetermined value or more to the second predetermined value or less.

A commanding part 32 shown in FIG. 1 detects the rotational speed of the disk 1 and the rotor 11 from the position pulse signal Dt of the position detecting part 30. The commanding part 32 then produces a command signal Ac in response to the difference between the rotational speed and the aimed speed of the disk 1. In this embodiment, the command signal Ac of the commanding part 32 is a voltage signal responding with the position pulse signal Dt. Furthermore, the commanding part 32 outputs a start signal St for commanding the execution of activation to the three-phase windings. When the start signal St is "L," the activation to the three-phase windings is stopped. When the start signal St becomes "H," the activation to the three-phase windings 12, 13 and 14 is carried out by the three first power amplifying parts 351, 352 and 353 and the three second power amplifying parts 355, 356 and 357, thereby starting and rotating the disk 1 and the rotor 11.

Figure 2:
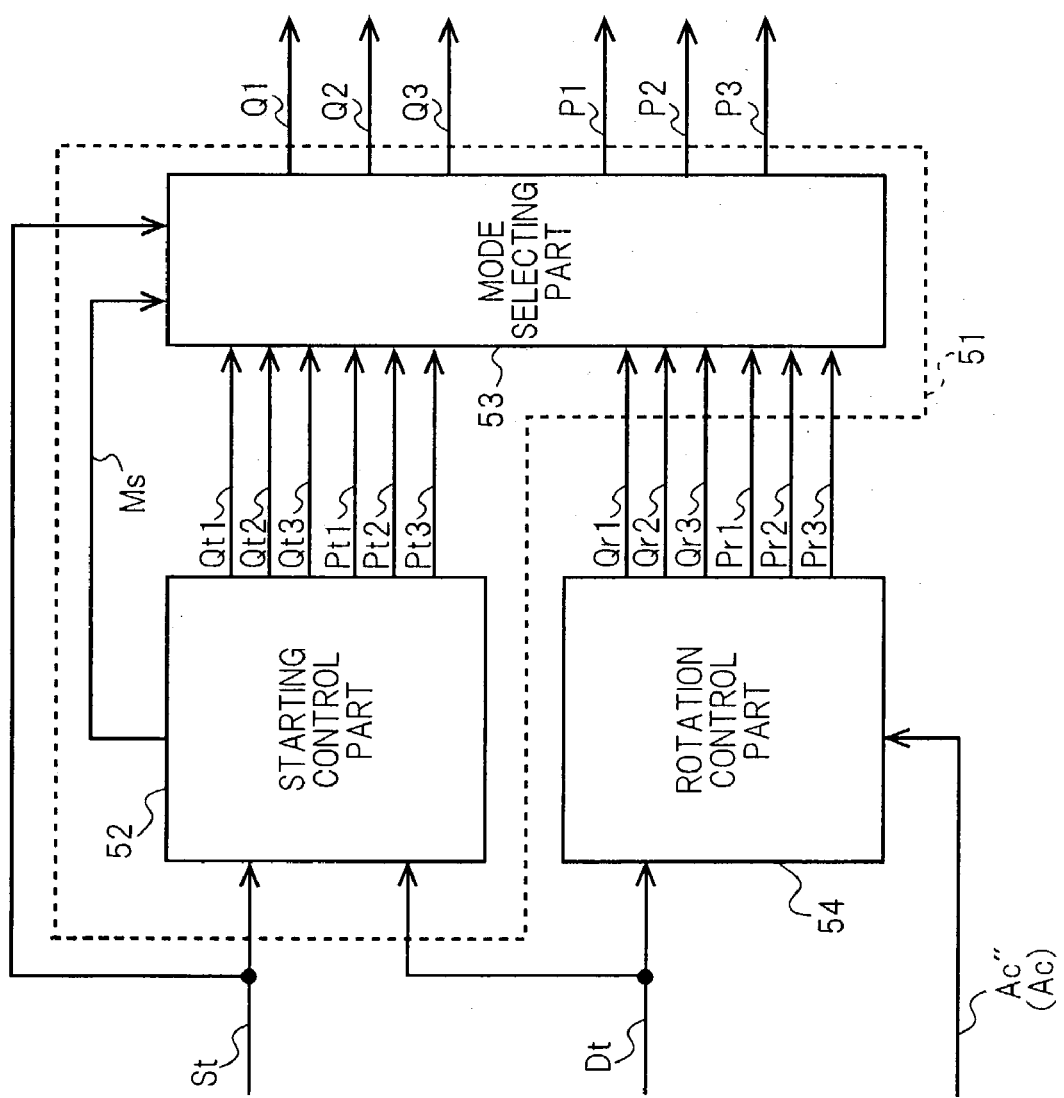
FIG. 2 is a view showing a configuration of an activation control part 31 in accordance with Embodiment 1.

An activation operation block 45 shown in FIG. 1 comprises an activation control part 31. The activation control part 31 outputs three-phase first activation control signals P1, P2 and P3 and three-phase second activation control signals Q1, Q2 and Q3 in response to the position pulse signal Dt of the position detecting part 30. FIG. 2 is a block diagram showing the detailed configuration of the activation control part 31.

As shown in FIG. 2, the activation control part 31 comprises a starting control part 52, a rotation control part 54 and a mode selecting part 53. The starting control part 52 and the mode selecting part 53 constitute a starting operation part 51. The starting control part 52 receives the position pulse signal Dt and the start signal St and outputs three-phase first starting activation control signals Pt1, Pt2 and Pt3 and three-phase second starting activation control signals Qt1, Qt2 and Qt3. The rotation control part 54 receives the position pulse signal Dt and an input signal Ac" and outputs three-phase first rotation activation control signals Pr1, Pr2 and Pr3 and three-phase second rotation activation control signals Qr1, Qr2 and Qr3. The input signal Ac" is the command signal Ac in this embodiment.

Figure 3:
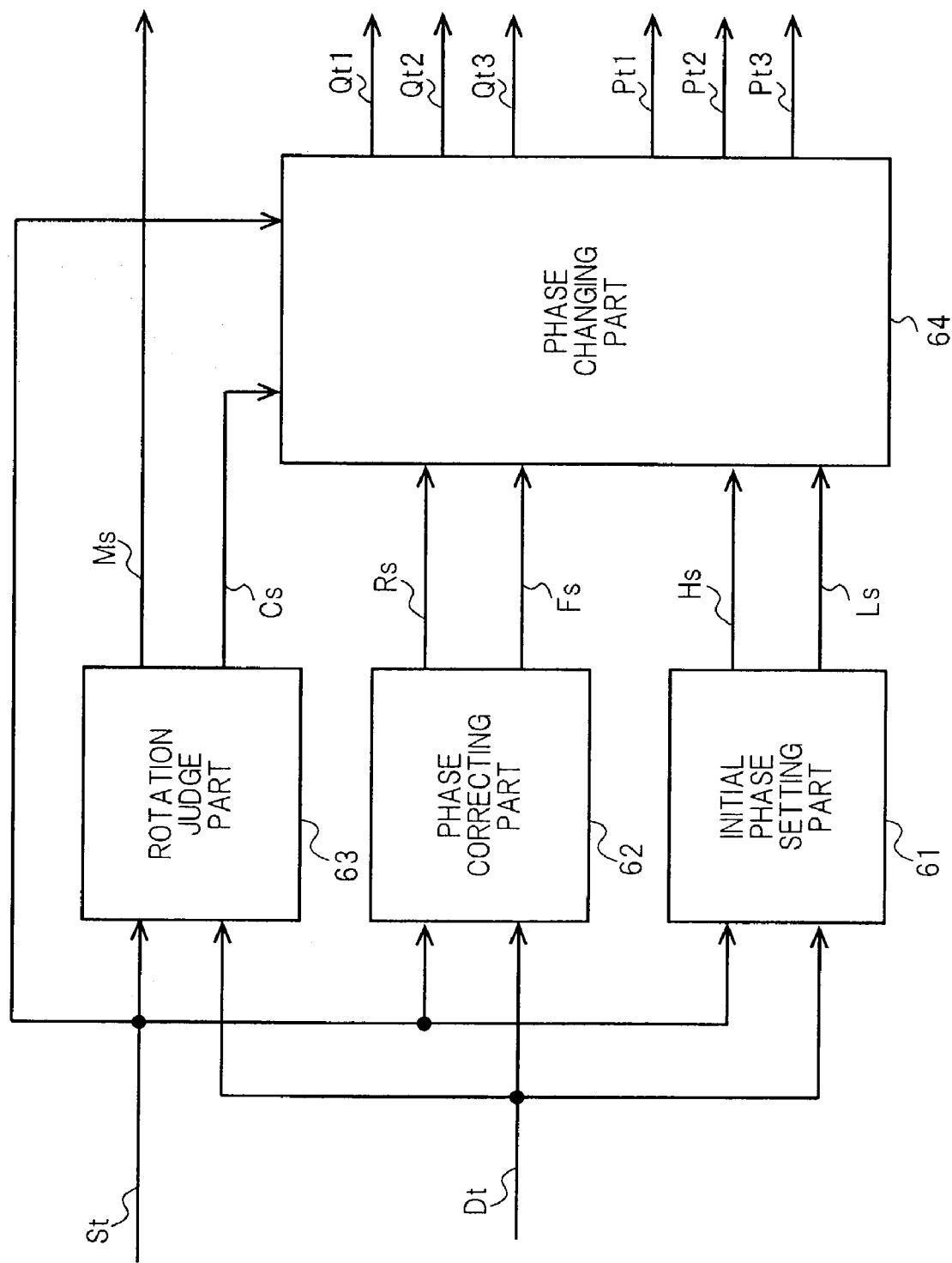
FIG. 3 is a view showing the configuration of the starting control part 52 of the activation control part 31 in accordance with Embodiment 1.
Figure 4:
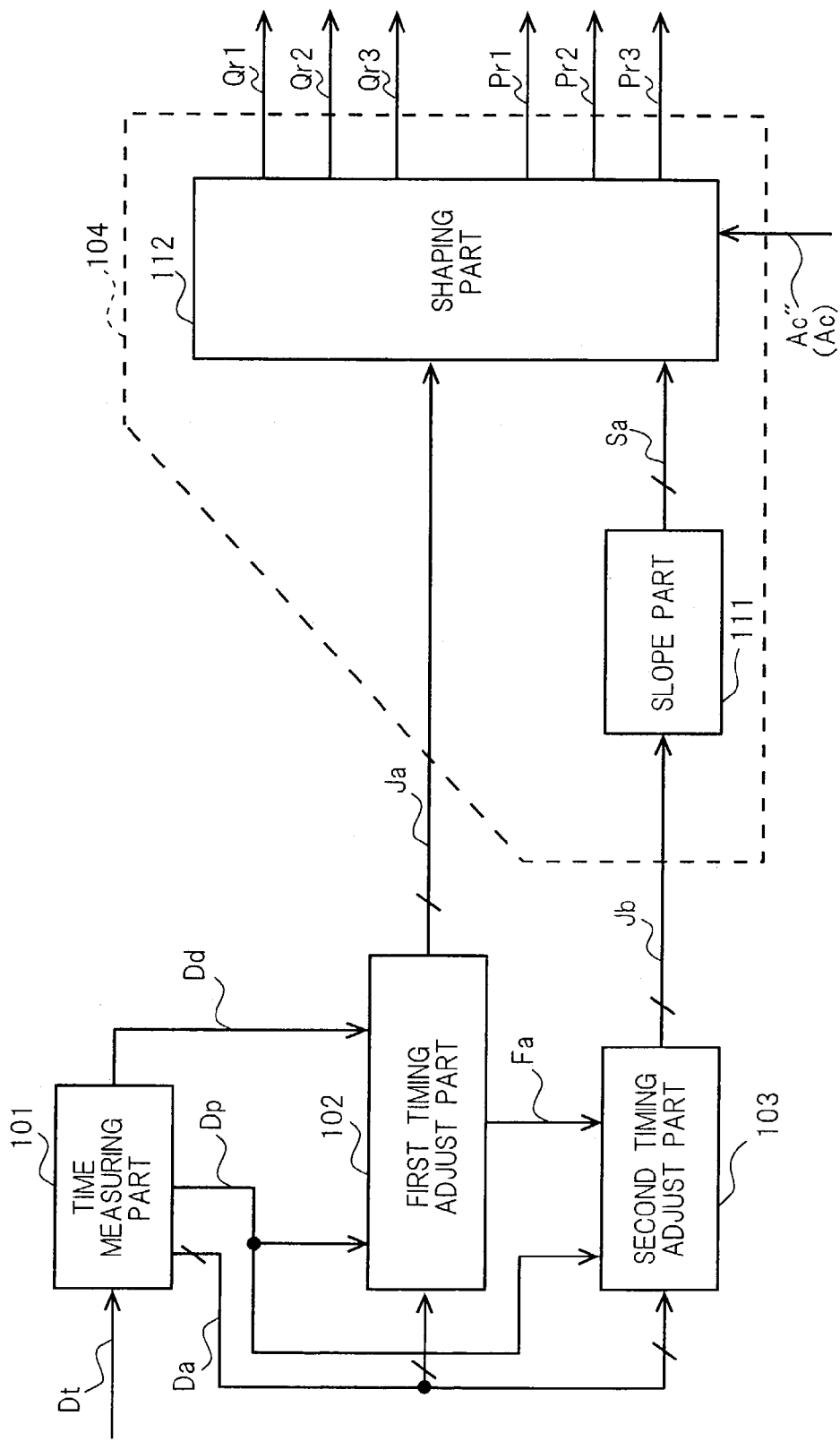
FIG. 4 is a view showing the configuration of the rotation control part 54 of the activation control part 31 in accordance with Embodiment 1.

The mode selecting part 53 receives the start signal St and the mode select signal Ms of the starting control part 52. When the start signal St is "L" (activation stop), the mode selecting part 53 sets all of the three-phase first activation control signals P1, P2 and P3 and the three-phase second activation control signals Q1, Q2 and Q3 to "L," thereby stopping the activation to the three-phase windings. In other words, when the start signal St= "L" (activation stop), the activation control part 31 carries out setting as follows: P1="L," P2="L," P3= "L," Q1="L," Q2="L" and Q1="L." When the start signal St="H" (activation start), the mode selecting part 53 selects its output signals in response to the mode select signal Ms of the starting control part 52. When the mode select signal Ms is "L" (starting mode), the activation control part 31 outputs the first starting activation control signals Pt1, Pt2 and Pt3 of the starting control part 52 as the first activation control signals P1, P2 and P3. In addition, the activation control part 31 also outputs the second starting activation control signals Qt1, Qt2 and Qt3 of the starting control part 52 as the second activation control signals Q1, Q2 and Q3. In other words, when the mode select signal Ms="L" (starting mode), the activation control part 31 carries out setting as follows: P1=Pt1, P2=Pt2, P3= Pt3, Q1=Qt1, Q2=Qt2 and Q3=Qt3. When the mode select signal Ms is "H" (a rotation mode), the activation control part 31 outputs the first rotation activation control signals Pr1, Pr2 and Pr3 of the rotation control part 54 as the first activation control signals P1, P2 and P3. In addition, the activation control part 31 also outputs the second rotation activation control signals Qr1, Qr2 and Qr3 of the rotation control part 54 as the second activation control signals Q1, Q2 and Q3. In other words, when the mode select signal Ms="H" (rotation mode), the activation control part 31 carries out setting as follows: P1=Pr1, P2=Pr2, P3=Pr3, Q1= Qr1, Q2=Qr2 and Q3=Qr3. FIG. 3 is a block diagram showing the detailed configuration of the starting control part 52. FIG. 4 is a block diagram showing the detailed configuration of the rotation control part 54.

As shown in FIG. 3, the starting control part 52 comprises an initial phase setting part 61, a phase correcting part 62, a rotation judge part 63 and a phase changing part 64. The initial phase setting part 61 receives the position pulse signal Dt and the start signal St. The initial phase setting part 61 then produces a pulse of a first initial set signal Hs or a pulse of a second initial set signal Ls in response to the level of the position pulse signal Dt in the vicinity of the change of the start signal St. In other words, when the position pulse signal Dt is "H," the initial phase setting part 61 produces a pulse of the first initial set signal Hs in response to the change of the start signal St. When the position pulse signal Dt is "L," the initial phase setting part 61 produces a pulse of the second initial set signal Ls in response to the change of the start signal St.

The phase changing part 64 comprises a counter circuit, for example. The phase changing part 64 outputs the three-phase first starting activation control signals Pt1, Pt2 and Pt3 and the three-phase second starting activation control signals Qt1, Qt2 and Qt3 in response to the internal state of the counter circuit. When the start signal St="L" (activation stop), the phase changing part 64 resets the internal state of the counter circuit. In other words, the phase changing part 64 sets all of the three-phase first starting activation control signals Pt1, Pt2 and Pt3 and the three-phase second starting activation control signals Qt1, Qt2 and Qt3 to "L." When the start signal St="H" (activation start), the phase changing part 64 carries out necessary operation described below.

When a pulse of the first initial set signal Hs of the initial phase setting part 61 is input, the phase changing part 64 sets the internal state of the counter circuit to a first necessary state. The phase changing part 64 also sets the first starting activation control signals Pt1, Pt2 and Pt3 and the second starting activation control signals Qt1, Qt2 and Qt3 to first setting states. When a pulse of the second initial set signal Ls of the initial phase setting part 61 is input, the phase changing part 64 sets the internal state of the counter circuit to a second necessary state. The phase changing part 64 also sets the first starting activation control signals Pt1, Pt2 and Pt3 and the second starting activation control signals Qt1, Qt2 and Qt3 to second setting states. The phase changing part 64 sequentially changes the internal state of the counter circuit by using the change pulse signal Cs of the rotation judge part 63 as a clock signal. The phase changing part 64 thus sequentially changes the first starting activation control signals Pt1, Pt2 and Pt3 and the second starting activation control signals Qt1, Qt2 and Qt3 with respect to time in the forward rotation direction.

The phase correcting part 62 receives the position pulse signal Dt and the start signal St. After the start signal St becomes "H," the phase correcting part 62 detects both the level changes (the level changes from "L" to "H" and from "H" to "L") or one of the level changes of the position pulse signal Dt. The phase correcting part 62 outputs a pulse of a first correct signal Rs in response to the level change (rising edge) from "L" to "H" of the position pulse signal Dt. The phase correcting part 62 outputs a pulse of a second correct signal Fs in response to the level change (falling edge) from "H" to "L" of the position pulse signal Dt.

When a pulse of the first correct signal Rs of the phase correcting part 62 is input to the phase changing part 64, the phase changing part 64 corrects the internal state of the counter circuit to obtain a third necessary state. The phase changing part 64 then sets the first starting activation control signals Pt1, Pt2 and Pt3 and the second starting activation control signals Qt1, Qt2 and Qt3 to third setting states. When a pulse of the second correct signal Fs of the phase correcting part 62 is input to the phase changing part 64, the phase changing part 64 corrects the internal state of the counter circuit to obtain a fourth necessary state. The phase changing part 64 then sets the first starting activation control signals Pt1, Pt2 and Pt3 and the second starting activation control signals Qt1, Qt2 and Qt3 to fourth setting states. In this embodiment, the third setting states coincide with the first setting states, and the fourth setting states coincide with the second setting states. The phase changing part 64 sequentially changes the internal state of the counter circuit by using the change pulse signal Cs of the rotation judge part 63 as a clock signal. The phase changing part 64 thus sequentially changes the first starting activation control signals Pt1, Pt2 and Pt3 and the second starting activation control signals Qt1, Qt2 and Qt3 with respect to time in the forward rotation direction.

The rotation judge part 63 receives the position pulse signal Dt and the start signal St. The rotation judge part 63 outputs the mode select signal Ms and the change pulse signal Cs in response to the occurrence states of both the level changes (the level changes from "L" to "H" and from "H" to "L") or one of the level changes of the position pulse signal Dt. The rotation judge part 63 is configured on the basis of two kinds of methods. In one (a first selection method) of the methods, the mode select signal Ms is changed in response to the number of occurrence times of the level change of the position pulse signal Dt. In the other method (a second selection method), the mode select signal Ms is changed in response to the time interval of the level changes of the position pulse signal Dt.

The first selection method is described below. After the start signal St becomes "H," the rotation judge part 63 counts the number of occurrence times of both (or one) of the level changes of the position pulse signal Dt. The rotation judge part 63 generates a pulse of the change pulse signal Cs at every predetermined time from the level change timing of the position pulse signal Dt. The rotation judge part 63 then changes the interval of the pulses of the change pulse signal Cs in response to the counting result of both (or one) of the level changes of the position pulse signal Dt. In the case when the counting result is less than a first predetermined number of times, the rotation judge part 63 increases the interval of the pulses of the change pulse signal Cs (to a pulse interval Ts1). In the case when the counting result is not less than the first predetermined number of times, the rotation judge part 63 decreases the interval of the pulses of the change pulse signal Cs (to a pulse interval Ts2). In other words, Ts1>Ts2. In addition, in the case when the counting result is the second predetermined number of times or more, the rotation judge part 63 changes the state of the mode select signal Ms from "L" (starting mode) to "H" (rotation mode). The interval of the pulses of the change pulse signal Cs may be constant (Ts1=Ts2).

The second selection method is described below. After the start signal St becomes "H," the rotation judge part 63 measures the time interval of both (or one) of the level changes of the position pulse signal Dt. The rotation judge part 63 generates a pulse of the change pulse signal Cs at every predetermined time from the level change timing of the position pulse signal Dt. The rotation judge part 63 then changes the interval of the pulses of the change pulse signal Cs in response to the time interval of both (or one) of the level changes of the position pulse signal Dt. In the case when the time interval is not less than a first predetermined value, the rotation judge part 63 increases the interval of the pulses of the change pulse signal Cs (to the pulse interval Ts1). In the case when the counting result is less than the first predetermined value, the rotation judge part 63 decreases the interval of the pulses of the change pulse signal Cs (to the pulse interval Ts2). In other words, Ts1>Ts2. In addition, in the case when the time interval of both (or one) of the level changes of the position pulse signal Dt is not, more than the second predetermined value, the rotation judge part 63 changes the state of the mode select signal Ms from "L" (starting mode) to "H" (rotation mode). The interval of the pulses of the change pulse signal Cs may be constant (Ts1=Ts2).

Both the first selection method and the second selection method can be used in the present invention. However, the first selection method is used in the descriptions of the overall configuration for the sake of simplicity.

When the start signal St="L" (activation stop), the mode selecting part 53 sets the first activation control signals P1, P2 and P3 and the second activation control signals Q1, Q2 and Q3 to "L." In the case when the start signal St is "H" (activation start) and when the mode select signal Ms is "L" (starting mode), the mode selecting part 53 outputs the first starting activation control signals Pt1, Pt2 and Pt3 as the first activation control signals P1, P2 and P3, and outputs the second starting activation control signals Qt1, Qt2 and Qt3 as the second activation control signals Q1, Q2 and Q3. In the case when the start signal St is "H" (activation start) and when the mode select signal Ms is "H" (rotation mode), the mode selecting part 53 outputs the first rotation activation control signals Pr1, Pr2 and Pr3 of the rotation control part 54 as the first activation control signals P1, P2 and P3, and outputs the second rotation activation control signals Qr1, Qr2 and Qr3 of the rotation control part 54 as the second activation control signals Q1, Q2 and Q3.

Accordingly, at the starting operation, the first starting activation control signals Pt1, Pt2 and Pt3 and the second starting activation control signals Qt1, Qt2 and Qt3 of the starting control part 52 control the activation of the three first power amplifying parts 351, 352 and 353 and the three second power amplifying parts 355, 356 and 357 of the power supplying part 20, thereby determining the activation phase of the drive signals supplied to the three-phase windings 12, 13 and 14. During the rotation operation, the first rotation activation control signals Pr1, Pr2 and Pr3 and the second rotation activation control signals Qr1, Qr2 and Qr3 of the rotation control part 54 control the activation of the three first power amplifying parts 351, 352 and 353 and the three second power amplifying parts 355, 356 and 357 of the power supplying part 20, thereby determining the activation phase of the drive signals supplied to the three-phase windings 12, 13 and 14.

Figure 12:
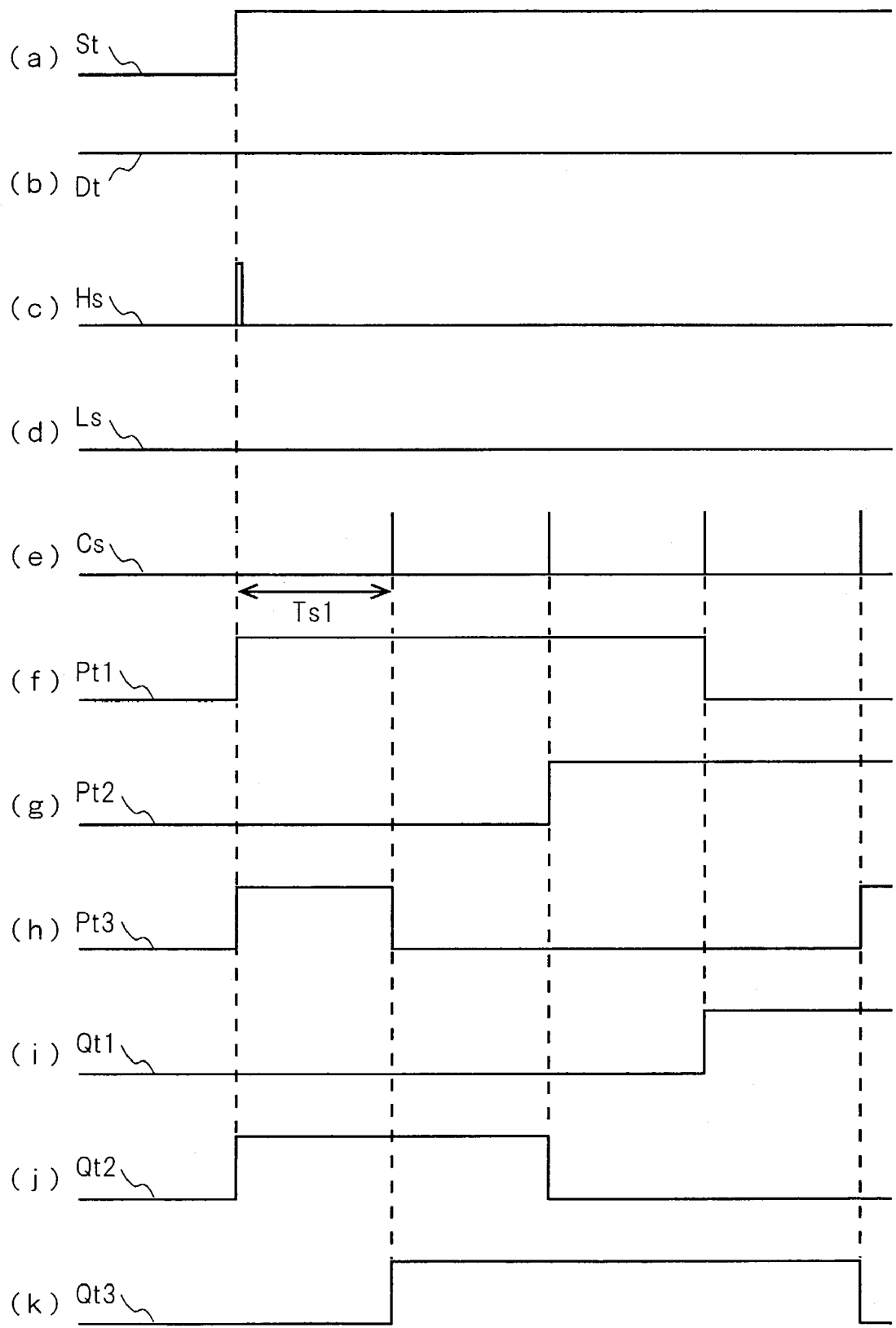
FIG. 12 is a waveform diagram for the description of the operation of the starting control part 52 of the activation control part 31 in accordance with Embodiment 1.

FIG. 12 is a diagram showing examples of the waveforms of the start signal St, the position pulse signal Dt, the first initial set signal Hs, the second initial set signal Ls, the change pulse signal Cs, the first starting activation control signals Pt1, Pt2 and Pt3 and the second starting activation control signals Qt1, Qt2 and Qt3 at the starting operation. The horizontal axis in FIG. 12 indicates time. Since the level of the position pulse signal Dt is "H" at the time or in the vicinity of the level change of the start signal St from "L" to "H," a pulse of the first initial set signal Hs is generated, and the second initial set signal Ls remains "L" (see parts (a) to (d) in FIG. 12). By the generation of the pulse of the first initial set signal Hs, the first starting activation control signals Pt1, Pt2 and Pt3 and the second starting activation control signals Qt1, Qt2 and Qt3 are set to the first setting states (see parts (f) to (k) in FIG. 12). The first setting states are: Pt1="H," Pt2="L," Pt3="H," Qt1="L," Qt2="H" and Qt3="L." After the start signal St is changed, a pulse of the change pulse signal Cs is generated every first predetermined time Ts1 after the change of the start signal St (see the part (e) of FIG. 12). In response to the generation of the pulses of the change pulse signal Cs, the first starting activation control signals Pt1, Pt2 and Pt3 and the second starting activation control signals Qt1, Qt2 and Qt3 are changed sequentially in the forward rotation direction. Furthermore, the activation phase of the drive signals supplied to the three-phase windings 12, 13 and 14 is then changed with respect to time in the forward rotation direction.

Figure 13:
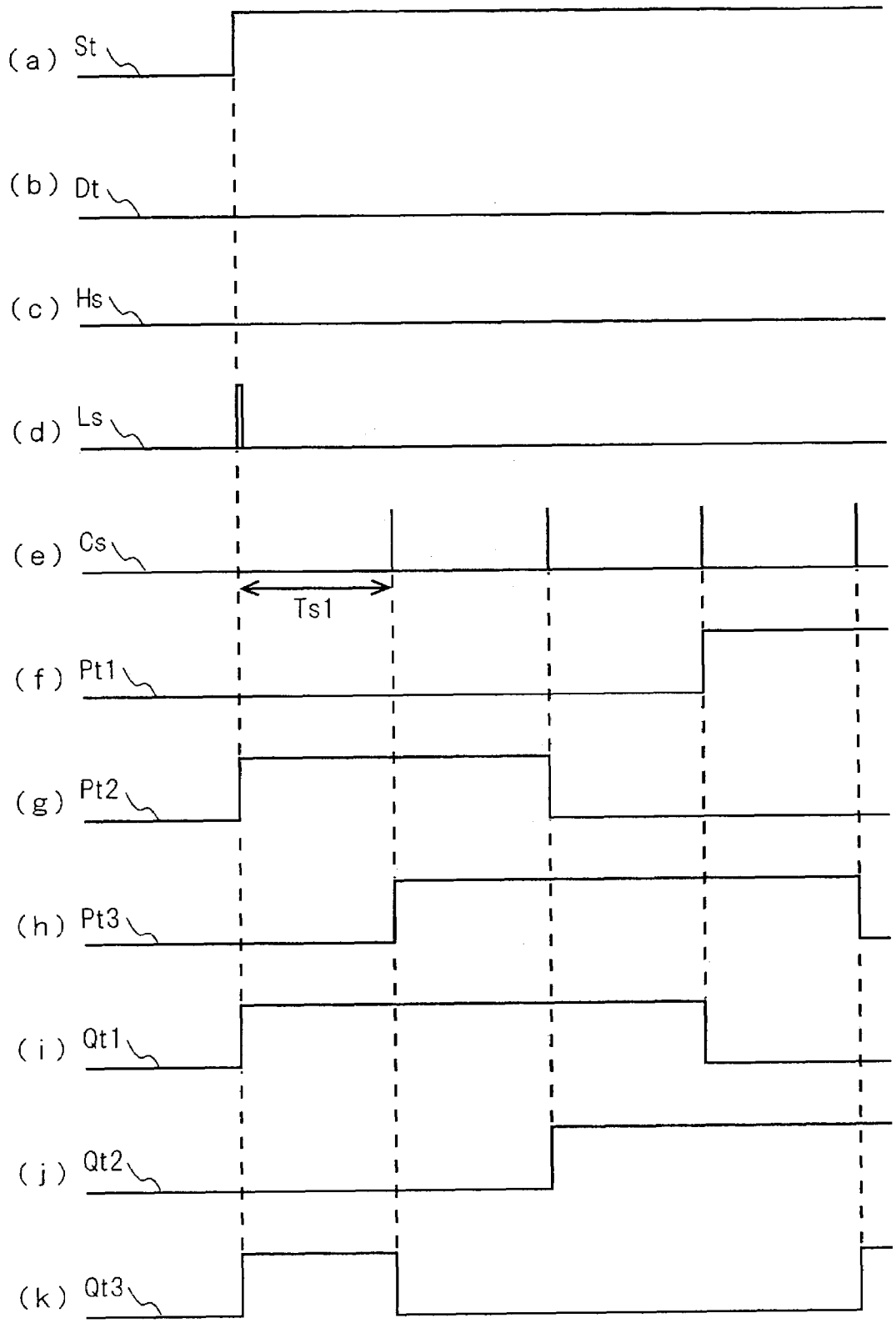
FIG. 13 is another waveform diagram for the description of the operation of the starting control part 52 of the activation control part 31 in accordance with Embodiment 1.

FIG. 13 is a diagram showing other examples of the waveforms of the start signal St, the position pulse signal Dt, the first initial set signal Hs, the second initial set signal Ls, the change pulse signal Cs, the first starting activation control signals Pt1, Pt2 and Pt3 and the second starting activation control signals Qt1, Qt2 and Qt3 at the starting operation. The horizontal axis in FIG. 13 indicates time. Since the level of the position pulse signal Dt is "L" at the time or in the vicinity of the level change of the start signal St from "L" to "H," the first initial set signal Hs remains "L," and a pulse of the second initial set signal Ls is generated (see parts (a) to (d) in FIG. 13). By the generation of the pulse of the second initial set signal Ls, the first starting activation control signals Pt1, Pt2 and Pt3 and the second starting activation control signals Qt1, Qt2 and Qt3 are set to the second setting states (see parts (f) to (k) in FIG. 13). The second setting states are: Pt1="L," Pt2="H," Pt3="L," Qt1= "H," Qt2="L" and Qt3="H." After the start signal St is changed, a pulse of the change pulse signal Cs is generated every first predetermined time Ts1 (see part (e) of FIG. 13). In response to the generation of the pulses of the change pulse signal Cs, the first starting activation control signals Pt1, Pt2 and Pt3 and the second starting activation control signals Qt1, Qt2 and Qt3 are changed sequentially in the forward rotation direction. Furthermore, the activation phase of the drive signals supplied to the three-phase windings 12, 13 and 14 is changed with respect to time in the forward rotation direction.

Figure 14:
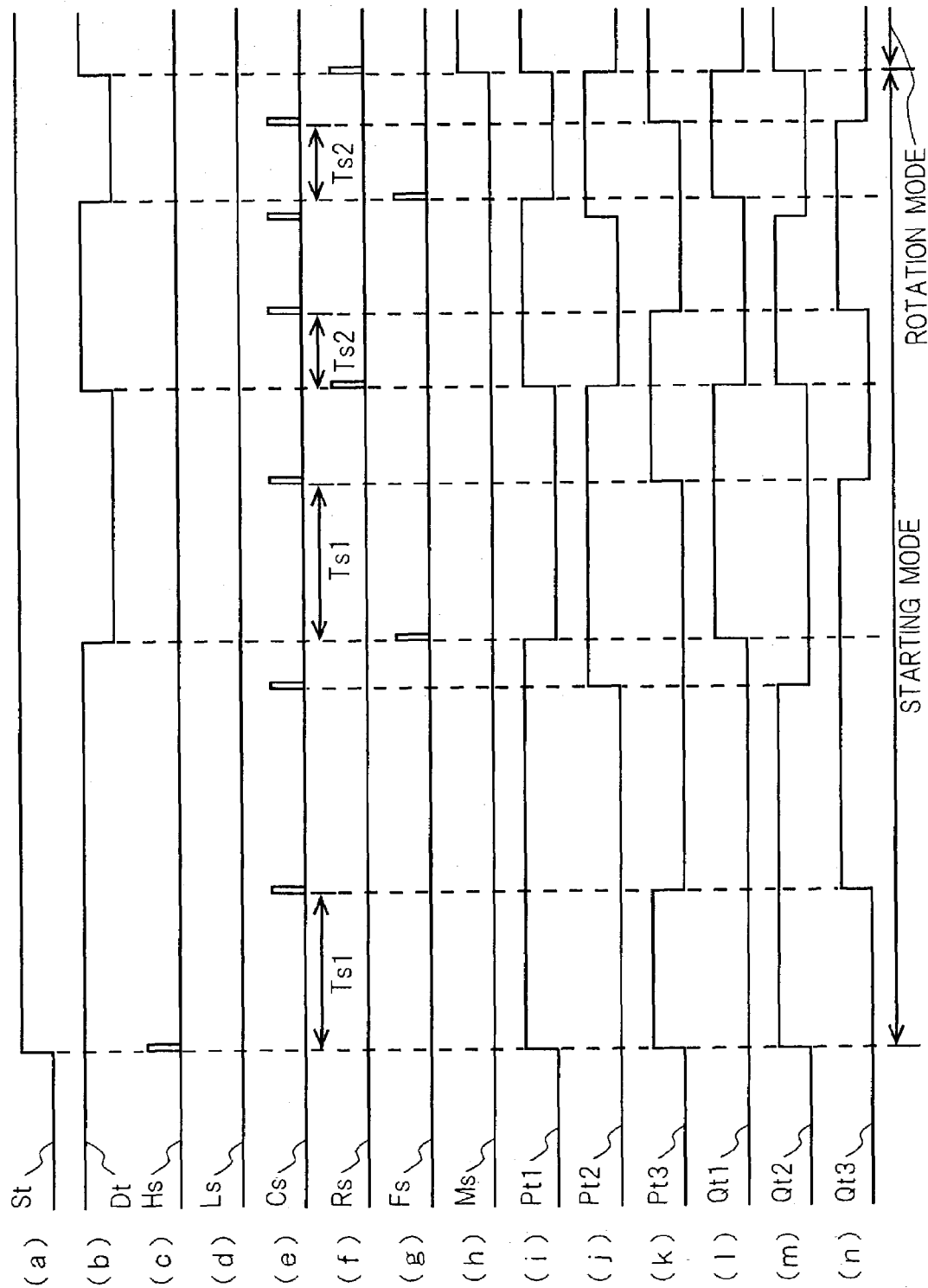
FIG. 14 is still another waveform diagram for the description of the operation of the starting control part 52 of the activation control part 31 in accordance with Embodiment 1.

FIG. 14 is a diagram showing examples of the waveforms of the start signal St, the position pulse signal Dt, the first initial set signal Hs, the second initial set signal Ls, the change pulse signal Cs, the first correct signal Rs, the second correct signal Fs, the mode select signal Ms, the starting activation control signals Pt1, Pt2 and Pt3 and the second starting activation control signals Qt1, Qt2 and Qt3 at the starting operation. The horizontal axis in FIG. 14 indicates time. Since the level of the position pulse signal Dt is "H" at the time or in the vicinity of the level change of the start signal St from "L" to "H," a pulse of the first initial set signal Hs is generated, and the second initial set signal Ls remains "L" (see parts (a) to (d) in FIG. 14). By the generation of the pulse of the first initial set signal Hs, the first starting activation control signals Pt1, Pt2 and Pt3 and the second starting activation control signals Qt1, Qt2 and Qt3 are set to the first setting states (see parts (i) to (n) in FIG. 14). After the start signal St is changed, a pulse of the change pulse signal Cs is generated every first predetermined time Ts1 (see part (e) of FIG. 14). In response to the generation of the pulses of the change pulse signal Cs, the first starting activation control signals Pt1, Pt2 and Pt3 and the second starting activation control signals Qt1, Qt2 and Qt3 are changed sequentially with respect to activation phase in the forward rotation direction. At the starting operation, the first starting activation control signals Pt1, Pt2 and Pt3 and the second starting activation control signals Qt1, Qt2 and Qt3 control the activation of the three first power amplifying parts 351, 352 and 353 and the three second power amplifying parts 355, 356 and 357 of the power supplying part 20, thereby determining the activation phase of the drive signals supplied to the three-phase windings 12, 13 and 14. Accordingly, the rotor 11 and the disk 1 start rotating in the forward rotation direction. As a result, the position pulse signal Dt changes from "H" to "L."

In response to the level change (falling edge) from "H" to "L" of the position pulse signal Dt, a pulse of the second correct signal Fs is generated (see part (g) of FIG. 14). By the generation of the pulse of the second correct signal Fs, the first starting activation control signals Pt1, Pt2 and Pt3 and the second starting activation control signals Qt1, Qt2 and Qt3 are corrected to the fourth setting states. The fourth setting states are: Pt1="L," Pt2="H." Pt3="L," Qt1="H," Qt2="L" and Qt3="H." A pulse of the change pulse signal Cs is generated every first predetermined time Ts1. In response to the generation of the pulses of the change pulse signal Cs, the first starting activation control signals Pt1, Pt2 and Pt3 and the second starting activation control signals Qt1, Qt2 and Qt3 are changed sequentially with respect to activation phase in the forward rotation direction. Accordingly, the rotor 11 and the disk 1 rotate further in the forward rotation direction, and the position pulse signal Dt changes from "L" to "H."

In response to the level change (rising edge) from "L" to "H" of the position pulse signal Dt, a pulse of the first correct signal Rs is generated (see part (f) of FIG. 14). By the generation of the pulse of the first correct signal Rs, the first starting activation control signals Pt1, Pt2 and Pt3 and the second starting activation control signals Qt1, Qt2 and Qt3 are corrected to the third setting states. The third setting states are: Pt1="H," Pt2="L," Pt3="H," Qt1="L," Qt2="H" and Qt3="L." Since the level change of, the position pulse signal Dt has occurred twice, a pulse of the change pulse signal Cs is generated every second predetermined time Ts2 after the change time of the position pulse signal Dt. The second predetermined time Ts2 is made far shorter than the first predetermined time Ts1 (Ts2=0.5 to 0.7 Ts1, for example). In response to the generation of the pulses of the change pulse signal Cs, the first starting activation control signals Pt1, Pt2 and Pt3 and the second starting activation control signals Qt1, Qt2 and Qt3 are changed sequentially with respect to activation phase in the forward rotation direction from the third setting states. Accordingly, the rotor 11 and the disk 1 rotate further in the forward rotation direction, and the position pulse signal Dt changes from "H" to "L."

In response to the level change (falling edge) from "H" to "L" of the position pulse signal Dt, a pulse of the second correct signal Fs is generated. By the generation of the pulse of the second correct signal Fs, the first starting activation control signals Pt1, Pt2 and Pt3 and the second starting activation control signals Qt1, Qt2 and Qt3 are corrected to the fourth setting states. A pulse of the change pulse signal Cs is generated every second predetermined time Ts2 after the change time of the position pulse signal Dt. In response to the generation of the pulses of the change pulse signal Cs, the first starting activation control signals Pt1, Pt2 and Pt3 and the second starting activation control signals Qt1, Qt2 and Qt3 are changed sequentially with respect to activation phase in the forward rotation direction from the fourth setting states. Accordingly, the rotor 11 and the disk 1 rotate further in the forward rotation direction, and the position pulse signal Dt changes from "L" to "H."

Since the level change of the position pulse signal Dt has occurred four times, the rotation judge part 63 changes the mode select signal Ms from "L" to "H" so as to change the starting mode to the rotation mode. In other words, when the mode select signal Ms becomes "H," the mode selecting part 53 outputs the first rotation activation control signals Pr1, Pr2 and Pr3 of the rotation control part 54 as the first activation control signals P1, P2 and P3, and outputs the second rotation activation control signals Qr1, Qr2 and Qr3 of the rotation control part 54 as the second activation control signals Q1, Q2 and Q3. Accordingly, during the rotation operation, the first rotation activation control signals Pr1, Pr2 and Pr3 and the second rotation activation control signals Qr1, Qr2 and Qr3 control the activation of the three first power amplifying parts 351, 352 and 353 and the three second power amplifying parts 355, 356 and 357 of the power supplying part 20, thereby determining the activation phase of the drive signals supplied to the three-phase windings 12, 13 and 14.

FIG. 4 is a circuit diagram showing the detailed configuration of the rotation control part 54. As shown in FIG. 4, the rotation-control part 54 comprises a time measuring part 101, a first timing adjust part 102, a second timing adjust part 103 and a signal producing part 104. The first timing adjust part 102, the second timing adjust part 103 and the signal producing part 104 constitute a phase adjusting block. The phase adjusting block produces the three-phase first rotation activation control signals and the three-phase second rotation activation control signals, the timing values of which are adjusted in response to the measuring operation of the time measuring part 101. The phase adjusting block then adjusts the activation phases of the drive signals supplied to the three-phase windings 12, 13 and 14.

The time measuring part 101 measures a time interval T0 corresponding to one period or a half period of the position pulse signal Dt and outputs a measured data signal Da corresponding to the measurement result and also outputs a measure operation signal Dp. When necessary, the time measuring part 101 outputs a delayed position pulse signal Dd which is obtained by delaying the position pulse signal Dt by a required time.

On the arrival of the measure operation signal Dp, the first timing adjust part 102 receives the measured data signal Da and generates a first timing signal Fa every first adjust time T1 which responds with the measured data signal Da (having the time interval T0). In addition, the first timing adjust part 102 shifts its internal state in response to the first timing signal Fa, and changes a first state signal in response to the shift of the internal state. The first timing adjust part 102 outputs a first adjust signal Ja responding with at least the first state signal. Furthermore, the first timing adjust part 102 sets the first state signal to substantially a first predetermined state in response to the measure operation signal Dp.

On the arrival of the measure operation signal Dp, the second timing adjust part 103 receives the measured data signal Da and generates a second timing signal every second adjust time T2 which responds with the measured data signal Da (having the time interval T0). In addition, the second timing adjust part 103 shifts its internal state in response to the second timing signal and changes a second state signal in response to the shift of the internal state. The second timing adjust part 103 outputs a second adjust signal Jb responding with the second state signal. Furthermore, the second timing adjust part 103 sets the second state signal to substantially a second predetermined state in response to at least the first timing signal Fa.

The signal producing part 104 comprises a slope part 111 and a shaping part 112. The slope part 111 outputs a set of slope signals Sa responding with the second adjust signal Jb. The shaping part 112 outputs the three-phase first rotation activation control signals Pr1, Pr2 and Pr3 and the three-phase second rotation activation control signals Qr1, Qr2 and Qr3 responding with the first adjust signal Ja and the set of slope signals Sa. The amplitudes of the first rotation activation control signals Pr1, Pr2 and Pr3 and the second rotation activation control signals Qr1, Qr2 and Qr3 are changed in response to the input signal Ac" supplied to the shaping part 112. In this embodiment, the command signal Ac of the commanding part 32 is used as the input signal Ac" supplied to the shaping part 112.

In the rotation control part 54 shown in FIG. 4 and serving as rotation control means, the first timing adjust part 102, the second timing adjust part 103 and the signal producing part 104 constitute phase adjusting means, and the time measuring part 101 constitutes time measuring means.

Figure 5:
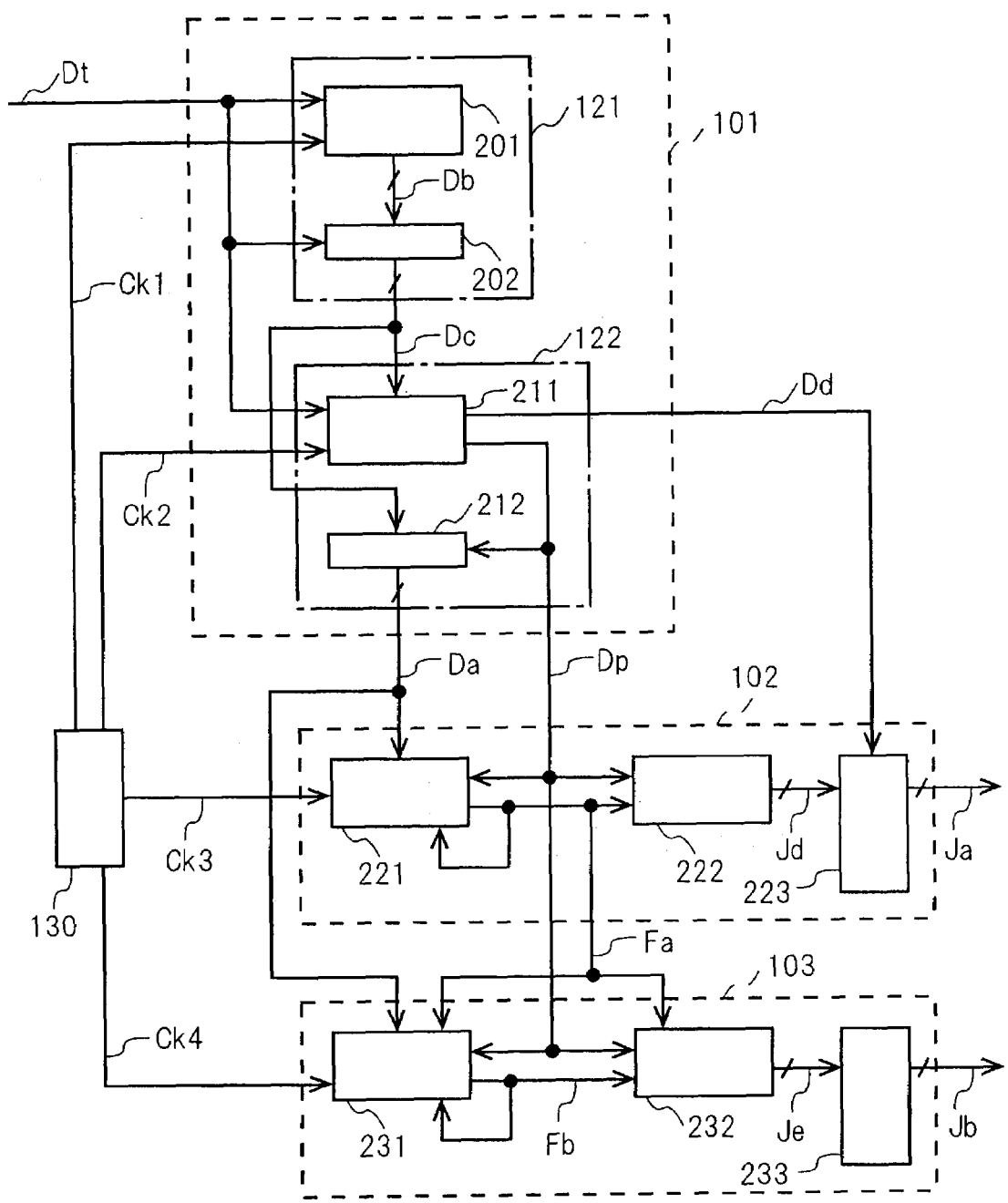
FIG. 5 is a view showing the configuration of the time measuring part 101, the first timing adjust part 102 and the second timing adjust part 103 of the rotation control part 54 in accordance with Embodiment 1.

FIG. 5 is a block diagram showing the detailed configurations of the time measuring part 101, the first timing adjust part 102 and the second timing adjust part 103. The time measuring part 101 comprises a measure part 121 and a delay part 122. The measure part 121 comprises a measure circuit 201 for measuring the time interval T0 between the measurement edges of the position pulse signal Dt, and a measured data hold circuit 202 for holding the measurement result. In the case of measuring the time interval of one period of the position pulse signal Dt, the measure circuit 201 uses the rising or falling edge of the position pulse signal Dt as the measurement edge and then measures the time interval between the measurement edges. On the other hand, in the case of measuring the time interval of a half period of the position pulse signal Dt, the measure circuit 201 uses both the rising and falling edges of the position pulse signal Dt as the measurement edges and then measures the time interval between the measurement edges. In this embodiment, the rising edge is a time wherein the level of the position pulse signal Dt changes from "L" to "H," and the falling edge is a time wherein the level of the position pulse signal Dt changes from "H" to "L."

The measure circuit 201 counts up the pulses of the first clock signal Ck1 of the clock circuit 130 during the time interval T0 between the measurement edges of the position pulse signal Dt. The measured data hold circuit 202 holds the internal data signal Db of the measure circuit 201 in response to the arrival of the measurement edge of the position pulse signal Dt. As a result, the output data signal Dc of the measured data hold circuit 202 becomes binary digital data which represents the time interval T0 corresponding to one period or a half period of the position pulse signal Dt. Immediately after the measured data hold circuit 202 holds new data, the measure circuit 201 is reset and then carries out new measurement.

The delay part 122 comprises a delay circuit 211 and a delay hold circuit 212. The delay circuit 211 receives the new output data signal Dc of the measure part 121 in response to the arrival of the measurement edge of the position pulse signal Dt. The delay circuit 211 then counts down the pulses of the second clock signal Ck2 of the clock circuit 130. When the internal data of the delay circuit 211 reaches zero, the measure operation signal Dp is generated. In response to the measure operation signal Dp, the delay hold circuit 212 receives and holds the output data signal Dc of the measure part 121, and outputs the new measured data signal Da. As a result, the delay part 122 outputs the new measure operation signal Dp and the new measured data signal Da in the timing delayed by a predetermined delay time Td which is substantially proportional to the measured data. Furthermore, the delay circuit 211 of the delay part 122 outputs the delayed position pulse signal Dd which is delayed from the position pulse signal Dt by the delay time Td. The time measuring part 101 may include a part of the clock circuit 130 which outputs the first clock signal Ck1 and the second clock signal Ck2.

The first timing adjust part 102 comprises a first cyclic count circuit 221, a first state circuit 222 and a first adjust circuit 223. The first cyclic count circuit 221 receives the measured data signal Da in response to the measure operation signal Dp and counts down the pulses of the third clock signal Ck3 of the clock circuit 130. When the internal data of the first cyclic count circuit 221 reaches zero, a first timing signal Fa is generated. The first cyclic count circuit 221 receives the measured data signal Da again in response to the generation of the first timing signal Fa, and then it counts down again. As a result, after the generation of the measure operation signal Dp, the first cyclic count circuit 221 outputs the first timing signal Fa every first adjust time T1 which responds to the measured data signal Da. The first adjust time T1 is substantially proportional to the time interval T0 of the position pulse signal Dt. In the case when the time measuring part 101 measures the time interval T0 of one period of the position pulse signal Dt, the first adjust time T1 of the first timing signal Fa is set so as to be substantially equal to T0/6. That is, T1=T0/6. Furthermore, in the case when the time measuring part 101 measures the time interval T0 of a half period of the position pulse signal Dt, the first adjust time T1 of the first timing signal Fa is set so as to be substantially equal to T0/3. That is, T1=T0/3. The first timing adjust part 102 may include a part of the clock circuit 130 which outputs the third clock signal Ck3.

The first state circuit 222 comprises an up-type counter circuit, for example, and outputs a first state output signal Jd responding with its internal state. The internal state of the first state circuit 222 is set to substantially a first predetermined state by the measure operation signal Dp. The first state circuit 222 then counts up by using the first timing signal Fa as a clock signal. The first state circuit 222 changes and shifts its internal state and the first state output signal Jd in response to the first timing signal Fa. Accordingly, the first state output signal Jd is set to substantially a first predetermined state in response to the measurement operation of the time measuring part 101, and then the first state output signal Jd is changed and shifted in response to the generation of the first timing signal Fa. In other words, the first state output signal Jd changes and shifts its state every first adjust time T1. In the case when the time measuring part 101 measures the time interval of one period of the position pulse signal Dt, the first state circuit 222 changes in six states which is equal to twice the number of phases (three). In the case when the time measuring part 101 measures the time interval of a half period of the position pulse signal Dt, the first state circuit 222 changes in three states which is equal to one time the number of phases (three). The count value of the first state circuit 222 is limited so that the internal state of the first state circuit 222 does not reach a predetermined value or more.

The first adjust circuit 223 outputs a first adjust signal Ja responding with the first state output signal Jd of the first state circuit 222. In the case when the time measuring part 101 measures the time interval of one period of the position pulse signal Dt, the first adjust signal Ja of the first adjust circuit 223 changes in six states or approximately six states in one period of the position pulse signal Dt in response to the first state output signal Jd. Furthermore, in the case when the time measuring part 101 measures the time interval of a half period of the position pulse signal Dt, the first adjust signal Ja of the first adjust circuit 223 changes in six states or approximately six states in one period of the position pulse signal Dt in response to the first state output signal Jd and the delayed position pulse signal Dd. As a result, the first adjust signal Ja becomes a digital signal responding with at least the first state output signal Jd.

The second timing adjust part 103 comprises a second cyclic count circuit 231, a second state circuit 232 and a second adjust circuit 233. The second cyclic count circuit 231 receives the measured data signal Da in response to the measure operation signal Dp, and counts down the pulses of the fourth clock signal Ck4 of the clock circuit 130. When the internal data of the second cyclic count circuit 231 reaches zero, a second timing signal Fb is generated. The second cyclic count circuit 231 receives the measured data signal Da again in response to the generation of the second timing signal Fb and counts down again. As a result, after the generation of the measure operation signal Dp, the second cyclic count circuit 231 outputs the second timing signal Fb every second adjust time T2 which responds to the measured data signal Da. The second adjust time T2 is substantially proportional to the time interval T0 of the position pulse signal Dt. The second adjust time T2 is sufficiently smaller than the first adjust time T1 (T2<T1/2). In Embodiment 1, the second adjust time T2 is set at approximately ¹⁄₁₀ of the first adjust time T1. That is, T2=T1/10. The second cyclic count circuit 231 receives the measured data signal Da again in response to the generation of the first timing signal Fa. Furthermore, the second timing adjust part 103 may include a part of the clock circuit 130 which outputs the fourth clock signal Ck4.

The second state circuit 232 comprises an up-type counter circuit, for example, and outputs a second state output signal Je responding with its internal state. The internal state of the second state circuit 232 is set to substantially a second predetermined state by the first timing signal Fa. Furthermore, the internal state of the second state circuit 232 is set to substantially the second predetermined state by the measure operation signal Dp when necessary. The second state circuit 232 then counts up by using the second timing signal Fb as a clock signal. The second state circuit 232 changes its internal state in response to the second timing signal Fb, and changes and shifts the second state output signal Je in response to the second timing signal Fb. Accordingly, the second state output signal Je is set to substantially a second predetermined state in response to the generation of the first timing signal Fa and the measurement operation of the time measuring part 101, and then the second state output signal Je is changed and shifted in response to the generation of the second timing signal Fb. In other words, the state of the second state output signal Je is changed and shifted every second adjust time T2. In Embodiment 1, the second state circuit 232 changes in 10 states or approximately 10 states. The count value of the second state circuit 232 is limited so that the internal state of the second state circuit 232 does not reach a predetermined value or more.

The second adjust circuit 233 outputs a second adjust signal Jb in response to the second state output signal Je of the second state circuit 232. As a result, the second adjust signal Jb becomes a digital signal which responds to the second state output signal Je.

Figure 15:
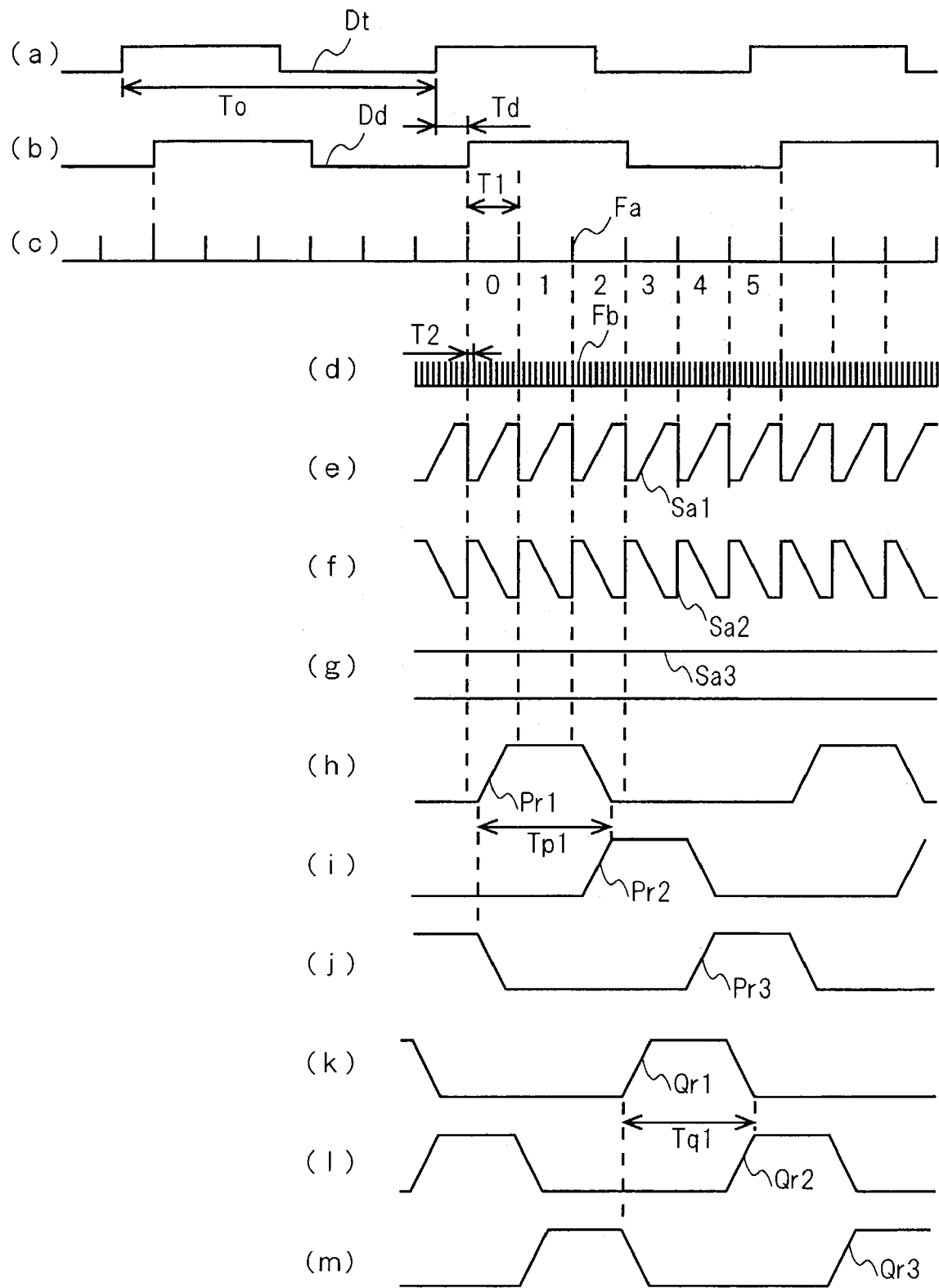
FIG. 15 is a waveform diagram for the description of the operation of the rotation control part 54 of the activation control part 31 in accordance with Embodiment 1.

FIG. 15 is a waveform diagram for explaining the operations of the time measuring part 101, the first timing adjust part 102 and the second timing adjust part 103. The horizontal axis in FIG. 15 indicates time. Described below is the case in which the time measuring part 101 measures one period between the rising edges of the position pulse signal Dt. The measure part 121 of the time measuring part 101 measures the time interval T0 of one period of the position pulse signal Dt (see a part (a) of FIG. 15). The delay part 122 of the time measuring part 101 outputs the delayed position pulse signal Dd which is delayed wholly from the position pulse signal Dt by the delay time Td which is substantially proportional to the measured time interval T0 (see a part (b) of FIG. 15). Furthermore, the delay part 122 outputs the measure operation signal Dp in the timing delayed from the measurement edge of the position pulse signal Dt by the delay time Td. The first cyclic count circuit 221 of the first timing adjust part 102 generates the first timing signal Fa every first adjust time T1 responding with the measured time interval T0 (see a part (c) of FIG. 15). The first adjust time T1 is set at T0/6 or approximately T0/6. The first state circuit 222 of the first timing adjust part 102 sets its internal state and the first state output signal Jd to substantially a first predetermined state in response to the measure operation signal Dp. Furthermore, the first state circuit 222 changes and shifts the first state output signal Jd in response to the first timing signal Fa which is generated every first adjust time T1. The first adjust circuit 223 of the first timing adjust part 102 outputs the first adjust signal Ja responding with the first state output signal Jd. As a result, the first adjust signal Ja changes in six states or approximately six states in one period of the position pulse signal Dt or the delayed position. pulse signal Dd. The first adjust signal Ja may be changed in response to the first state output signal Jd and the delayed position pulse signal Dd. The second cyclic count circuit 231 of the second timing adjust part 103 generates the second timing signal Fb every second adjust time T2 (see a part (d) of FIG. 15). In this embodiment, the second adjust time T2 is set at T/10 or approximately T/10. The second state circuit 232 of the second timing adjust part 103 sets its internal state and the second state output signal Je substantially to a second predetermined state in response to the first timing signal Fa and the measure operation signal Dp. In addition, the second state circuit 232 changes the second state output signal Je in response to the second timing signal Fb which is generated every second adjust time T2. The second adjust circuit 233 of the second timing adjust part 103 outputs the second adjust signal Jb responding with the second state output signal Je. As a result, the second adjust signal Jb changes in 10 states or approximately 10 states in one period of the first timing signal Fa.

Figure 6:
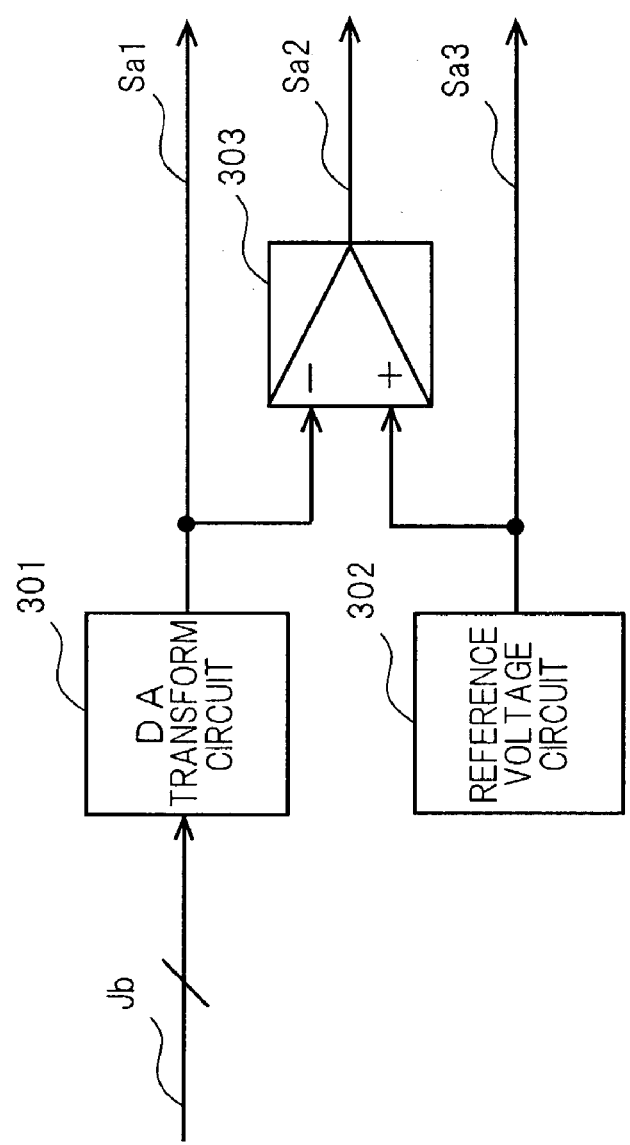
FIG. 6 is a view showing the configuration of the slope part 111 of the signal producing part 104 in accordance with Embodiment 1.

FIG. 6 is a block diagram showing the detailed configuration of the slope part 111 of the signal producing part 104 shown in FIG. 4. As shown in FIG. 6, the slope part 111 comprises a DA transform circuit 301, a reference voltage circuit 302 and a difference circuit 303. The DA transform circuit 301 outputs a first slope signal Sa1 in response to the second adjust signal Jb of the second timing adjust part 103. A part (e) of FIG. 15 shows the waveform of the first slope signal Sa1. Since the second adjust signal Jb is set to a second predetermined state in response to the first timing signal Fa, the first slope signal Sa1 is set to zero. While the level of the second adjust signal Jb is lower than a first predetermined value, the first slope signal Sa1 remains zero. As the level of the second adjust signal Jb rises, the amplitude of the first slope signal Sa1 increases. When the first slope signal Sa1 reaches a reference voltage, it becomes constant at the value of the reference voltage. As a result, the first slope signal Sa1 becomes an analog slope signal synchronized with he first timing signal Fa and having a desired slope. The reference voltage circuit 302 outputs a third slope signal Sa3 having a constant voltage corresponding to the reference voltage. The third slope signal Sa3 having no slope may not be called a slope signal in a strict sense. However, the third slope signal Sa3 is herein called a slope signal in order to treat these slope signals as a group. The difference circuit 303 obtains the difference between the third slope signal Sa3 and the first slope signal Sa1, and outputs a second slope signal Sa2. Parts (f) and (g) of FIG. 15 show the waveforms of the second slope signal Sa2 and the third slope signal Sa3, respectively.

The slope part 111 produces at least one slope signal Sa1, and the slope signal Sa1 has a slope waveform repeated every first adjust time which is substantially proportional to the measured time interval T0 of the time measuring part 101. The first slope signal Sa1 repeats a slope waveform substantially plural times in the time interval T0, that is, one period of the position pulse signal. In this embodiment, in the slope signal Sa1, substantially six slope waveforms are repeated in one period of the position pulse signal.

Figure 7:
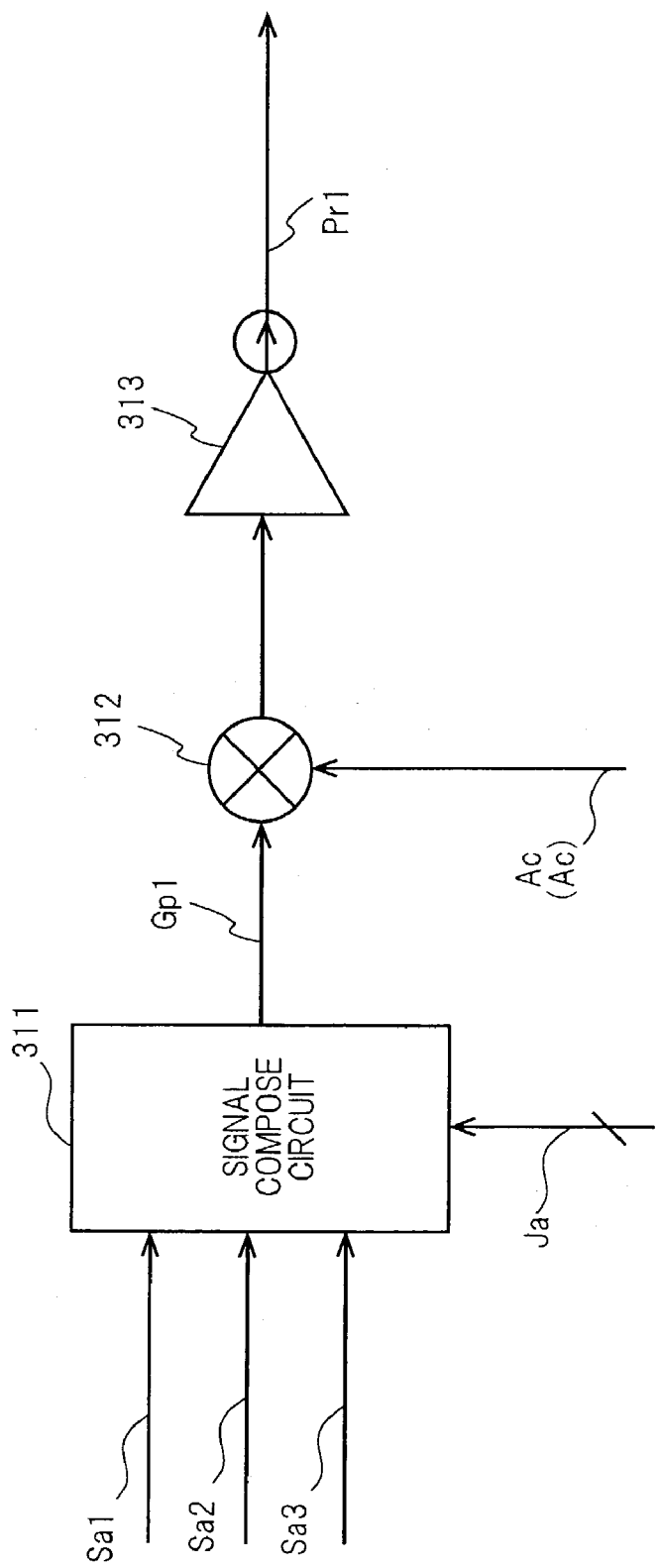
FIG. 7 is a view showing the configuration of a part of the shaping part 112 of the signal producing part 104 in accordance with Embodiment 1.

The shaping part 112 of the signal producing part 104 shown in FIG. 4 produces the three-phase first rotation activation control signals Pr1, Pr2 and Pr3 and the three-phase second rotation activation control signals Qr1, Qr2 and Qr3 in response to the first adjust signal Ja of the first timing adjust part 102 and the second adjust signal Jb of the second timing adjust part 103. FIG. 7 is a block diagram showing the detailed configuration of a shaping circuit, a part of the shaping part 112, which produces the first rotation activation control signal Pr1. As shown in FIG. 7, the shaping circuit, a part of the shaping part 112, comprises a signal compose circuit 311, a multiply circuit 312 and a current convert circuit 313. The signal compose circuit 311 combines the first slope signal Sa1, the second slope signal Sa2 and the third slope signal Sa3 of the slope part 111 in response to the first adjust signal Ja of the first timing adjust part 102, thereby producing a composite signal Gp1 having a trapezoidal waveform. The multiply circuit 312 multiplies the composite signal Gp1 by the input signal Ac". Since the input signal Ac" is a command signal Ac of the commanding part 32, the output signal of the multiply circuit 312 is the product of the composite signal Gp1 and the command signal Ac. The current convert circuit 313 outputs the first rotation activation control signal Pr1 which is a current signal substantially proportional to the output signal of the multiply circuit 312. As a result, the first rotation activation control signal Pr1 responds with the first adjust signal Ja (the first state output signal Jd) of the first timing adjust part 102 and the second adjust signal Jb (the second state output signal Je) of the second timing adjust part 103. The first rotation activation control signal Pr1 has a trapezoidal waveform produced by combining the slope signals Sa1, Sa2 and Sa3 in response to the first adjust signal Ja. The detailed configurations of the other shaping circuits in the shaping part 112 for producing the other first rotation activation control signals Pr2 and Pr3 and the second rotation activation control signals Qr1, Qr2 and Qr3 are similar to that of the shaping circuit shown in FIG. 7, and their descriptions are omitted.

When the mode select signal Ms is "H" (rotation mode), the mode selecting part 53 outputs the first rotation activation control signals Pr1, Pr2 and Pr3 of the rotation control part 54 as the first activation control signals P1, P2 and P3, and outputs the second rotation activation control signals Qr1, Qr2 and Qr3 of the rotation control part 54 as the second activation control signals Q1, Q2 and Q3. In other words, P1=Pr1, P2=Pr2, P3=Pr3, Q1=Qr1, Q2=Qr2 and Q3=Qr3.

The shaping part 112 produces at least one rotation activation control signal (that is, at least one activation control signal) which varies substantially smoothly in at least one of the rising and falling slopes in response to the slope signal Sa1. In this embodiment, the shaping part 112 produces the three-phase first rotation activation control signals and the three-phase second rotation activation control signals (that is, the three-phase first activation control signals and the three-phase second activation control signals), each of which varies substantially smoothly in both of the rising and falling slopes. Each of the three-phase first rotation activation control signals and the three-phase second rotation activation control signals varies in synchronization with the position signal and has a cyclic period which is substantially equal to one period of the position signal.

A part (h) of FIG. 15 shows the waveform of the first rotation activation control signal Pr1 (that is, the first activation control signal P1). The first rotation activation control signal Pr1 becomes a trapezoidal current signal whose amplitude varies in response to the command signal Ac. The active period Tp1 of the first rotation activation control signal Pr1 has an electrical angle considerably larger than 360/3=120 degrees. Parts (i) and (j) of FIG. 15 show the waveforms of the other first rotation activation control signals Pr2 and Pr3. As shown in the figures, the three-phase first rotation activation control signals Pr1, Pr2 and Pr3 respond with the first adjust signal Ja of the first timing adjust part 102 and the second adjust signal Jb of the second timing adjust part 103. Furthermore, each of the first rotation activation control signals Pr1, Pr2 and Pr3 becomes a trapezoidal current signal obtained by combining the slope signals Sa1, Sa2 and Sa3 in response to the first adjust signal Ja. The active periods Tp1, Tp2 and Tp3 of these three-phase first rotation activation control signals Pr1, Pr2 and Pr3 are made considerably longer than the period of an electrical angle of 120 degrees. In this embodiment, Tp1, Tp2 and Tp3 are set in the range from 150 to 180 degrees.

Similarly, parts (k) to (m) of FIG. 15 show the waveforms of the three-phase second rotation activation control signals Qr1, Qr2 and Qr3. The three-phase second rotation activation control signals Qr1, Qr2 and Qr3 respond with the first adjust signal Ja of the first timing adjust part 102 and the second adjust signal Jb of the second timing adjust part 103. Furthermore, each of the second rotation activation control signals Qr1, Qr2 and Qr3 becomes a trapezoidal current signal obtained by combining the slope signals Sa1, Sa2 and Sa3 in response to the first adjust signal Ja. The active periods Tq1, Tq2 and Tq3 of these three-phase second rotation activation control signals Qr1, Qr2 and Qr3 are made considerably longer than the period of an electrical angle of 120 degrees. In this embodiment, Tq1, Tq2 and Tq3 are set in the range from 150 to 180 degrees.

The first rotation activation control signal Pr1 and the second rotation activation control signal Qr1 are in reverse phase to each other (the phase difference of an electrical angle of 180 degrees). Similarly, the first rotation activation control signal Pr2 and the second rotation activation control signal Qr2 are in reverse phase to each other, and the first rotation activation control signal Pr3 and the second rotation activation control signal Qr3 are in reverse phase to each other.

Next, the whole operation of the disk drive apparatus of Embodiment 1 is described below.

The position sensor 41 of the position detecting part 30 detects the rotational position of the magnetic poles of the field part of the rotor 11 for directly rotating the disk 1. The position detecting part 30 outputs the position pulse signal Dt which is obtained by shaping the waveform of the single position detection signal (position signal) of the position sensor 41. The activation control part 31 of the activation operation block 45 outputs the first activation control signals P1, P2 and P3 and the second activation control signals Q1, Q2 and Q3 responding with the position pulse signal Dt.

When the level of the start signal St of the commanding part 32 changes from "L" (activation stop) to "H" (activation start), the mode select signal Ms of the starting control part 52 of the activation control part 31 becomes "L" (starting mode). The mode selecting part 53 outputs the first starting activation control signals Pt1, Pt2 and Pt3 and the second starting activation control signals Qt1, Qt2 and Qt3 of the phase changing part 64 of the starting control part 52 as the first activation control signals P1, P2 and P3 and the second activation control signals Q1, Q2 and Q3, respectively. Accordingly, the first power amplifying parts 351, 352 and 353 of the power supplying part 20 form the current paths to the three-phase windings 12, 13 and 14 in response to the three-phase first starting activation control signals Pt1, Pt2 and Pt3 of the starting control part 52. The second power amplifying parts 355, 356 and 357 of the power supplying part 20 also form the current paths to the three-phase windings 12, 13 and 14 in response to the second starting activation control signals Qt1, Qt2 and Qt3 of the starting control part 52.

The operation of the starting control part 52 in the starting mode is described by using the waveform diagrams FIGS. 12, 13 and 14 for operation explanation. First, the initial phase setting part 61 shown in FIG. 3 generates a pulse of the first initial set signal Hs or the second initial set signal Ls in response to the level of the position pulse signal Dt at the time or in the vicinity of the generation of the start signal St. In other words, when Dt="H," the initial phase setting part 61 generates a pulse of the first initial set signal Hs. When Dt="L," the initial phase setting part 61 generates a pulse of the second initial set signal Ls. The phase changing part 64 sets the first starting activation control signals Pt1, Pt2 and Pt3 and the second starting activation control signals Qt1, Qt2 and Qt3 to their first setting states in response to the generation of the first initial set signal Hs. Hereafter, the activation phase controlled by the first starting activation control signals Pt1, Pt2 and Pt3 and the second starting activation control signals Qt1, Qt2 and Qt3 is changed sequentially with respect to time in the forward rotation direction. Furthermore, the phase changing part 64 sets the first starting activation control signals Pt1, Pt2 and Pt3 and the second starting activation control signals Qt1, Qt2 and Qt3 to their second setting states in response to the generation of the second initial set signal Ls. Hereafter, the activation phase controlled by the first starting activation control signals Pt1, Pt2 and Pt3 and the second starting activation control signals Qt1, Qt2 and Qt3 is changed sequentially with respect to time in the forward rotation direction. The change pulse signal Cs of the rotation judge part 63 is used as a clock signal in the above-mentioned operation. The rotation judge part 63 generates the pulses of the change pulse signal Cs every first predetermined time Ts1. In response to the first starting activation control signals Pt1, Pt2 and Pt3 and the second starting activation control signals Qt1, Qt2 and Qt3 of the starting control part 52 shown in FIG. 2, the first power amplifying parts 351, 352 and 353 and the second power amplifying parts 355, 356 and 357 of the power supplying part 20 sequentially change the activation phase of the drive signals supplied to the three-phase windings 12, 13 and 14 in the forward rotation direction. As a result, the rotor 11 and the disk 1 start rotating in the forward rotation direction.

The level of the position pulse signal Dt changes as the rotor 11 and the disk 1 rotate. The phase correcting part 62 generates a pulse of the first correct signal Rs or the second correct signal Fs depending on the polarity of the level change of the position pulse signal Dt. In other words, the phase correcting part 62 generates a pulse of the first correct signal Rs in response to the rising edge of the position pulse signal Dt. The phase correcting part 62 also generates a pulse of the second correct signal Rs in response to the falling edge of the position pulse signal Dt. The phase changing part 64 forcibly corrects the first starting activation control signals Pt1, Pt2 and Pt3 and the second starting activation control signals Qt1, Qt2 and Qt3 so that they are set to the third setting states in response to the generation of the pulses of the first correct signal Rs. Hereafter, the activation phase of the drive signals to the three-phase windings 12, 13 and 14 responding with the first starting activation control signals Pt1, Pt2 and Pt3 and the second starting activation control signals Qt1, Qt2 and Qt3 is changed sequentially with respect to time in the forward rotation direction. Furthermore, the phase changing part 64 forcibly corrects the first starting activation control signals Pt1, Pt2 and Pt3 and the second starting activation control signals Qt1, Qt2 and Qt3 so that they are set to the fourth setting states in response to the generation of the pulses of the second correct signal Fs. Hereafter, the activation phase of the drive signals to the three-phase windings 12, 13 and 14 responding with the first starting activation control signals Pt1, Pt2 and Pt3 and the second starting activation control signals Qt1, Qt2 and Qt3 is changed sequentially with respect to time in the forward rotation direction. After the correction operation of the phase correcting part 62, the rotation judge part 63 generates a pulse of the change pulse signal Cs every first predetermined time Ts1. As a result, the rotor 11 and the disk 1 further rotate in the forward rotation direction.

When the level change of the position pulse signal Dt occurs twice, the rotation judge part 63 generates a pulse of the change pulse signal Cs every second predetermined time Ts2. Since Ts2<Ts1, the pulse interval of the change pulse signal Cs is made shorter. When the level change of the position pulse signal Dt occurs four times, the rotation judge part 63 sets the mode select signal Ms to "H" (rotation mode).

When the mode select signal Ms becomes "H," the mode selecting part 53 outputs the first rotation activation control signals Pr1, Pr2 and Pr3 and the second rotation activation control signals Qr1, Qr2 and Qr3 of the rotation control part 54 as the first activation control signals P1, P2 and P3 and the second activation control signals Q1, Q2 and Q3, respectively. As a result, during the rotation operation, the first rotation activation control signals Pr1, Pr2 and Pr3 and the second rotation activation control signals Qr1, Qr2 and Qr3 control the activation of the three first power amplifying parts 351, 352 and 353 and the three second power amplifying parts 355, 356 and 357 of the power supplying part 20. The activation phase of the drive signals supplied to the three-phase windings 12, 13 and 14 is determined by the control.

The time measuring part 101 of the rotation control part 54 measures the time interval T0 which corresponds to one period or a half period of the position pulse signal Dt. The phase adjusting block (comprising the first timing adjust part 102, the second timing adjust part 103 and the signal producing part 104) produces the first rotation activation control signals Pr1, Pr2 and Pr3 and the second rotation activation control signals Qr1, Qr2 and Qr3 in response to the measurement operation of the time measuring part 101. The first timing adjust part 102 generates the first timing signal Fa responding with the measurement result of the time measuring part 101 every first adjustment time T1. The first timing adjust part 102 then changes and shifts the first state output signal Jd and the first adjust signal Ja in response to the first timing signal Fa every first adjustment time T1. The first adjustment time T1 is substantially proportional to the time interval T0 and set at approximately ⅙ or ⅓ of the time interval T0. Accordingly, the first state output signal Jd and the first adjust signal Ja is changed and shifted in approximately six or three states. The second timing adjust part 103 generates the second timing signal Fb responding with the measurement result of the time measuring part 101 every second adjustment time T2. The second timing adjust part 103 then changes and shifts the second state output signal Je and the second adjust signal Jb in response to the second timing signal Fb every second adjustment time T2. The second adjustment time T2 is substantially proportional to the time interval T0 and set at approximately 1/60 or 1/30 of the time interval T0. Accordingly, the second state output signal Je and the second adjust signal Jb are changed and shifted in approximately 10 states.

The slope part 111 of the signal producing part 104 produces the slope signals Sa1, Sa2 and Sa3 which have substantially slope portions in response to the second adjust signal Jb. The shaping part 112 combines the slope signals Sa1, Sa2 and Sa3 in response to the first adjust signal Ja. The shaping part 112 then produces six composite signals which change smoothly in response to the slope signals in at least one of the rising and falling slope portions. As a result, the shaping part 112 produces the three-phase first rotation activation control signals Pr1, Pr2 and Pr3 and the three-phase second rotation activation control signals Qr1, Qr2 and Qr3 responding with the six composite signals. Each rotation activation control signal changes smoothly in at least one of the rising and falling slope portions in response to the slope signals.

The three first power amplifying parts 351, 352 and 353 of the power supplying part 20 amplify the three-phase first rotation activation control signals Pr1, Pr2 and Pr3, and supply the negative parts of the three-phase drive current signals I1, I2 and I3 to the three-phase windings 12, 13 and 14. The three second power amplifying parts 355, 356 and 357 of the power supplying part 20 amplify the three-phase second rotation activation control signals Qr1, Qr2 and Qr3, and supply the positive parts of the three-phase drive current signals I1, I2 and I3 to the three-phase windings 12, 13 and 14. Hence, the three-phase drive current signals I1, I2 and I3 to the three-phase windings 12, 13 and 14 change in synchronization with the rotation of the disk 1 and the rotor 11 and have smooth slopes. As a result, in Embodiment 1, the pulsation of the generated drive force is reduced significantly, and the vibration and acoustic noise of the disk 1 are also reduced greatly. It is thus possible to realize a disk drive apparatus suitable for carrying out recording and/or reproduction on a high-density disk.

Furthermore, the commanding part 32 detects the rotational speed of the disk 1 and the rotor 11 on the basis of one period or a half period of the position pulse signal Dt. The commanding part 32 then compares the actual rotational speed with the aimed speed and outputs a command signal Ac which is a speed control voltage responding with the comparison result. The amplitudes of the three-phase first activation control signals P1, P2 and P3 and the three-phase second activation control signals Q1, Q2 and Q3 are changed in response to the command signal Ac. Accordingly, in this embodiment, the starting voltages V1, V2 and V3 (and the drive current signals I1, I2 and I3) supplied to the three-phase windings 12, 13 and 14 are controlled in response to the command signal Ac. As a result, the rotational speed of the disk 1 and the rotor 11 can be controlled accurately.

In Embodiment 1, the current paths to the three-phase windings are altered accurately on the basis of substantially a single position signal. At the starting operation, the activation phase of the drive signals to the three-phase windings 12, 13 and 14 is forcibly subjected to the initial setting operation and the correction operation by the starting control part 52 in response to the level and the level change of the position signal. Furthermore, the activation phase of the drive signals to the three-phase windings 12, 13 and 14 is changed sequentially with respect to time in the forward rotation direction by the starting control part 52. The disk 1 and the rotor 11 can thus be started and accelerated securely and promptly in the forward rotation direction. Moreover, during the rotation operation, the activation phase of the drive signals to the three-phase windings 12, 13 and 14 is changed sequentially in the forward rotation direction by the rotation control part 54 in synchronization with the position signal in response to the level change of the position signal. Hence, the disk 1 and the rotor 11 can be rotated in the forward rotation direction in accurate timing. As a result, in Embodiment 1, for example, the disk 1 and the rotor 11 can be rotated by using a single position sensor. It is thus possible to realize a disk drive apparatus and a motor having fewer components and being simple in configuration and low in cost.

The starting operation part 51 includes an initial phase setting function for setting the activation phase of the drive signals to the three-phase windings 12, 13 and 14 in response to the level of the position signal in the vicinity of the occurrence of the activation start signal, a phase change function for changing the activation phase of the drive signals to the three-phase windings 12, 13 and 14 sequentially with response to time in the forward rotation direction by controlling the activation of the three first power amplifying parts 351, 352 and 353 and the three second power amplifying parts 355, 356 and 357, and a phase correction function for correcting the activation phase of the drive signals to the three-phase windings 12, 13 and 14 in response to both or one of the level changes of the position signal. As a result, the disk drive apparatus and the motor in accordance with Embodiment 1 can start and accelerate the disk 1 and the rotor 11 securely and promptly.

The starting operation part 51 includes the mode selecting part 53 for selection from the activation by the starting operation to the activation by the rotation control part 54 in response to the occurrence state of both or one of the level changes of the position signal. As a result, in the disk drive apparatus and the motor, the activation by the rotation control part 54 can be selected securely in a short time. When the number of the level changes of both or one of the level changes of the position signal reaches a desired number or more, the activation by the rotation control part 54 is selected by the mode selecting part 53 of the starting operation part 51. This is a first selection method. Alternatively, when the time interval of both or one of the level changes of the position signal reaches a predetermined value or less, the activation by the rotation control part 54 is selected by the mode selecting part 53 of the starting operation part 51. This is a second selection method. Hence, in Embodiment 1, the selection operation of the mode selecting part 53 is carried out stably and securely.

During the rotation operation, the rotation control part 54 comprises the time measuring part 101 for measuring the time interval T0 in response to both or one of the level changes of the position signal, and a phase adjusting block for changing the activation phase of the drive signals to the three-phase windings 12, 13 and 14 every adjust time in response to the measurement result of the time measuring part 101. Hence, in Embodiment 1, even when the rotational speed of the disk 1 and the rotor 11 changes significantly, the current paths to the three-phase windings 12, 13 and 14 can be formed by the accurate activation phases, and the pulsation of the generated drive force can be reduced. As a result, it is possible to realize a motor and a disk drive apparatus being low in vibration and acoustic noise.

During the rotation operation, the phase adjusting block of the rotation control part 54 produces a slope signal cyclically changing every first adjust time T1 which responds with the time interval T0 of the position signal and having substantially slope portions. The slope signal has two or more slope portions in the time interval T0 of the position signal. The phase adjusting block produces rotation activation control signals responding with this slope signal. Hence, by using the slope signal having a rising slope portion, a flat portion, a falling slope portion, etc., it is possible to easily produce rotation activation control signals changing substantially smoothly in response to the slope signal at least at one of the slope portions of the rising slope portion and the falling slope portion. As a result, the drive voltages and drive currents supplied to the three-phase windings change smoothly, whereby the pulsation of the generated drive force can be reduced. It is thus possible to realize a motor being low in vibration and acoustic noise and to realize a disk drive apparatus suitable for carrying out recording and/or reproduction on a high-density disk.

The phase adjusting block of the rotation control part 54 measures the time interval T0 of the position signal and obtains the first timing signal every first adjust time T1 which responds with the measurement result. The phase adjusting block then changes and shifts the first state signal (for example, the first state output signal or the first adjustment signal) in response to the generation of the first timing signal. Furthermore, the phase adjusting block obtains the second timing signal every second adjust time T2 which responds with the measurement result of the time interval T0 of the position signal. The phase adjusting block then changes and shifts the second state signal (for example, the second state output signal or the second adjustment signal) in response to the generation of the second timing signal. Accordingly, the current paths to the three-phase windings can be altered in accurate timing by using the rotation activation control signals produced in response to the first state signal and the second state signal.

The phase adjusting block of the rotation control part 54 can produce a slope signal having a substantially smooth slope in response to the second state signal. By producing rotation activation control signals (that is, activation control signals) which respond with the first state signal and the slope signal, it is possible to easily produce the rotation activation control signals (that is, the activation control signals) which change substantially smoothly in response to the slope signal in at least one of the rising and falling slope portions. As a result, in Embodiment 1, the drive currents supplied to the three-phase windings change smoothly, and the pulsation of the generated drive force can be reduced significantly. It is thus possible to realize a motor being low in vibration and acoustic noise and to realize a disk drive apparatus suitable for carrying out recording and/or reproduction on a high-density disk.

Since the first adjust time T1 is much longer than the second adjust time T2, the bit length of the first cyclic count circuit of the first timing adjust part can be made much longer than that of the second cyclic count circuit of the second timing adjust part. Accordingly, the effective bit length of the first adjust time T1 can be made longer than that of the second adjust time T2, and the first timing signal can be produced in accurate timing. In other words, even in the case of high-speed rotation of the disk, the effective bit length of the first adjust time T1 can be made long enough to reduce the influence of a bit error. Furthermore, since the first adjust time T1 and the second adjust time T2 respond with the measurement result, the current path alteration operation can be carried out in accurate timing even when the rotational speed of the disk changes. Accordingly, in Embodiment 1, even in the case when the aimed speed is changed inversely proportional to the disk radius by the commanding part 32, the current path alteration operation can be carried out in accurate timing at all times. As a result, it is possible to realize a disk drive apparatus and a motor capable of carrying out accurate rotation drive and speed control for the disk.

The phase adjusting block of the rotation control part 54 sets the first state signal of the first timing adjust part to substantially a first predetermined state in response to the measurement operation of the position signal by the time measuring part. Hence, it is possible to produce the first state signal synchronized with the phase of the position signal, and the phases of the activation control signals can be aligned accurately with the rotational position of the rotor. Accordingly, even in the case when the disk is accelerated or decelerated, the current path alteration operation can be carried out in accurate phases at all times. Furthermore, the phase adjusting block sets the second state signal of the second timing adjust part to substantially a second predetermined state in response to the changing operation of the first state signal depending on the generation of the first timing signal. Hence, the slope signal can be synchronized with the first timing signal in phase, and the slope portions of the activation control signals can be aligned accurately with the rotational position of the rotor 11. As a result, in Embodiment 1, it is possible to produce the activation control signals synchronized with the rotational position of the rotor 11, whereby the rotor 11 can be rotated accurately.

The phase adjusting block of the rotation control part 54 provides a desired delay time Td which responds with the measurement result of the position signal, and generates the measure operation signal Dp at the delay time Td after the generation of the detection edge of the position signal. The phase adjusting block then sets the first state signal of the first timing adjust part to a first predetermined state. As a result, in Embodiment 1, a phase difference can be provided between the actual alteration operation and the position signal. It is thus possible to provide freedom in the relative arrangement of the position sensor 41 and the windings 11, 12 and 13. In other words, in the configuration of Embodiment 1, the design freedom of the motor structure is made greater, and an optimum arrangement is made possible. The delay time Td may be provided when necessary and may be zero.

Figure 16:
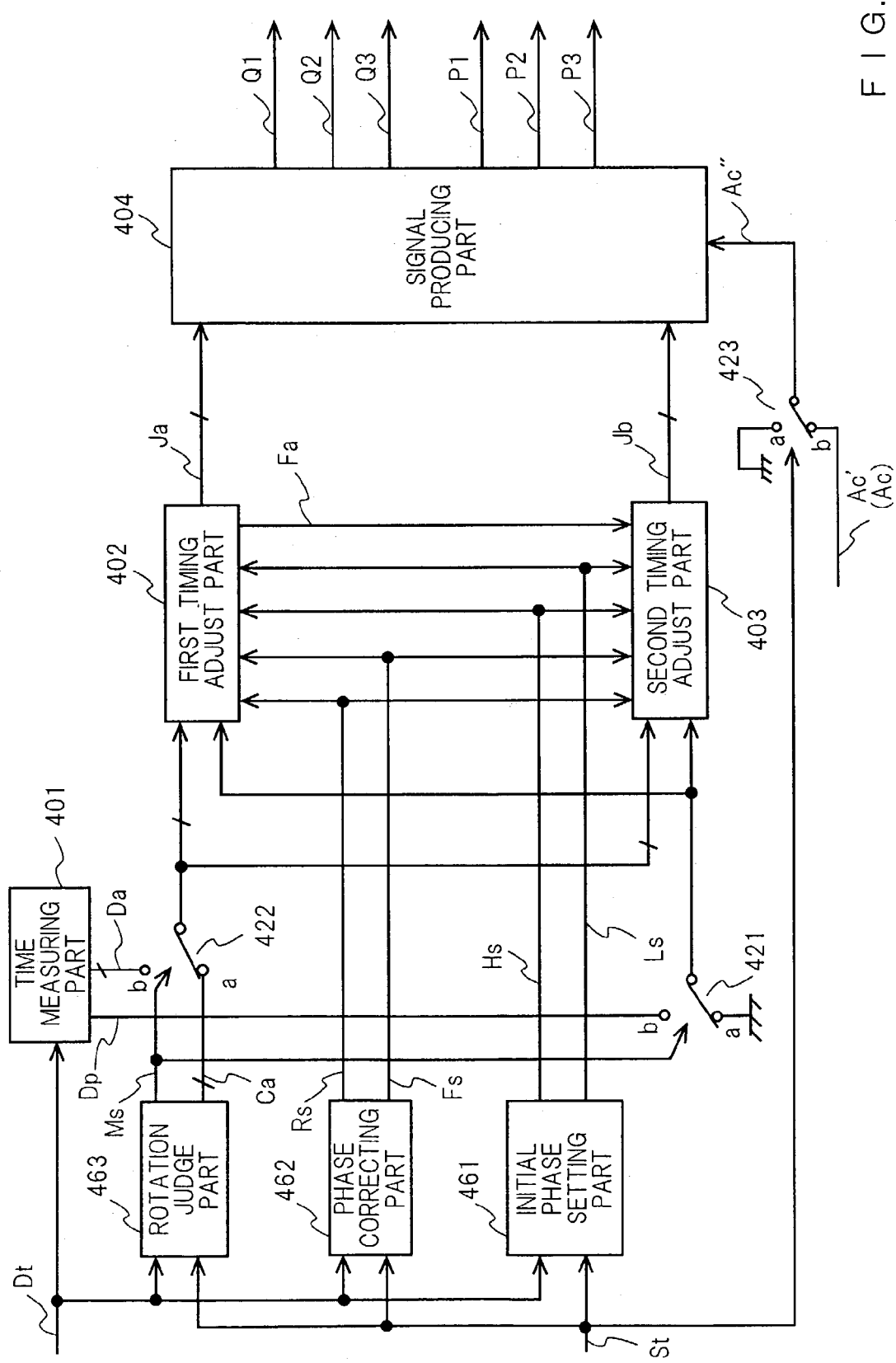
FIG. 16 is a view showing another configuration of the activation control part 31 in accordance with Embodiment 1.

FIG. 16 is a block diagram showing another configuration of the activation control part 31 of the activation operation block 45. The activation control part 31 shown in FIG. 16 comprises a time measuring part 401, a first timing adjust part 402, a second timing adjust part 403, a signal producing part 404, an initial phase setting part 461, a phase correcting part 462, a rotation judge part 463, a first switch part 421, a second switch part 422 and a third switch part 423.

During rotation operation (rotation mode Ms= "H"), a rotation control block comprises the time measuring part 401, the first timing adjust part 402, the second timing adjust part 403 and the signal producing part 404. In the rotation control block, a time measuring block comprises the time measuring part 401, and a phase adjusting block comprises the first timing adjust part 402, the second timing adjust part 403 and the signal producing part 404.

In addition, at the starting operation (starting mode Ms="L"), the starting operation block comprises the time measuring part 401, the first timing adjust part 402, the second timing adjust part 403, the signal producing part 404, the initial phase setting part 461, the phase correcting part 462, the rotation judge part 463, the first switch part 421, the second switch part 422 and the third switch part 423. In the starting operation block, an initial phase setting block comprises the initial phase setting part 461, a phase changing block comprises the first timing adjust part 402, the second timing adjust part 403, the signal producing part 404, the rotation judge part 463, the first switch part 421 and the second switch part 422, a phase correcting block comprises the phase correcting part 462, a mode select block comprises the rotation judge part 463, the first switch part 421, the second switch part 422 and the third switch part 423.

The configuration and operation of the time measuring part 401 are similar to those of the time measuring part 101 described above and shown in FIGS. 4 and 5. The configuration and operation of the first timing adjust part 402 are basically similar to those of the first timing adjust part 102 described above and shown in FIGS. 4 and 5 (the differences are described later). The configuration and operation of the second timing adjust part 403 are basically similar to those of the second timing adjust part 103 described above and shown in FIGS. 4 and 5 (the differences are described later). The configuration and operation of the signal producing part 404 are similar to those of the signal producing part 104 described above and shown in FIG. 4. Hence, the time measuring part 401, the first timing adjust part 402, the second timing adjust part 403 and the signal producing part 404 are not described in detail. In the descriptions of the configuration referring to FIG. 16, components and operations substantially similar to those of Embodiment 1 described above are designated by the same numerals.

First, the case when the rotor 11 and the disk 1 rotate and when the mode select signal Ms of the rotation judge part 413 is "H" (rotation mode) is described below.

When the mode select signal Ms is "H," the common contact of the first switch part 421 is connected to its contact b, and the common contact of the second switch part 422 is connected to its contact b. Since the start signal St is "H" (activation start), the common contact of the third switch part 423 is connected to its contact b.

Furthermore, the first initial set signal Hs and the second initial set signal Ls of the initial phase setting part 461 remain "L," and the first correct signal Rs and the second correct signal Fs of the phase correcting part 462 also remain "L." At this time, the time measuring part 401 measures the time interval T0 which corresponds to one period or a half period of the position pulse signal Dt, and outputs the measured data signal Da and the measure operation signal Dp in response to the measurement result.

In the rotation mode, the phase adjusting block comprising the first timing adjust part 402, the second timing adjust part 403 and the signal producing part 404 produces the three-phase first rotation activation control signals P1, P2 and P3 and the three-phase second rotation activation control signals Q1, Q2 and Q3, the timing values of which are adjusted in response to the measurement result of the time measuring part 401. The phase adjusting block then adjusts the activation phase of the drive signals to the three-phase windings 12, 13 and 14. In this embodiment, the three-phase first rotation activation control signals P1, P2 and P3 and the three-phase second rotation activation control signals Q1, Q2 and Q3, which are output from the signal producing part 404, directly become the three-phase first activation control signals and the three-phase second activation control signals.

On the arrival of the measure operation signal Dp, the first timing adjust part 402 receives the measured data signal Da and generates a first timing signal Fa every first adjust time T1 which responds with the measured data signal Da (having the time interval T0). In addition, the first timing adjust part 402 shifts its internal state in response to the first timing signal Fa and changes a first state signal in response to the internal state. The first timing adjust part 402 outputs a first adjust signal Ja responding with at least the first state signal. Furthermore, the first timing adjust part 402 sets the first state signal to substantially a first predetermined state in response to the measure operation signal Dp.

On the arrival of the measure operation signal Dp, the second timing adjust part 403 receives the measured data signal Da and generates a second timing signal every second adjust time T2 which responds with the measured data signal Da (having the time interval T0). In addition, the second timing adjust part 403 shifts its internal state in response to the second timing signal and changes a second state signal in response to the internal state. The second timing adjust part 403 outputs a second adjust signal Jb responding with the second state signal. Furthermore, the second timing adjust part 403 sets the second state signal to substantially a second predetermined state in response to at least the first timing signal Fa.

The signal producing part 404 comprises a slope part 111 and a shaping part 112 as shown in FIG. 4. The slope part 111 outputs a slope signal responding with the second adjust signal Jb. The shaping part 112 outputs the three-phase first rotation activation control signals P1, P2 and P3 and the three-phase second rotation activation control signals Q1, Q2 and Q3 responding with the first adjust signal Ja and the slope signal. The amplitudes of the first rotation activation control signals P1, P2 and P3 and the second rotation activation control signals Q1, Q2 and Q3 change in response to the input signal Ac" supplied to the signal producing part 404. In this embodiment, since the common contact of the third switch part 423 is connected to its contact b, the command signal Ac of the commanding part 32 is used as the input signal Ac" supplied to the signal producing part 404.

Accordingly, the waveforms of the position pulse signal Dt and the first activation control signal P1 are similar to the waveforms of the position pulse signal Dt and the first rotation activation control signal Pr1 shown in the parts (a) and (h) of FIG. 15, respectively. Similarly, the waveforms of the other first activation control signals P2 and P3 are similar to the waveforms of the first rotation activation control signal Pr2 and Pr3 shown in parts (i) and (j) of FIG. 15, respectively. Similarly, the waveforms of the second activation control signals Q1, Q2 and Q3 are similar to the waveforms of the second rotation activation control signal Qr1, Qr2 and Qr3 shown in parts (k) to (m) of FIG. 15, respectively.

Next, the case when the rotor 11 and the disk 1 are stopped and when the start signal is "L" (activation stop) is described below.

Since the start signal St is "L," the common contact of the third switch part 423 is connected to its contact a. Hence, the input signal Ac" supplied to the signal producing part 404 becomes "L," and all of the first activation control signals P1, P2 and P3 and the second activation control signals Q1, Q2 and Q3 become "L." As a result, the power supplying part 20 stops activation to the three-phase windings 12, 13 and 14.

When the start signal St becomes "H," (activation start), the mode select signal Ms of the rotation judge part 463 becomes "L" (starting mode). When the start signal St becomes "H" the common contact of the third switch part 423 is connected to its contact b. As a result, the command signal Ac of the commanding part 32 is input to the signal producing part 404. When the mode select signal Ms is "L," the common contact of the first switch part 421 is connected to its contact a, and the common contact of the second switch part 422 is connected to its contact a. Hence, instead of the measured data signal Da and the measure operation signal Dp of the time measuring part 401, the change data signal Ca of the rotation judge part 463 and "L" are input to the first timing adjust part 402 and the second timing adjust part 403, respectively.

In the starting mode, the phase changing block comprising the first timing adjust part 402, the second timing adjust part 403, the signal producing part 404, the rotation judge part 463, the first switch part 421 and the second switch part 422 produces the three-phase first starting activation control signals P1, P2 and P3 and the three-phase second starting activation control signals Q1, Q2 and Q3, the timing values of which correspond to the change data signal Ca. The phase changing block then changes the activation phase of the drive signals to the three-phase windings 12, 13 and 14 with respect to time. In this embodiment, the three-phase first starting activation control signals P1, P2 and P3 and the three-phase second starting activation control signals Q1, Q2 and Q3, which are output from the signal producing part 404, directly become the three-phase first activation control signals and the three-phase second activation control signals.

The initial phase setting part 461 receives the position pulse signal Dt and the start signal St. The initial phase setting part 461 then generates a pulse of the first initial set signal Hs or the second initial set signal Ls in response to the level of the position pulse signal Dt in the vicinity of the change time of the start signal St. When the position pulse signal Dt is "H," the initial phase setting part 461 generates a pulse of the first initial set signal Hs in response to the change of the start signal St.

The first timing adjust part 402 sets the internal state of the first state circuit to a first setting state in response to the pulse of the first initial set signal Hs, and inputs the change data signal Ca to the first cyclic count circuit. The second timing adjust part 403 sets the internal state of the second state circuit to a first setting state in response to the pulse of the first initial set signal Hs, and inputs the change data signal Ca to the second cyclic count circuit. As a result, the first timing adjust part 402 sequentially changes the internal state of the first state circuit in the forward rotation direction every first predetermined time Ts1 responding with the change data signal Ca. The second timing adjust part 403 sequentially changes the internal state of the second state circuit in the forward rotation direction every predetermined time responding with the change data signal Ca. As a result, the three-phase first starting activation control signals P1, P2 and P3 and the three-phase second starting activation control signals Q1, Q2 and Q3 of the signal producing part 404 are set to the first setting state in response to the pulse of the first initial set signal Hs. The activation phase of the drive signals to the three-phase windings 12, 13 and 14 is then changed sequentially with respect to time in the forward rotation direction. As a result, the rotor 11 and the disk 1 start rotation in the forward rotation direction.

When the position pulse signal Dt is "L," the initial phase setting part 461 generates a pulse of the second initial set signal Ls in response to the change of the start signal St. The first timing adjust part 402 sets the internal setting state of the first state circuit to a second setting state in response to the pulse of the second initial set signal Ls, and inputs the change data signal Ca to the first cyclic count circuit. The second timing adjust part 403 sets the internal state of the second state circuit to a second setting state in response to the pulse of the second initial set signal Ls, and inputs the change data signal Ca to the second cyclic count circuit. As a result, the first timing adjust part 402 sequentially changes the internal state of the first state circuit in the forward rotation direction every first predetermined time Ts1 responding with the change data signal Ca. The second timing adjust part 403 sequentially changes the internal state of the first state circuit in the forward rotation direction every predetermined time responding with the change data signal Ca. As a result, the three-phase first starting activation control signals P1, P2 and P3 and the three-phase second starting activation control signals Q1, Q2 and Q3 of the signal producing part 404 are set to the second setting state in response to the pulse of the second initial set signal Ls. The activation phase of the drive signals to the three-phase windings 12, 13 and 14 is then changed sequentially with respect to time in the forward rotation direction. As a result, the rotor 11 and the disk 1 start rotation in the forward rotation direction.

The phase correcting part 462 receives the position pulse signal Dt and the start signal St. When the start signal St is "H," the phase correcting part 462 detects both (or one) of the level changes of the position pulse signal Dt. The phase correcting part 462 then outputs a pulse of the first correct signal Rs in response to the level change (rising edge) from "L" to "H" of the position pulse signal Dt. Furthermore, the phase correcting part 462 outputs a pulse of the second correct signal Fs in response to the level change (falling edge) from "H" to "L" of the position pulse signal Dt.

The first timing adjust part 402 forcibly corrects the internal state of the first state circuit to a third setting state in response to a pulse of the first correct, signal Rs. The change data signal Ca is input again to the first cyclic count circuit. The second timing adjust part 403 forcibly corrects the internal state of the second state circuit to the third setting state in response to a pulse of the first correct signal Rs. The change data signal Ca is input again to the second cyclic count circuit. Accordingly, the first timing adjust part 402 sequentially changes the internal state of the first state circuit in the forward rotation direction every first predetermined time Ts1 responding with the change data signal Ca. The second timing adjust part 403 sequentially changes the internal state of the first state circuit in the forward rotation direction every predetermined time responding with the change data signal Ca. As a result, the three-phase first activation control signals P1, P2 and P3 and the three-phase second activation control signals Q1, Q2 and Q3 of the signal producing part 404 are forcibly corrected to the third setting state in response to the pulse of the first correct signal Rs. The activation phase of the drive signals to the three-phase windings 12, 13 and 14 is then changed sequentially with respect to time in the forward rotation direction. As a result, the rotor 11 and the disk 1 rotate further in the forward rotation direction.

The first timing adjust part 402 forcibly corrects the internal state of the first state circuit to a fourth setting state in response to a pulse of the second correct signal Fs. The change data signal Ca is input again to the first cyclic count circuit. The second timing adjust part 403 forcibly corrects the internal state of the second state circuit to the fourth setting state in response to a pulse of the second correct signal Fs. The change data signal Ca is input again to the second cyclic count circuit. Accordingly, the first timing adjust part 402 sequentially changes the internal state of the first state circuit in the forward rotation direction every first predetermined time Ts1 responding with the change data signal Ca. The second timing adjust part 403 sequentially changes the internal state of the first state circuit in the forward rotation direction every predetermined time responding with the change data signal Ca. As a result, the three-phase first starting activation control signals P1, P2 and P3 and the three-phase second starting activation control signals Q1, Q2 and Q3 of the signal producing part 404 are forcibly corrected to the fourth setting state in response to the pulses of the second correct signal Fs. The activation phase of the drive signals to the three-phase windings 12, 13 and 14 is then changed sequentially with respect to time in the forward rotation direction. As a result, the rotor 11 and the disk 1 rotate further in the forward rotation direction.

The rotation judge part 463 receives the position pulse signal Dt and the start signal St. The rotation judge part 463 then outputs the mode select signal Ms and the change data signal Ca in response to the occurrence states of both (or one) of the level changes of the position pulse signal Dt. The rotation judge part 463 is configured on the basis of two kinds of methods. In one of the methods (a first selection method), the mode select signal Ms is changed in response to the number of the level changes of the position pulse signal Dt. In the other method (a second selection method), the mode select signal Ms is changed in response to the time interval of the level changes of the position pulse signal Dt.

The first selection method is described below. After the start signal St is generated, the rotation judge part 463 counts the number of occurrence times of both (or one) of the level changes of the position pulse signal Dt. The rotation judge part 463 changes the change data signal Ca in response to the counting result of both (or one) of the level changes of the position pulse signal Dt. In the case when the counting result is less than a first predetermined number of times, the rotation judge part 463 outputs the change data signal Ca which has a large value. This makes a large change time interval Ts1 of the first starting activation control signals and the second starting activation control signals. In the case when the counting result becomes a first predetermined number of times or more, the rotation judge part 463 outputs the change data signal Ca which has a small value. This makes a small change time interval Ts2 of the first starting activation control signals and the second starting activation control signals. In other words, Ts1>Ts2. In addition, in the case when the counting result becomes a second predetermined number of times or more, the rotation judge part 463 changes the state of the mode select signal Ms from "L" (starting mode) to "H" (rotation mode). The value of the change data signal Ca may be constant (Ts1=Ts2).

The second selection method is described below. After the start signal St is generated, the rotation judge part 463 measures the time interval of both (or one) of the level changes of the position pulse signal Dt. The rotation judge part 463 changes the change data signal Ca in response to the time interval of both (or one) of the level changes of the position pulse signal Dt. In the case when the time interval is a first predetermined value or more, the rotation judge part 463 outputs the change data signal Ca which has a large value. This makes a large change time interval Ts1 of the first starting activation control signals and the second starting activation control signals. In the case when the time interval is less than the first predetermined number of times, the rotation judge part 463 outputs the change data signal Ca which has a small value. This makes a small change time interval Ts2 of the first starting activation control signals and the second starting activation control signals. In other words, Ts1>Ts2. In addition, in the case when the time interval of both (or one) of the level changes of the position pulse signal Dt is a second predetermined value or less, the rotation judge part 463 changes the state of the mode select signal Ms from "L" (starting mode) to "H" (rotation mode). The value of the change data signal Ca may be constant (Ts1=Ts2).

In the case when the activation control part 31 of the activation operation block 45 shown in FIG. 16 is used, it is possible to produce the first starting activation control signals and the second starting activation control signals responding with the slope signal. Accordingly, the activation of the three first power amplifying parts 351, 352 and 353 and the three second power amplifying parts 355, 356 and 357 of the power supplying part 20 is controlled by the three-phase first activation control signals P1, P2 and P3 and the three-phase second activation control signals Q1, Q2 and Q3 having smooth slope portions. Hence, the three-phase drive voltage signals V1, V2 and V3 and the three-phase drive current signals I1, I2 and I3 supplied to the three-phase windings 12, 13 and 14 are changed smoothly. As a result, motor starting and acceleration are carried out extremely quietly. It is thus possible to realize a motor and a disk drive apparatus being significantly low in vibration and acoustic noise.

Furthermore, in the activation control part 31 having the configuration shown in FIG. 16, the circuit for starting control can also be used as the circuit for rotation control, whereby the whole circuit configuration is simplified. Moreover, the motor and the disk drive apparatus incorporating the activation control part 31 shown in FIG. 16 can have the various advantages of the motor and the disk drive apparatus of Embodiment 1 described above and shown in FIG. 1 to FIG. 15.

In the activation control part 31 of the activation operation block 45, which has the configuration shown in FIG. 16, starting operation means comprises the first timing adjust part 402, the second timing adjust part 403, the signal producing part 404, the first switch part 421, the second switch part 422, the initial phase setting part 461, the phase correcting part 462 and the rotation judge part 463. The starting operation means has initial phase setting means, phase changing means, phase correcting means and mode, select means. The initial phase setting means comprises the initial phase setting part 461. The phase changing means comprises the first timing adjust part 402, the second timing adjust part 403, the signal producing part 404, the rotation judge part 463, the first switch part 421 and the second switch part 422. The phase correcting means comprises the phase correcting part 462. The mode select means comprises the first switch part 421, the second switch part 422, the third switch part 423 and the rotation judge part 463.

Furthermore, in the activation control part 31 having the configuration shown in FIG. 16, rotation control means comprises the time measuring part 401, the first timing adjust part 402, the second timing adjust part 403 and the signal producing part. 404. The rotation control means has time measuring means and phase adjusting means. The time measuring means comprises the time measuring part 401. The phase adjusting means comprises the first timing adjust part 402, the second timing adjust part 403 and the signal producing part 404.

<<Embodiment 2>>

Figure 17:
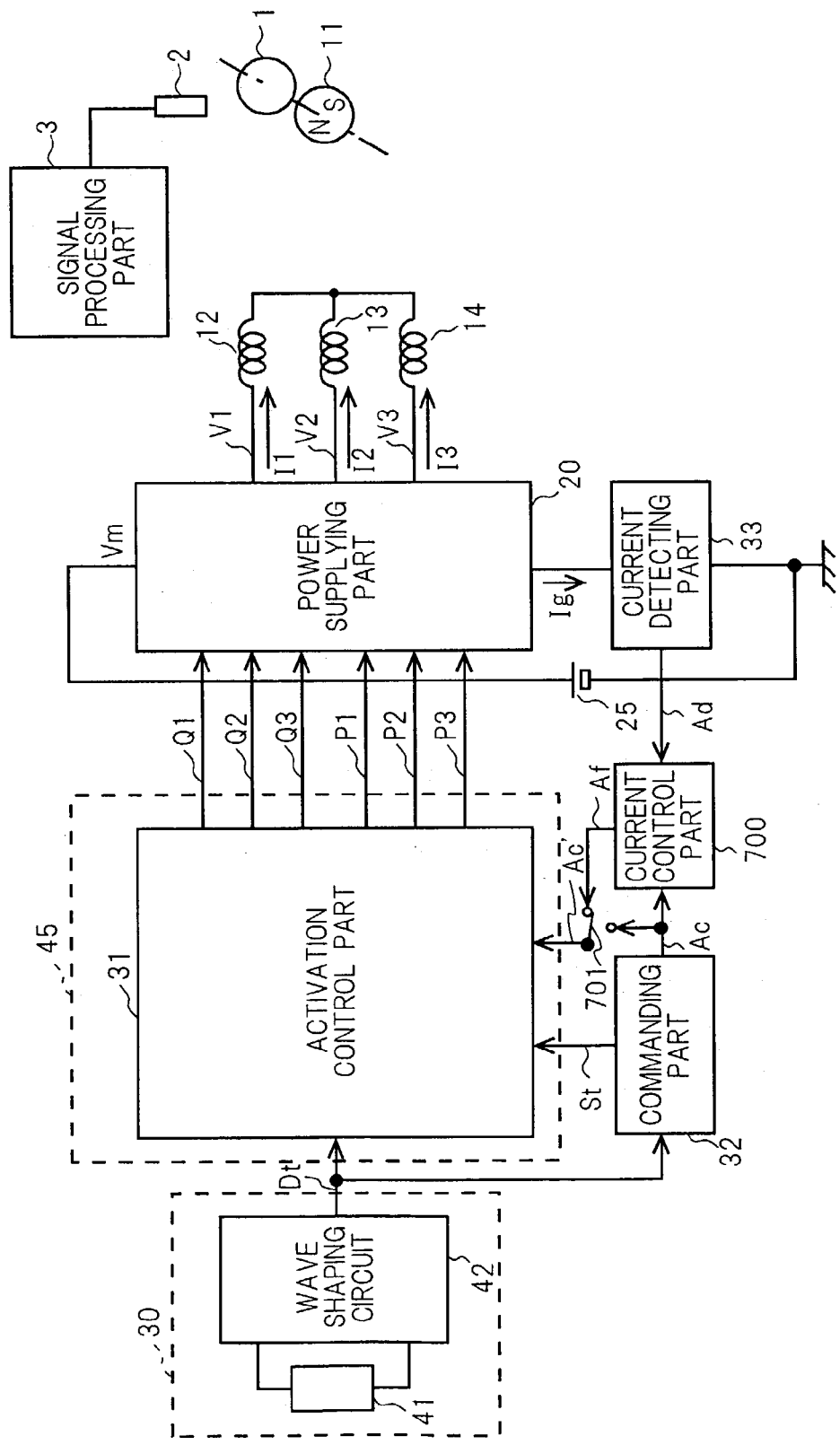
FIG. 17 is a block diagram showing the overall configuration in accordance with Embodiment 2 of the present invention.

Next, a motor and a disk drive apparatus including the motor in accordance with Embodiment 2 of the present invention is described below. FIG. 17 is a block diagram showing the overall configuration of the disk drive apparatus including the motor in accordance with Embodiment 2. In Embodiment 2, a current detecting part 33, a current control part 700, etc. are additionally provided for the configuration of Embodiment 1 described above. Components and operations substantially similar to those of Embodiment 1 described above are designated by the same numerals, and their descriptions are omitted.

The current detecting part 33 shown in FIG. 17 detects a conducted current or a composed supply current Ig supplied from the voltage supplying part 25 to the three-phase windings 12, 13 and 14 via the three first power amplifying parts of the power supplying part 20. The current detecting part 33 then outputs a current detection signal Ad responding with the composed supply current Ig. The current control part 700 compares the current detection signal Ad of the current detecting part 33 with the command signal Ac of the commanding part 32 in an analog form, and outputs a current control signal Af responding with the voltage difference therebetween.

The activation control part 31 of the activation operation block 45 produces the three-phase first activation control signals P1, P2 and P3 and the three-phase second activation control signals Q1, Q2 and Q3 responding with the position pulse signal Dt of the position detecting part 30. The detailed. configuration of the activation control part 31 is similar to that shown in FIG. 16 (or FIG. 2) described above, and receives an input signal Ac' selected by a switch part 701. The switch part 701 selects the command signal Ac of the commanding part 32 or the current control signal Af of the current control part 700. The input signal supplied from the switch part 701 to the activation control part 31 is assumed to be Ac'.

In the case when the switch part 701 selects the command signal Ac supplied from the commanding part 32, the configuration becomes similar to that of Embodiment 1 described above, and its detailed explanation is omitted.

In the case when the switch part 701 selects the current control signal Af supplied from the current control part 700, the amplitudes of the first activation control signals P1, P2 and P3 and the second activation control signals Q1, Q2 and Q3 change in response to the current control signal Af. In Embodiment 2, the current detecting part 33, the current control part 700, the activation control part 31 and the power supplying part 20 form a current control loop. The composed supply current Ig supplied to the three-phase windings 12, 13 and 14 is controlled accurately in response to the command signal Ac. Furthermore, the three-phase first activation control signals P1, P2 and P3 and the three-phase second activation control signals Q1, Q2 and Q3 become smooth current signals which have substantially slope portions responding with the slope signal by using the first adjust signal and the second adjust signal which respond with the position pulse signal Dt. As a result, the pulsation of the generated drive force becomes small during the starting operation and the rotation operation. It is thus possible to realize a motor and a disk drive apparatus being low in vibration and acoustic noise.

Furthermore, Embodiment 2 can also have various advantages similar to those of the configuration of Embodiment 1 described above.

<<Embodiment 3>>

Figure 18:
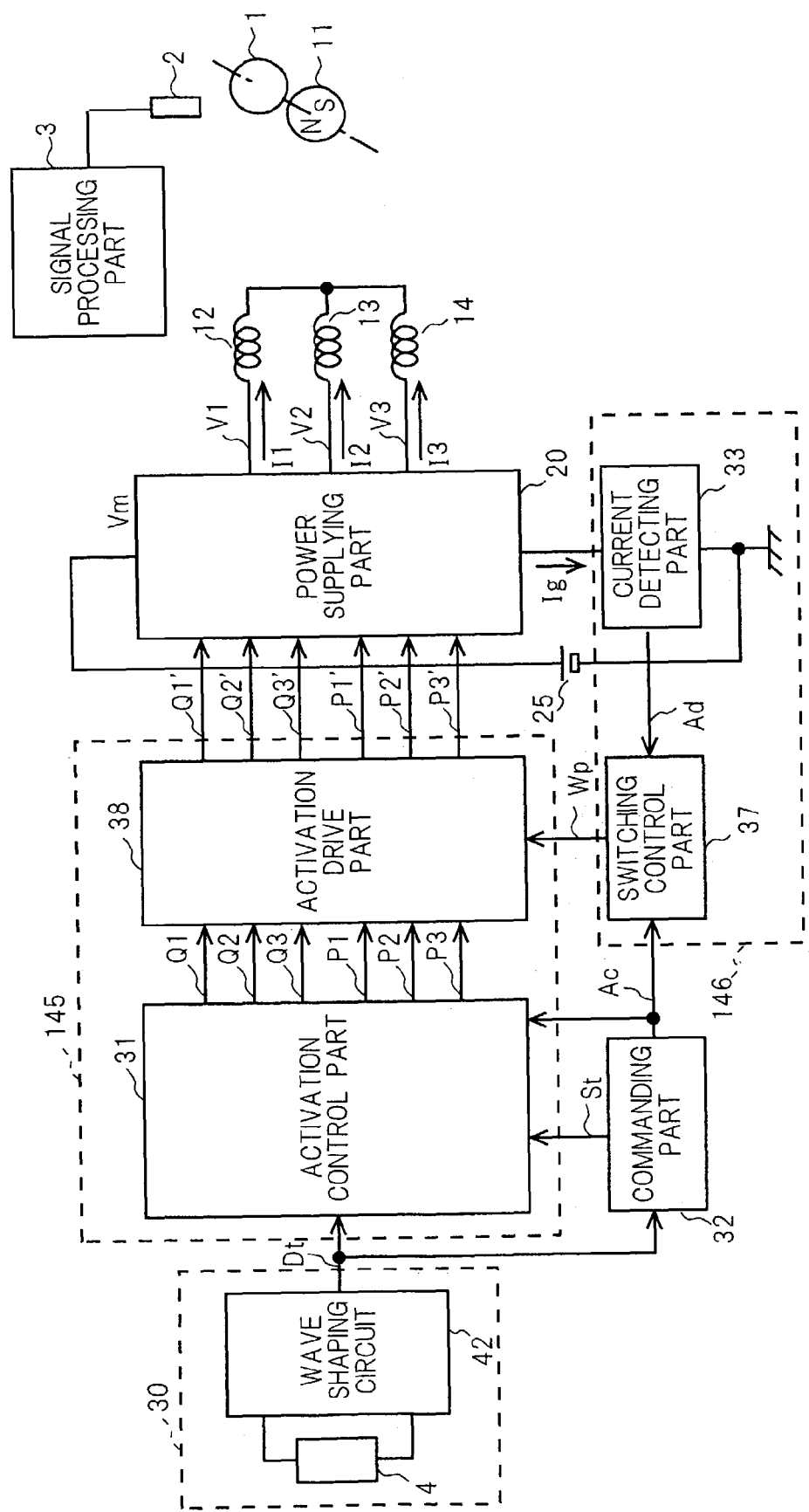
FIG. 18 is a block diagram showing the overall configuration in accordance with Embodiment 3 of the present invention.

FIG. 18 to FIG. 21 show a motor and a disk drive apparatus including the motor in accordance with Embodiment 3 of the present invention. FIG. 18 is a block diagram showing the overall configuration of the disk drive apparatus which includes the motor in accordance with Embodiment 3. Embodiment 3 is configured so as to include a current detecting part 33, a switching control part 37 and an activation drive part 38. The activation control part 31 and the activation drive part 38 constitute an activation operation block 145. The current detecting part 33 and the switching control part 37 constitute a switching operation block 146. Components of Embodiment 3 similar to those of Embodiment 1 described above are designated by the same numerals, and their explanations are omitted.

Figure 19:
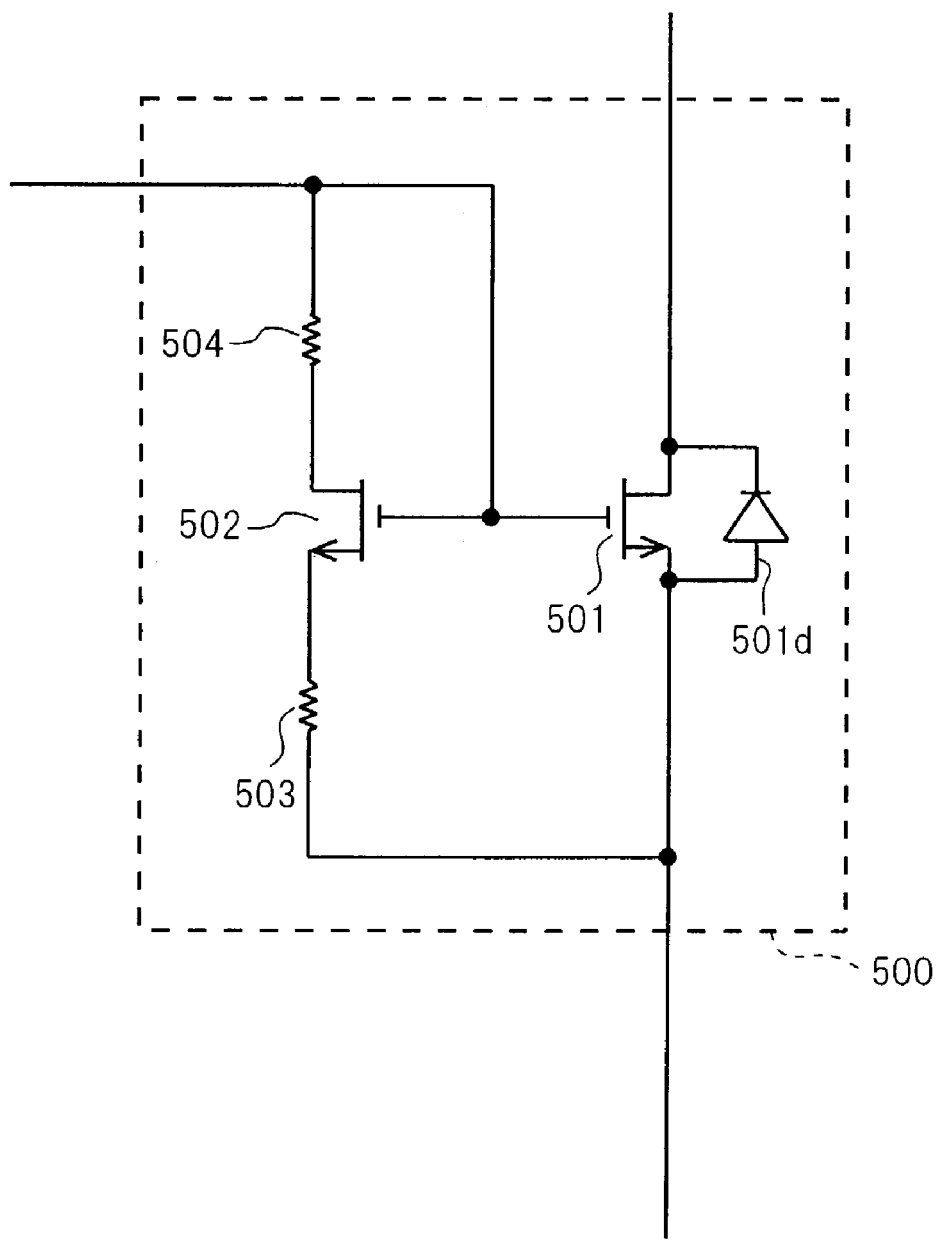
FIG. 19 is a circuit diagram showing a first power amplifying part 500 in accordance with Embodiment 3.
Figure 20:
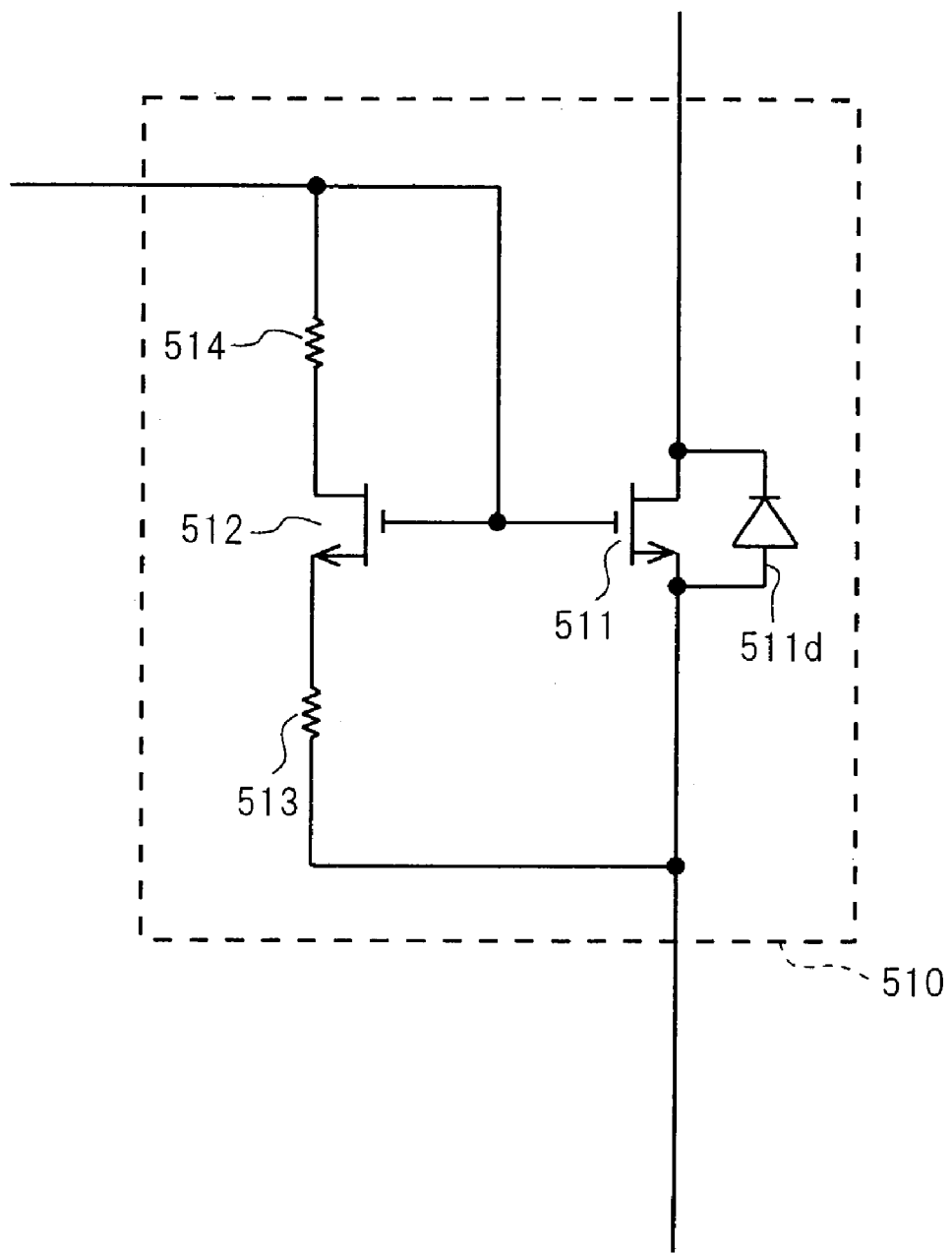
FIG. 20 is a circuit diagram showing a second power amplifying part 510 in accordance with Embodiment 3.

The power supplying part 20 comprises three first power amplifying parts 351, 352 and 353 and three second power amplifying parts 355, 356 and 357 (see FIG. 8). The power supplying part 20 alters current paths to the three-phase windings 12, 13 and 14 as the disk 1 and the rotor 11 rotate. FIG. 19 is a circuit diagram showing another configuration of each of the first power amplifying parts. FIG. 20 is a circuit diagram showing another configuration of each of the second power amplifying parts.

The first power amplifying part 500 shown in FIG. 19 comprises a first FET power transistor 501, a first power diode 501d, an FET transistor 502 and resistors 503 and 504. The first FET power transistor 501 is an N-channel MOS-type FET power transistor. The first power diode 501d is connected in the reverse direction from the current flow-out terminal side to the current flow-in terminal side of the first FET power transistor 501. In this embodiment, the first power diode 501d is formed by the parasitic diode of the first FET power transistor 501. The first FET power transistor 501 and the FET transistor 502 constitute an FET power current-mirror circuit. The FET power current-mirror circuit amplifies the input current supplied to the activation control terminal side by a predetermined amplification factor (approximately 100, for example), and outputs the amplified current. The resistors 503 and 504 are inserted when necessary to improve the amplification characteristics of the FET power current-mirror circuit. In other words, both or one of the resistors 503 and 504 may be inserted, or none of them may be used.

The second power amplifying part 510 shown in FIG. 20 comprises a second FET power transistor 511, a second power diode 511d, an FET transistor 512 and resistors 513 and 514. The second FET power transistor 511 is an N-channel MOS-type FET power transistor. The second power diode 511d is connected in the reverse direction from the current flow-out terminal side to the current flow-in terminal side of the second FET power transistor 511. In this embodiment, the second power diode 511d is formed by the parasitic diode of the second FET power transistor 511. The second FET power transistor 511 and the FET transistor 512 constitute an FET power current-mirror circuit. The FET power current-mirror circuit amplifies the input current supplied to the activation control terminal side by a predetermined amplification factor (approximately 100, for example), and outputs the amplified current. The resistors 513 and 514 are inserted when necessary to improve the amplification characteristics of the FET power current-mirror circuit. In other words, both or one of the resistors 513 and 514 may be inserted, or none of them may be used.

The current detecting part 33 of the switching operation block 146 shown in FIG. 18 detects the composed supply current Ig supplied to the three-phase windings 12, 13 and 14 from the voltage supplying part 25 through the three first power amplifying parts 351, 352 and 353 of the power supplying part 20. The current detecting part 33 then outputs the current detection signal Ad responding with the composed supply current Ig. This composed supply current Ig corresponds to the composite value of the negative parts of the three-phase drive current signals I1 I2 and I3 supplied to the three-phase windings 12, 13 and 14. The switching control part 37 compares the current detection signal Ad of the current detecting part 33 with the command signal Ac of the commanding part 32 and outputs a high-frequency switching pulse signal Wp responding with the comparison result.

The activation operation block 145 shown in FIG. 18 comprises the activation control part 31 and the activation drive part 38.

The configuration and operation of the activation control part 31 are similar to those shown in FIG. 16 (or FIG. 2) described above. Hence, the detailed description of the activation control part 31 is omitted.

Figure 21:
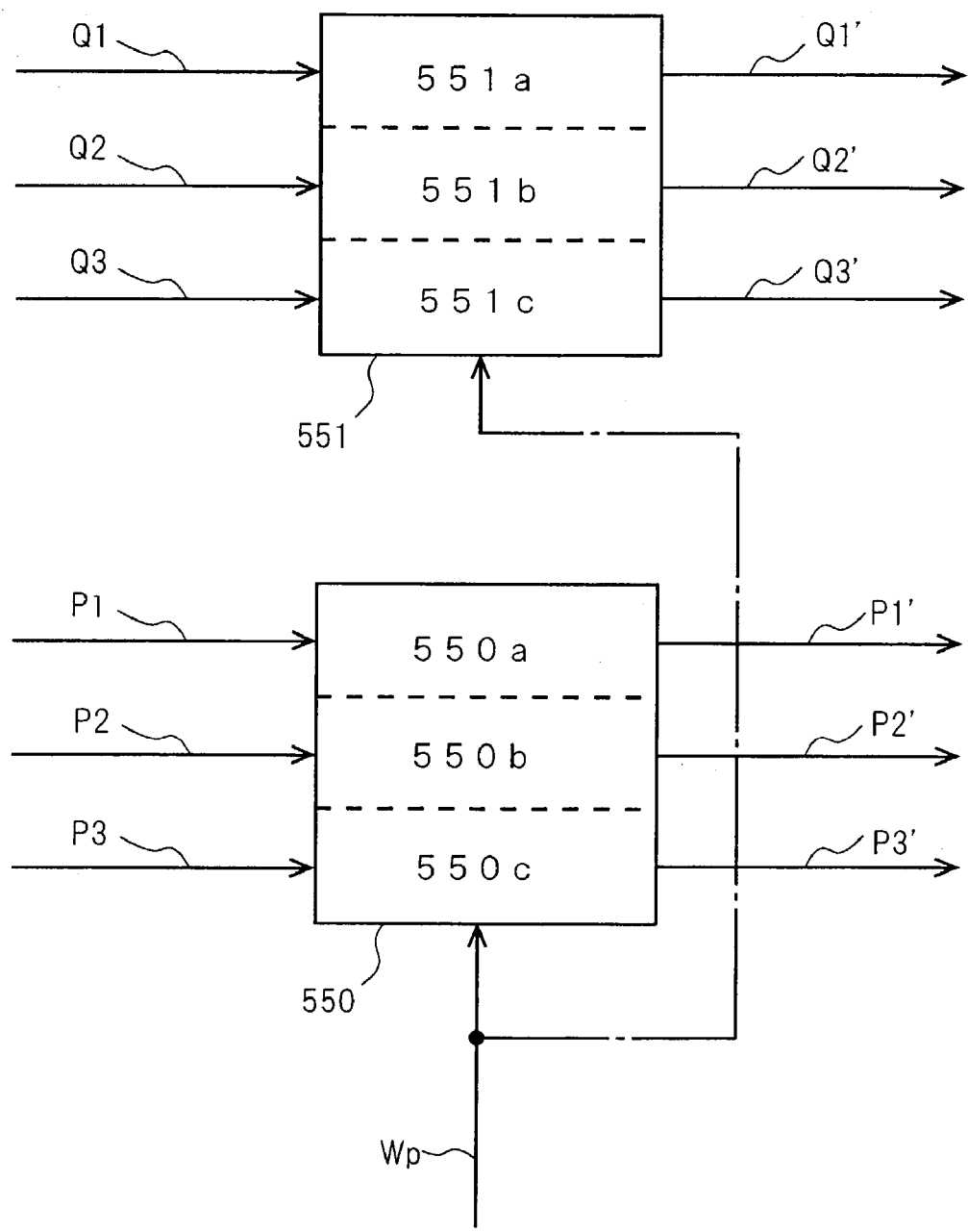
FIG. 21 is a view showing the configuration of an activation drive part 38 in accordance with Embodiment 3.

The activation drive part 38 receives the three-phase first activation control signals P1, P2 and P3 and the three-phase second activation control signals Q1, Q2 and Q3 of the activation control part 31. The activation drive part 38 also receives the switching pulse signal Wp of the switching control part 37. The activation drive part 38 converts the three-phase first activation control signals P1, P2 and P3 and/or the three-phase second activation control signals Q1, Q2 and Q3 into high-frequency pulses in response to the switching pulse signal Wp. The activation drive part 38 then produces three-phase third activation control signals P1', P2' and P3' and three-phase fourth activation control signals Q1', Q2' and Q3'. FIG. 21 is a block diagram showing the detailed configuration of the activation drive part 38.

The activation drive part 38 shown in FIG. 21 comprises a first activation operation part 550 and a second activation operation part 551. A first activation operating circuit 550a of the first activation operation part 550 produces the third activation control signal P1' by converting the first activation control signal P1 into pulses in response to the switching pulse signal Wp. The third activation control signal P1' becomes a current signal having a value substantially proportional to the first activation control signal P1 when the switching pulse signal Wp is "H" (high potential state). When the switching pulse signal Wp is "L" (low potential state), the third activation control signal P1' becomes a zero current signal or a desired OFF current signal, regardless of the value of the first activation control signal P1. Similarly, a first activation operating circuit 550b of the first activation operation part 550 produces the third activation control signal P2' by converting the first activation control signal P2 into pulses in response to the switching pulse signal Wp. Similarly, a first activation operating circuit 550c of the first activation operation part 550 produces the third activation control signal P3' by converting the first activation control signal P3 into pulses in response to the switching pulse signal Wp. In other words, the three-phase third activation control signals P1', P2' and P3' are three-phase current pulse signals which respond with the three-phase first activation control signals P1, P2 and P3 and are simultaneously converted into pulses in response to the switching pulse signal Wp.

A second activation operating circuit 551*a* of the second activation operation part 551 produces the fourth activation control signal Q1' having a value substantially proportional to the second activation control signal Q1. Similarly, a second activation operating circuit 551*b* of the second activation operation part 551 produces the fourth activation control signal Q2' having a value substantially proportional to the second activation control signal Q2. Similarly, a second activation operating circuit 551*c* of the second activation operation part 551 produces the fourth activation control signal Q3' having a value substantially proportional to the second activation control signal Q3. In other words, the three-phase fourth activation control signals Q1', Q2' and Q3' are three-phase current pulse signals responding with the three-phase second activation control signals Q1, Q2 and Q3. When necessary, the second activation operating circuits 551*a*, 551*b* and 551*c* of the second activation operation part 551 may produce the fourth activation control signals Q1', Q2' and Q3' by converting the second activation control signals Q1, Q2 and Q3 into pulses in response to the switching pulse signal Wp.

In FIG. 18, the three-phase third activation control signals P1', P2' and P3' are supplied to the activation control terminals of the three first power amplifying parts 351, 352 and 353 of the power supplying part 20. The FET power current-mirror circuit of the first power amplifying part 351 of the first phase amplifies the third activation control signals P1' which is the input current supplied to the activation control terminal, and outputs the amplified signal. As a result, the first FET power transistor of the first power amplifying part 351 performs high-frequency switching operation in response to the third activation control signal P1'. Hence, the first FET power transistor converts the drive voltage signal V1 supplied to the winding 12 into a pulsing voltage, thereby supplying the negative part of the drive current signal I1 to the winding 12. Similarly, the FET power current-mirror circuit of the first power amplifying part 352 of the second phase amplifies the third activation control signal P2' which is the input current supplied to the activation control terminal, and outputs the amplified signal. As a result, the first FET power transistor of the first power amplifying part 352 performs high-frequency switching operation in response to the third activation control signal P2'. Hence, the first FET power transistor converts the drive voltage signal V2 supplied to the winding 13 into a pulsing voltage, thereby supplying the negative part of the drive current signal I2 to the winding 13. Similarly, the FET power current-mirror circuit of the first power amplifying part 353 of the third phase amplifies the third activation control signal P3' which is the input current supplied to the activation control terminal, and outputs the amplified signal. As a result, the first FET power transistor of the first power amplifying part 353 performs high-frequency switching operation in response to the third activation control signal P3'. Hence, the first FET power transistor converts the drive voltage signal V3 supplied to the winding 14 into a pulsing voltage, thereby supplying the negative part of the drive current signal I3 to the winding 14.

The three-phase fourth activation control signals Q1', Q2' and Q3' are supplied to the activation control terminals of the three second power amplifying parts 355, 356 and 357 of the power supplying part 20. The FET power current-mirror circuit of the second power amplifying part 355 of the first phase amplifies the fourth activation control signals Q1' which is the input current supplied to the activation control terminal, and outputs the,amplified signal, thereby supplying the positive part of the drive current signal I1 to the winding 12. Similarly, the FET power current-mirror circuit of the second power amplifying part 356 of the second phase amplifies the fourth activation control signal Q2' which is the input current supplied to the activation control terminal, and outputs the amplified signal, thereby supplying the positive part of the drive current signal I2 to the winding 13. Similarly, the FET power current-mirror circuit of the second power amplifying part 357 of the third phase amplifies the fourth activation control signal Q3' which is the input current supplied to the activation control terminal, and outputs the amplified signal, thereby supplying the positive part of the drive current signal I3 to the winding 14.

The current detecting part 33 shown in FIG. 18 outputs the pulsing current detection signal Ad which is substantially proportional to the composed supply current Ig supplied to the three-phase windings 12, 13 and 14 from the voltage supplying part 25. The switching control part 37 compares the current detection signal Ad with the command signal Ac and produces the high-frequency switching pulse signal Wp responding with the comparison result. The switching pulse signal Wp is a high-frequency signal generally having a frequency in the range from 20 to 500 kHz. The activation drive part 38 converts the first activation control signals P1, P2 and P3 into pulses in response to the switching pulse signal Wp, and produces the three-phase third activation control signals P1', P2' and P3' responding with the switching pulse signal Wp. The three first power amplifying parts 351, 352 and 353 (see FIG. 8) of the power supplying part 20 perform high-frequency switching operation in response to the third activation control signals P1', P2' and P3'. As a result, the peak value of the composed supply current Ig is controlled in response to the command signal Ac. Accordingly, the three-phase drive current signals I1, I2 and I3 supplied to the three-phase windings 12, 13 and 14 can be controlled accurately in response to the command signal Ac. This can remarkably reduce the pulsation of the generated drive force. In other words, in Embodiment 3, the vibration and acoustic noise of the disk 1 and the rotor 11 can be reduced remarkably. Furthermore, in Embodiment 3, the frequency of the switching pulse signal Wp is not required to be constant, but may be changed depending on the rotational speed and the load situation.

The activation control part 31 has the configuration shown in FIG. 16 described above and outputs the three-phase first activation control signals P1, P2 and P3 and the three-phase second activation control signals Q1, Q2 and Q3 responding with the position pulse signal Dt. At the starting operation immediately after the start signal St is generated, the activation control part 31 outputs the first activation control signals and the second activation control signals for starting control as the three-phase first activation control signals P1, P2 and P3 and the three-phase second activation control signals Q1, Q2 and Q3. During the rotation operation after the rotor 11 is started and accelerated, the activation control part 31 outputs the first rotation activation control signals and the second rotation activation control signals for rotation control as the three-phase first activation control signals P1, P2 and P3 and the three-phase second activation control signals Q1, Q2 and Q3. In each of the three-phase first activation control signals P1, P2 and P3 and the three-phase second activation control signals Q1, Q2 and Q3, at least one of the rising and falling slope portions changes smoothly in response to the slope signal of the signal producing part 404. The amplitudes of the three-phase first activation control signals P1, P2 and P3 and the three-phase second activation control signals Q1, Q2 and Q3 change in response to the command signal Ac of the commanding part 32. The configuration and operation of the activation control part 31 shown in FIG. 16 have already been described.

The activation drive part 38 produces the three-phase third activation control signals P1', P2' and P3' responding with the three-phase first activation control signals P1, P2 and P3 and the switching pulse signal Wp. The three first power amplifying parts 351, 352 and 353 perform high-frequency switching operation in response to the third activation control signals P1', P2' and P3'. Furthermore, the activation drive part 38 produces the three-phase fourth activation control signals Q1', Q2' and Q3' responding with the three-phase second activation control signals Q1, Q2 and Q3 (and the switching pulse signal Wp). The three second power amplifying parts 355, 356 and 357 operate in response to the three-phase fourth activation control signals Q1', Q2' and Q3'. As a result, the drive current signals I1, I2 and I3 supplied to the three-phase windings 12, 13 and 14 are altered smoothly. This reduces the pulsation of the generated drive force. In other words, the vibration and acoustic noise of the disk 1 and the rotor 11 can be reduced remarkably.

In Embodiment 3, as described above, the power transistors for supplying the drive currents to the windings 12, 13 and 14 perform ON-OFF high-frequency switching operation, whereby the power losses of the power transistors are reduced remarkably. In other words, the first power transistors of the first power amplifying parts 351, 352 and 353 perform ON-OFF high-frequency switching operation. The second power transistors of the second power amplifying parts 355, 356 and 357 also perform ON-OFF high-frequency switching operation. This remarkably reduces the power losses of the first and second power transistors. Hence, the heat generation of the motor and the disk drive apparatus can be reduced remarkably. As a result, starting and acceleration can be carried out by using large currents, whereby starting can be carried out securely in a short time. In addition, the disk drive apparatus can carry out recording and/or reproduction stably on a recordable disk.

In Embodiment 3, the current detection signal Ad is produced, which responds with the composed supply current supplied to the three-phase windings 12, 13 and 14 from the voltage supplying part 25. In addition, the switching pulse signal Wp is also produced, which responds with the current detection signal Ad and the command signal Ac. In response to the switching pulse signal Wp, at least one of the three first power amplifying parts 351, 352 and 353 and the three second power amplifying parts 355, 356 and 357 of the power supplying part 20 is subjected to high-frequency switching operation. Therefore, it is possible to carry out accurate current control responding with the command signal Ac. It is also possible to realize a disk drive apparatus and a motor being high in performance and low in power consumption. In particular, the current detection signal is produced, which is directly proportional or substantially proportional to the composed supply current supplied to the three-phase windings 12, 13 and 14 from the voltage supplying part 25. The single switching pulse signal is then produced depending on the result of the comparison between the current detection signal Ad and the command signal Ac. Hence, the peak value of the composed supply current supplied to the three-phase windings 12, 13 and 14 from the voltage supplying part 25 can be directly controlled in response to the command signal. Accurate current control is thus made possible. Furthermore, since one or two of the first power amplifying parts are subjected to high-frequency switching operation simultaneously in response to the single switching pulse signal Wp, the configuration for the high-frequency switching operation becomes very simple and can be attained at low cost. The configuration of the current detecting part is not restricted to that of the embodiment wherein the pulsing current detection signal directly proportional to the composed activation current is produced. The current detecting part may be configured so as to output a current detection signal smoothed by a filter or the like. Furthermore, in addition to the first power amplifying parts, the second power amplifying parts may also be subjected to high-frequency switching operation.

Still further, Embodiment 3 can also have various advantages similar to those of Embodiment 1 or Embodiment 2 described above.

<<Embodiment 4>>

Figure 22:
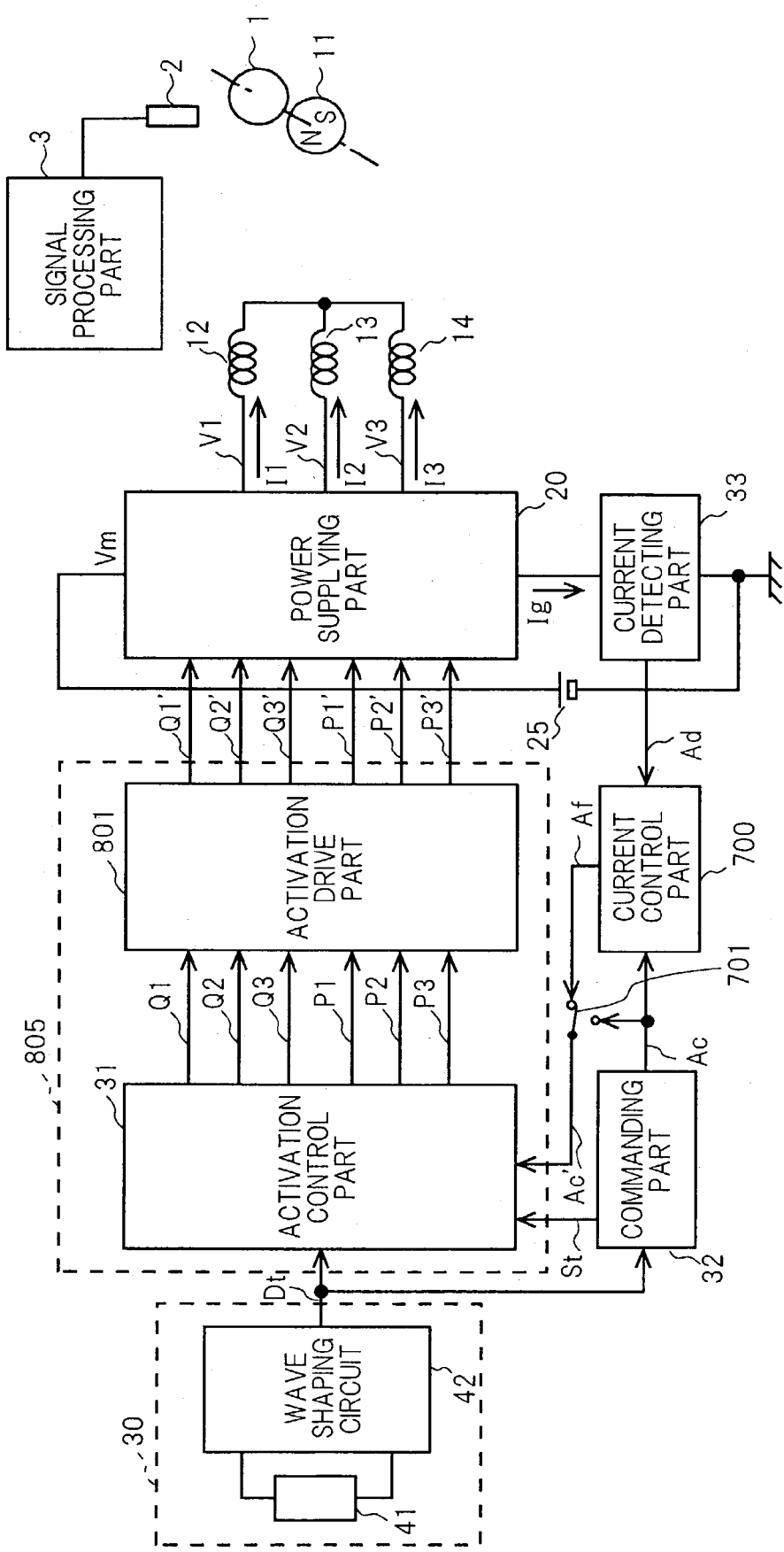
FIG. 22 is a block diagram showing the overall configuration in accordance with Embodiment 4 of the invention.

FIGS. 22 to 25 show a motor and a disk drive apparatus including the motor in accordance with Embodiment 4 of the present invention. FIG. 22 is a block diagram showing the overall configuration of the disk drive apparatus which includes the motor in accordance with Embodiment 4. Embodiment 4 includes an activation drive part 801 in addition to the configuration of Embodiment 2 described above. Components of Embodiment 4 similar to those of Embodiment 1, Embodiment 2 and Embodiment 3 described above are designated by the same numerals, and their descriptions are omitted.

An activation control block 805 shown in FIG. 22 comprises an activation control part 31 and an activation drive part 801. The activation control part 31 produces three-phase first activation control signals P1, P2 and P3 and three-phase second activation control signals Q1, Q2 and Q3 responding with the position pulse signal Dt of the position detecting part 30. The detailed configuration of the activation control part 31 is similar to that shown in FIG. 16 (or FIG. 2) described above, and its detailed description is omitted. A switch part 701 selects either the command signal Ac of the commanding part 32 or the current control signal Af of a current control part 700. The input signal from the switch part 701 to the activation control part 31 is assumed to be Ac'.

Figure 23:
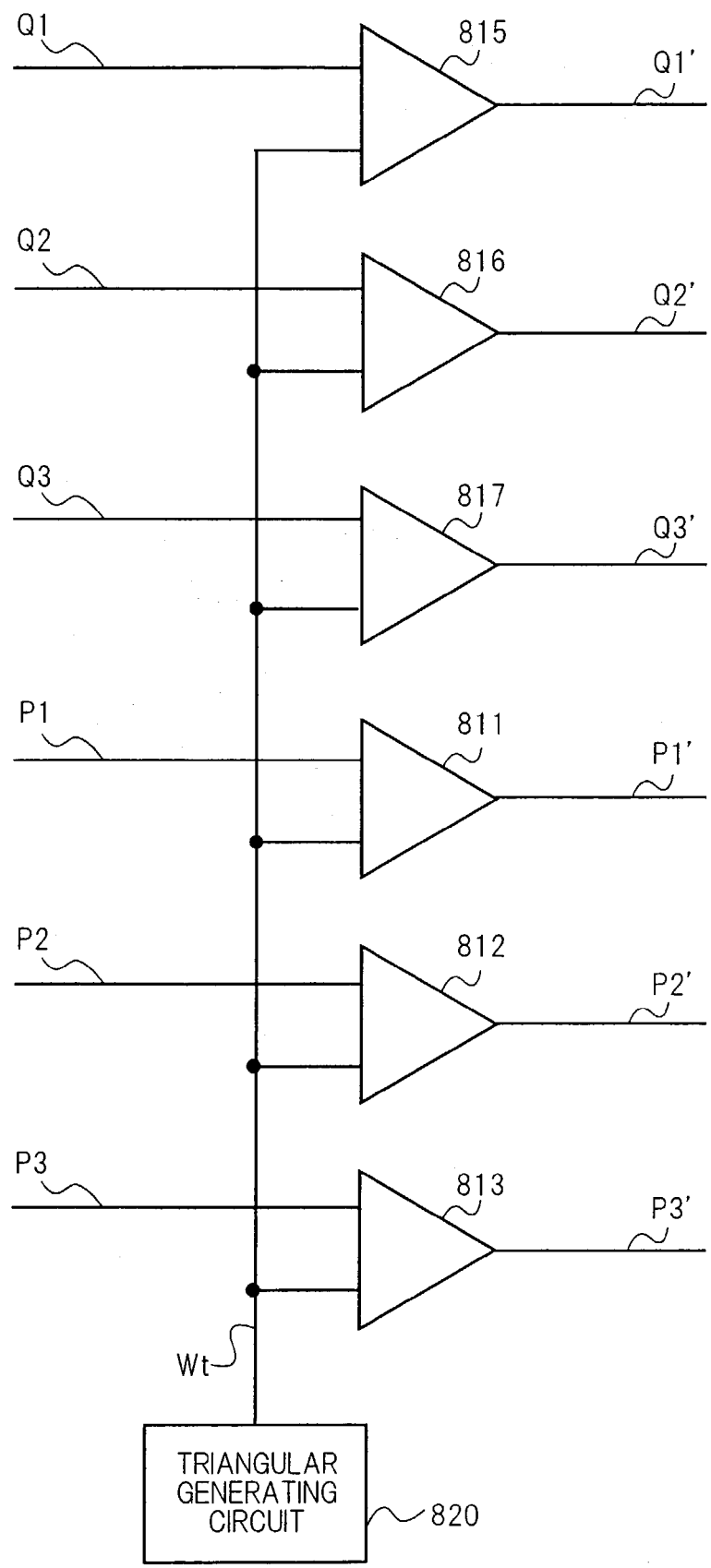
FIG. 23 is a view showing a configuration of the activation drive part 801 in accordance with Embodiment 4.

The activation drive part 801 shown in FIG. 22 produces three-phase third activation control signals P1', P2' and P3' and three-phase fourth activation control signals Q1', Q2' and Q3' in response to the three-phase first activation control signals P1, P2 and P3 and the three-phase second activation control signals Q1, Q2 and Q3 of the activation control part 31. FIG. 23 is a circuit diagram showing the detailed configuration of the activation drive part 801.

The activation drive part 801 shown in FIG. 23 comprises six comparator circuits 811, 812, 813, 815, 816 and 817 and a triangular generating circuit 820. The triangular generating circuit 820 outputs a triangular signal Wt having a predetermined frequency. In Embodiment 4, the frequency of the triangular signal Wt is set at a predetermined frequency in the range from 10 to 500 kHz. The triangular signal Wt may be a saw tooth signal. The comparator 811 compares the first activation control signal P1 with the triangular signal Wt, and produces a third activation control signal P1'. The third activation control signal P1' is a PWM (pulse width modulation) pulse signal having a pulse width which responds with the value of the first activation control signal P1. The pulse frequency of the third activation control signal P1' is equal to that of the triangular signal Wt. In addition, when the level of the first activation control signal P1 is zero or lowest, the third activation control signal P1' is "L." Similarly, the comparator 812 produces a third activation control signal P2', a PWM pulse signal, in response to the first activation control signal P2. The comparator 813 produces a third activation control signal P3', a PWM pulse signal, in response to the first activation control signal P3. Similarly, the comparator 815 produces a fourth activation control signal Q1', a PWM pulse signal, in response to the second activation control signal Q1. The comparator 816 produces a fourth activation control signal Q2', a PWM pulse signal, in response to the second activation control signal Q2. Furthermore, the comparator 817 produces a fourth activation control signal Q3', a PWM pulse signal, in response to the second activation control signal Q3.

As a result, the three-phase third activation control signals P1', P2' and P3' are three-phase PWM signals responding with the three-phase first activation control signals P1, P2 and P3. The three-phase fourth activation control signals Q1', Q2' and Q3' are three-phase PWM signals responding with the three-phase second activation control signals Q1, Q2 and Q3. For example, the third activation control signal P1' has a pulse width responding with the value of the first activation control signal P1 during the active period Tp1 of the first activation control signal P1 and becomes "L" in the periods other than the active period Tp1.

The three-phase third activation control signals P1', P2' and P3' and the three-phase fourth activation control signals Q1', Q2' and Q3' of the activation drive part 801 are supplied to the power supplying part 20. The power supplying part 20 comprises the three first power amplifying parts 351, 352 and 353 and the three second power amplifying parts 355, 356 and 357 (see FIG. 8). The power supplying part 20 alters current paths to the three-phase windings 12, 13 and 14 as the disk 1 and the rotor 11 rotate.

Figure 24:
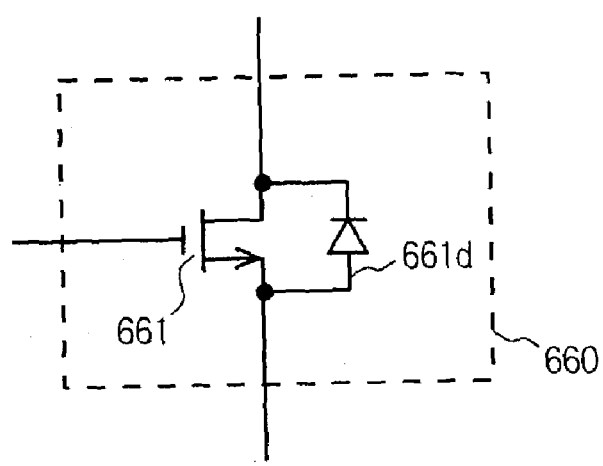
FIG. 24 is a circuit diagram showing a first power amplifying part 660 in accordance with Embodiment 4.
Figure 25:
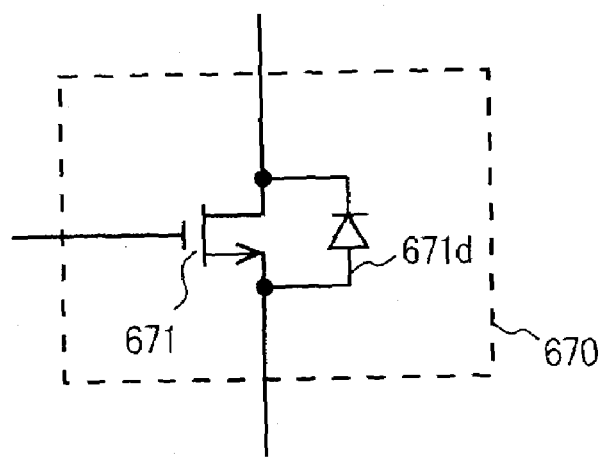
FIG. 25 is a circuit diagram showing a second power amplifying part 670 in accordance with Embodiment 4.

FIG. 24 is a circuit diagram showing another configuration of each of the first power amplifying parts. FIG. 25 is a circuit diagram showing another configuration of each of the second power amplifying parts.

The first power amplifying part 660 shown in FIG. 24 comprises a first power transistor 661 and a first power diode 661d. The first power transistor 661 is an N-channel MOS-type FET power transistor. The first power diode 661d is formed by a parasitic diode connected in the reverse direction from the current flow-out terminal side to the current flow-in terminal side of the power transistor.

The second power amplifying part 670 shown in FIG. 25 comprises a second power amplifying part 671 and a second power diode 671d. The second power amplifying part 671 is an N-channel MOS-type FET power transistor. The second power diode 671d is formed by a parasitic diode connected in the reverse direction from the current flow-out terminal side to the current flow-in terminal side of the power transistor.

The three-phase third activation control signals P1', P2' and P3' of the activation drive part 801 control the three first power amplifying parts 351, 352 and 353 of the power supplying part 20. For example, when the third activation control signal P1' is "H," the first power transistor of the first power amplifying part 351 is ON. When the third activation control signal P1' is "L," the first power transistor of the first power amplifying part 351 is OFF. Hence, the three first power amplifying parts 351, 352 and 353 of the power supplying part 20 perform high-frequency switching operation in response to the third activation control signals P1', P2' and P3'.

The three-phase fourth activation control signals Q1', Q2' and Q3' of the activation drive part 801 control the three second power amplifying parts 355, 356 and 357 of the power supplying part 20. For example, when the fourth activation control signals Q1' is "H," the second power transistor of the second power amplifying part 355 is ON. When the fourth activation control signal Q1' is "L," the second power transistor of the second power amplifying part 355 is OFF. Hence, the three second power amplifying parts 355, 356 and 357 of the power supplying part 20 perform high-frequency switching operation in response to the fourth activation control signals Q1', Q2' and Q3'.

Accordingly, in response to the three-phase third activation control signals P1', P2' and P3' and the three-phase fourth activation control signals Q1', Q2' and Q3', the three first power amplifying parts 351, 352 and 353 and the three second power amplifying parts 355, 356 and 357 of the power supplying part 20 perform high-frequency switching operation. Hence, the power amplifying parts supply pulsing three-phase drive voltage signals V1, V2 and V3 to the three-phase windings 12, 13 and 14.

The current detecting part 33 is composed of a resistor for current detection, for example, and detects the composed supply current Ig which is supplied from the voltage supplying part 25 to the three-phase windings 12, 13 and 14. The current detecting part 33 then outputs a current detection signal Ad which is proportional to the composed supply current Ig. Since power is supplied from the voltage supplying part 25 to the three-phase windings 12, 13 and 14 by the high-frequency switching operation of the power transistors of the power supplying part 20, the composed supply current Ig and the current detection signal Ad have pulse waveforms.

The current control part 700 compares the current detection signal Ad with the command signal Ac, and outputs a current control signal Af responding with the comparison result. The current control part 700 includes a filter, for example, and smoothes the result of the comparison between the current detection signal Ad and the command signal Ac by using the filter, thereby producing the current control signal Af.

When the switch part 701 selects the current control signal Af of the current control part 700, the amplitudes of the first activation control signals P1, P2 and P3 and the second activation control signals Q1, Q2 and Q3 change in response to the current control signal Af. Therefore, a current control loop is formed by the current detecting part 33, the current control part 700, the activation control part 31, the activation drive part 801 and the power supplying part 20. The current control loop controls the average value of the composed supply current Ig supplied to the three-phase windings 12, 13 and 14 in response to the command signal Ac. Furthermore, the three-phase first activation control signals P1, P2 and P3 and the three-phase second activation control signals Q1, Q2 and Q3 have been converted into smooth current signals which have substantially slope portions and respond with the slope signal by using the first adjust signal and the second adjust signal responding with the position pulse signal Dt. Hence, the three-phase third activation control signals P1', P2' and P3' and the three-phase fourth activation control signals Q1', Q2' and Q3' responding with the three-phase first activation control signals P1, P2 and P3 and the three-phase second activation control signals Q1, Q2 and Q3 become smooth PWM signals having substantially slope portions in response to the first adjust signal and the second adjust signal responding with the position pulse signal Dt. This reduces the pulsation of the generated drive force. It is thus possible to realize a motor and a disk drive apparatus being low in vibration and acoustic noise.

In Embodiment 4, the three first power amplifying parts and the three second power amplifying parts of the power supplying part 20 are subjected to high-frequency switching operation by the three-phase third activation control signals and the three-phase fourth activation control signals produced by the activation drive part 801 of the activation control block 805, the power losses of the power transistors of the power supplying part 20 can be reduced remarkably. It is thus possible to realize a motor and a disk drive apparatus with high reliability and low vibration and acoustic noise at low cost.

Still further, Embodiment 4 can also have various advantages similar to those of Embodiment 1, Embodiment 2 or Embodiment 3 described above.

Figure 26:
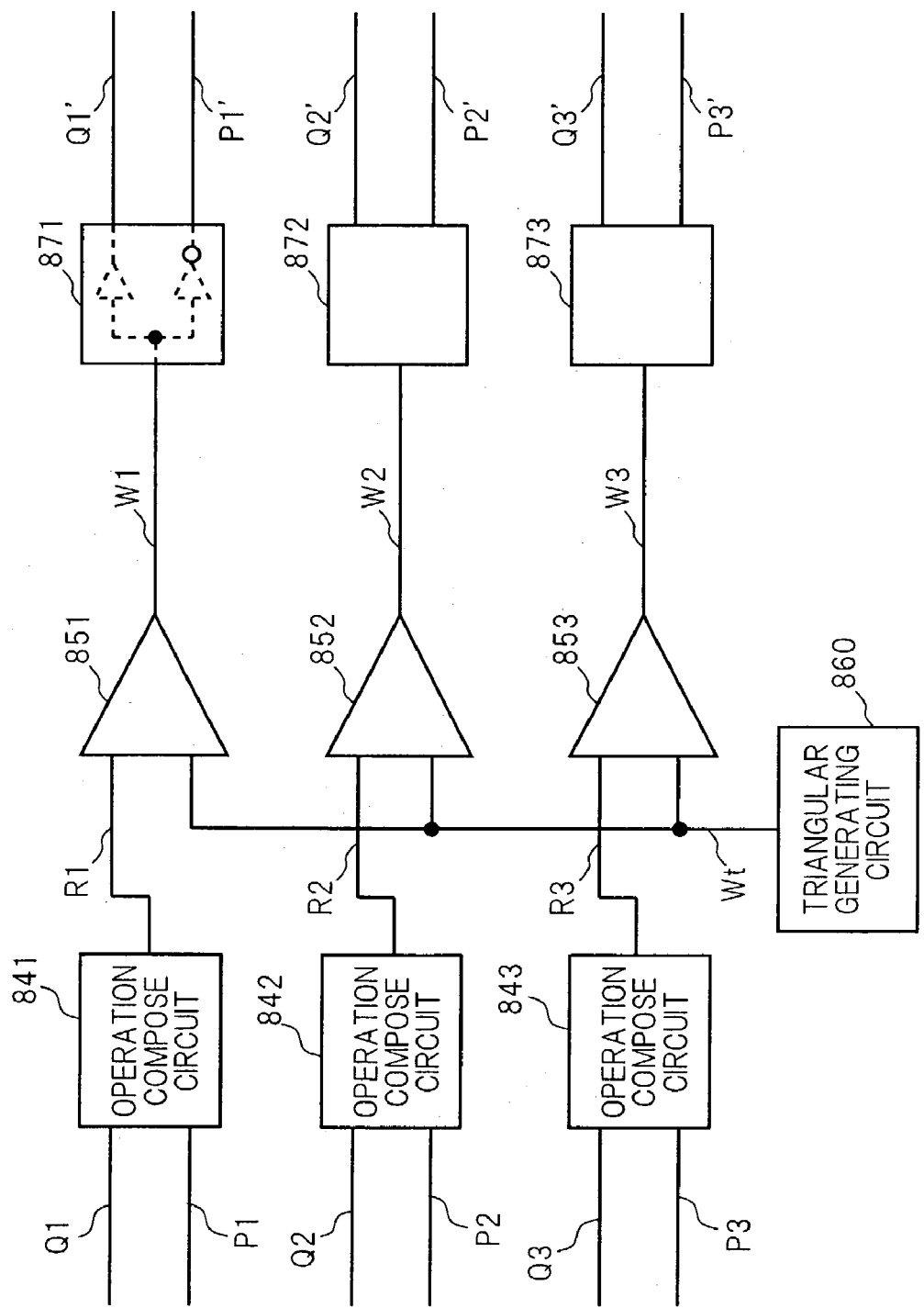
FIG. 26 is a view showing another configuration of the activation drive part 801 in accordance with Embodiment 4.
Figure 27:
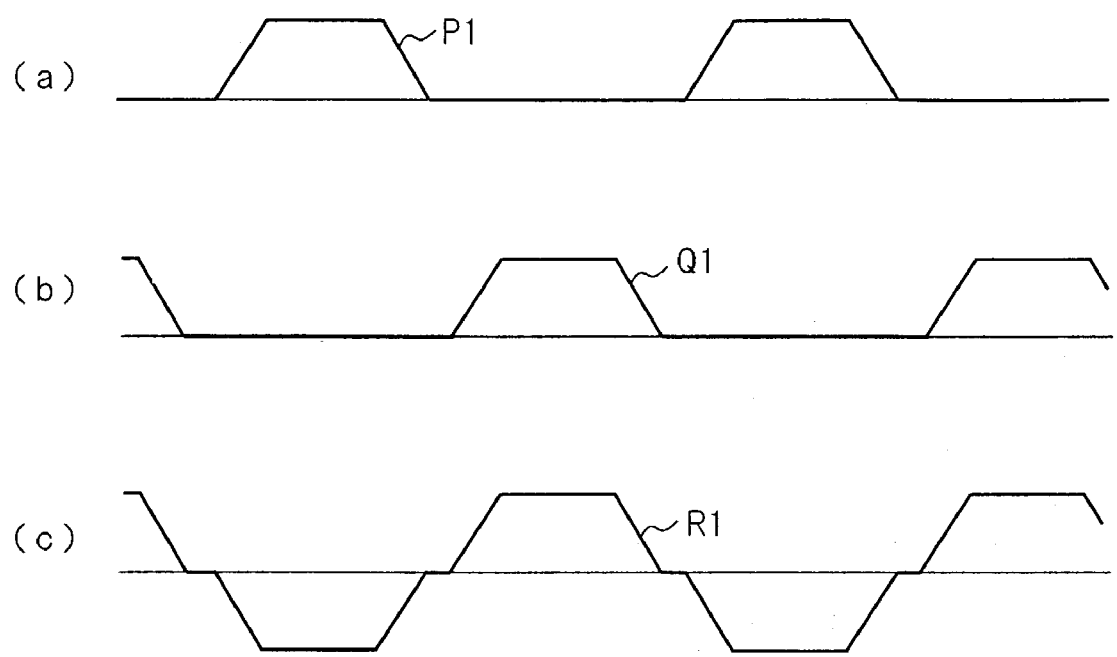
FIG. 27 is a waveform diagram for the description of the operation of the activation drive part 801 in accordance with Embodiment 4.

The configuration of the activation drive part 801 of Embodiment 4 is not restricted to that shown in FIG. 23, but can be modified variously. FIG. 26 is a block diagram showing another detailed configuration of the activation drive part 801. An operation compose circuit 841 composes the first activation control signal P1 and the second activation control signal Q1, and produces a composite signal R1. Parts (a), (b) and (c) of FIG. 27 show the relation among the waveforms of the first activation control signal P1, the second activation control signal Q1 and the composite signal R1. Similarly, an operation compose circuit 842 composes the first activation control signal P2 and the second activation control signal Q2, and produces a composite signal R2. Furthermore, an operation compose circuit 843 composes the first activation control signal P3 and the second activation control signal Q3, and produces a composite signal R3. A triangular generating circuit 860 outputs a triangular signal Wt having a predetermined frequency. The frequency of the triangular signal Wt is set at a predetermined frequency in the range from 10 to 500 kHz. The triangular signal Wt may be a saw tooth signal.

A comparator circuit 851 compares the composite signal R1 with the triangular signal Wt and outputs a compared pulse signal W1. The compared pulse signal W1 becomes a PWM signal having a pulse width responding with the magnitude of the composite signal R1. Similarly, a comparator circuit 852 compares the composite signal R2 with the triangular signal Wt and outputs a compared pulse signal W2. A comparator circuit 853 compares the composite signal R3 with the triangular signal Wt and outputs a compared pulse signal W3. A drive logic circuit 871 produces a third activation control signal P1' obtained by inverting the compared pulse signal W1 and a fourth activation control signal Q1' being coincident with the compared pulse signal W1. In other words, the third activation control signal P1' and the fourth activation control signal Q1' are in an inverse relation therebetween. Similarly, a drive logic circuit 872 produces a third activation control signal P2' obtained by inverting the compared pulse signal W2 and a fourth activation control signal Q2' being coincident with the compared pulse signal W2. A drive logic circuit 873 produces a third activation control signal P3' obtained by inverting the compared pulse signal W3 and a fourth activation control signal Q3' being coincident with the compared pulse signal W3.

As a result, the three-phase third activation control signals P1', P2' and P3' become three-phase PWM signals responding with the three-phase composite signals R1, R2 and R3. The three-phase fourth activation control signals Q1', Q2' and Q3' become three-phase PWM signals responding with the three-phase composite signals R1, R2 and R3. In addition, the three-phase third activation control signals P1', P2' and P3' are inverted signals of the three-phase fourth activation control signals Q1', Q2' and Q3', respectively.

The three-phase third activation control signals P1', P2' and P3' cause the three first power amplifying parts 351, 352 and 353 of the power supplying part 20 to perform PWM operation. The three-phase fourth activation control signals Q1', Q2' and Q3' cause the three second power amplifying parts 355, 356 and 357 of the power supplying part 20 to perform PWM operation. Each power amplifying part comprises an N-channel MOS-type FET power transistor and a power diode connected thereto reversely as shown in FIG. 24 or FIG. 25. Accordingly, for example, the power transistor of the first power amplifying part 351 performs ON-OFF high-frequency switching operation in response to the third activation control signal P1'. The power transistor of the second power amplifying part 355 complementarily performs OFF-ON high-frequency switching operation in response to the fourth activation control signal Q1'. Similarly, the power transistor of the first power amplifying part 352 performs ON-OFF high-frequency switching operation in response to the third activation control signal P2'. The power transistor of the second power amplifying part 356 complementarily performs OFF-ON high-frequency switching operation in response to the fourth activation control signal Q2'. Similarly, the power transistor of the first power amplifying part 353 performs ON-OFF high-frequency switching operation in response to the third activation control signal P3'. The power transistor of the second power amplifying part 357 complementarily performs OFF-ON high-frequency switching operation in response to the fourth activation control signal Q3'. As a result, the three first power amplifying parts 351, 352 and 353 and the three second power amplifying parts 355, 356 and 357 of the power supplying part 20 perform high-frequency switching operation in response to the three-phase third activation control signals P1', P2' and P3' and the three-phase fourth activation control signals Q1', Q2' and Q3'. Hence, the power supplying part 20 supplies digital three-phase drive voltage signals V1, V2 and V3 to the three-phase windings 12, 13 and 14.

The other operations of Embodiment 4 are similar to those of the embodiments described above, and their descriptions are omitted. Furthermore, Embodiment 4 can also have various advantages similar to those of Embodiment 1, Embodiment 2 or Embodiment 3 described above.

<<Embodiment 5>>

Figure 28:
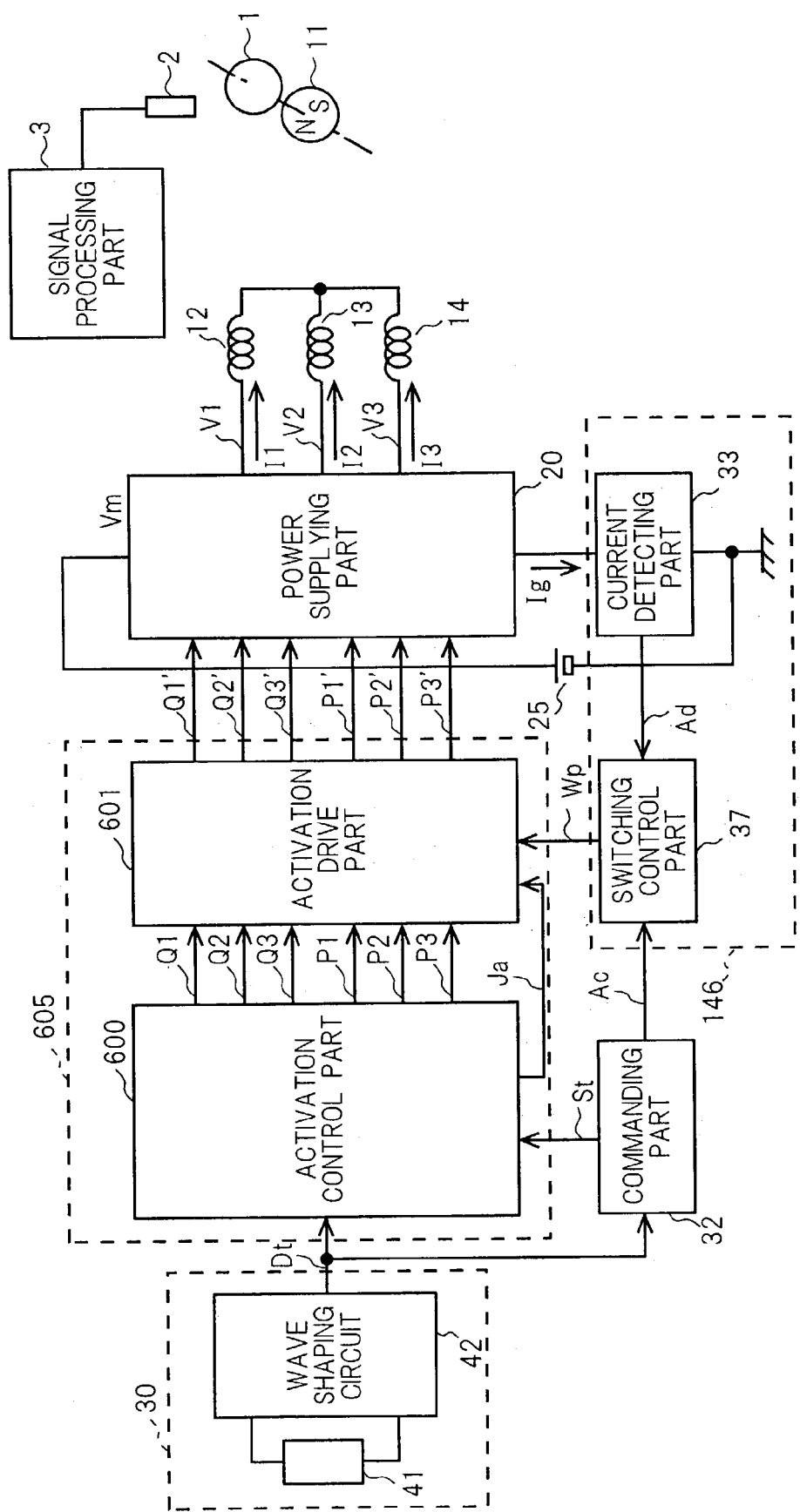
FIG. 28 is a block diagram showing the overall configuration in accordance with Embodiment 5 of the invention.

FIG. 28 to FIG. 33 show a motor and a disk drive apparatus comprising the motor in accordance with Embodiment 5 of the present invention. FIG. 28 is a block diagram showing the overall configuration of the disk drive apparatus in accordance with Embodiment 5. In Embodiment 5, an activation control part 600 and an activation drive part 601 constitute an activation operation block 605. The first activation control signals, the second activation control signals, the third activation control signals and the fourth activation control signals are converted into digital ON-OFF pulse signals. Components of Embodiment 5 similar to those of Embodiment 1, Embodiment 2, Embodiment 3 and Embodiment 4 described above are designated by the same numerals, and their descriptions are omitted.

Figure 29:
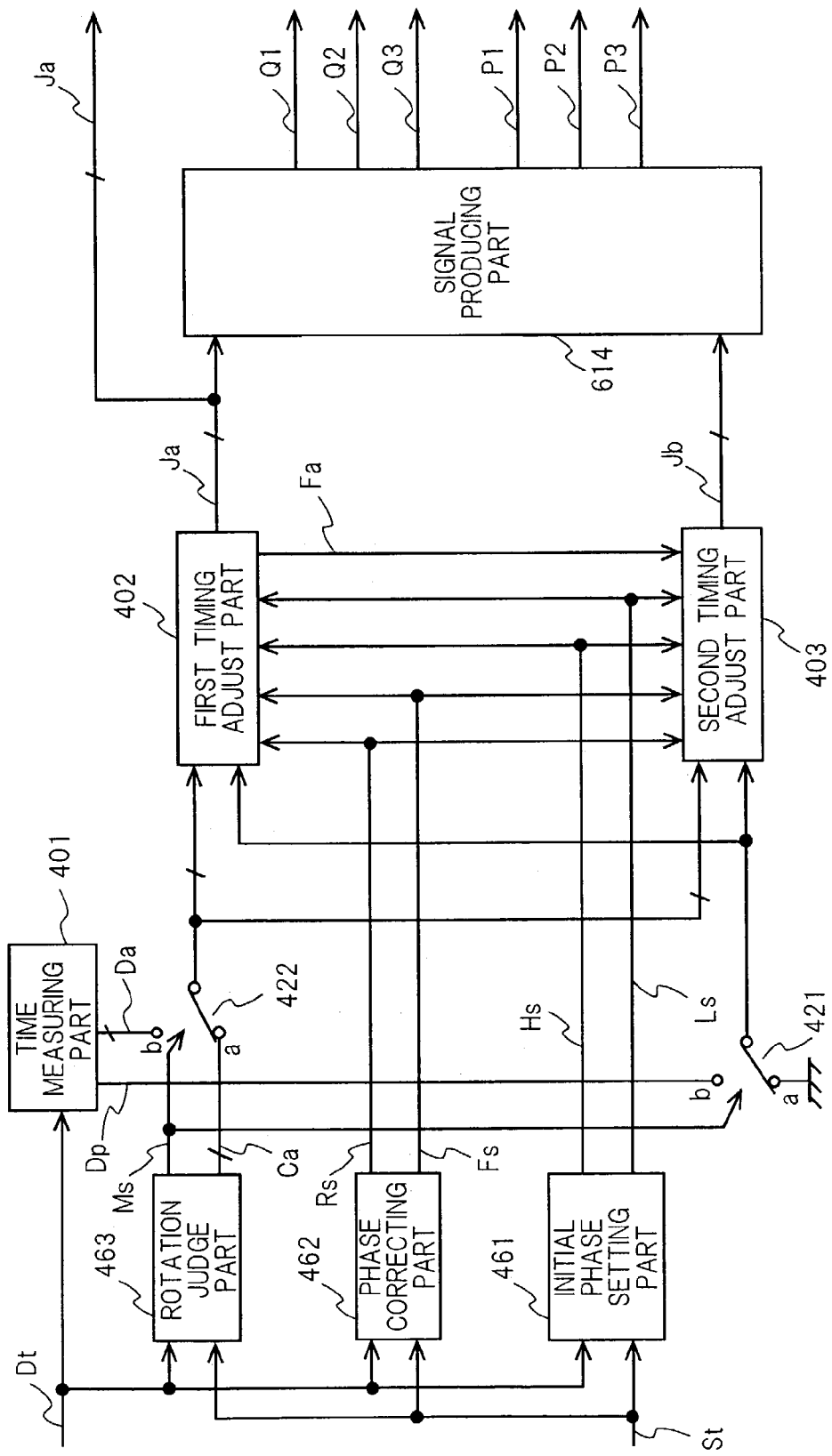
FIG. 29 is a view showing the configuration of an activation control part 600 in accordance with Embodiment 5.

The activation control part 600 of the activation operation block 605 shown in FIG. 28 outputs the three-phase first activation control signals P1, P2 and P3 and the three-phase second activation control signals Q1, Q2 and Q3 which digitally change in response to the position pulse signal Dt of the position detecting part 30. Furthermore, the activation control part 600 supplies the first adjust signal Ja (or the first state output signal Jd) to the activation drive part 601. The first activation control signals P1, P2 and P3 and the second activation control signals Q1, Q2 and Q3 for starting control are produced at the starting operation immediately after the start signal St is generated. The first activation control signals P1, P2 and P3 and the second activation control signals Q1, Q2 and Q3 for rotation control are produced during the rotation of the rotor 11 after the starting operation. FIG. 29 is a block diagram showing the detailed configuration of the activation control part 600.

The activation control part 600 shown in FIG. 29 comprises a time measuring part 401, a first timing adjust part 402, a second timing adjust part 403, a signal producing part 614, an initial phase setting part 461, a phase correcting part 462, a rotation judge part 463, a first switch part 421 and a second switch part 422. Since the detailed configurations and operations of the time measuring part 401, the first timing adjust part 402, the second timing adjust part 403, the initial phase setting part 461, the phase correcting part 462 and the rotation judge part 463 are similar to those shown in FIG. 16 described above, their detailed descriptions are omitted.

First, the case when the rotor 11 and the disk 1 rotate and when the mode select signal Ms of the rotation judge part 413 is "H" (rotation mode) is described below. In this case, the start signal St is "H" (activation start). When the mode select signal Ms is "H," the common contact of the first switch part 421 is connected to its contact b, and the common contact of the second switch part 422 is connected to its contact b. Furthermore, the first initial set signal Hs and the second initial set signal Ls of the initial phase setting part 461 remain "L," and the first correct signal Rs and the second correct signal Fs of the phase correcting part 462 also remain "L." The time measuring part 401 measures the time interval T0 which corresponds to one period or a half period of the position pulse signal Dt, and outputs the measured data signal Da and the measure operation signal Dp.

In the rotation mode, the first timing adjust part 402, the second timing adjust part 403 and the signal producing part 614 constitute a phase adjusting block. The phase adjusting block produces the three-phase first rotation activation control signals P1, P2 and P3 and the three-phase second rotation activation control signals Q1, Q2 and Q3, the timing values of which are adjusted in response to the measurement operation of the time measuring part 401. The phase adjusting block then adjusts the activation phase of the drive signals to the three-phase windings 12, 13 and 14. In this embodiment, the three-phase first rotation activation control signals P1, P2 and P3 and the three-phase second rotation activation control signals Q1, Q2 and Q3, output from the signal producing part 614, directly become the three-phase first activation control signals and the three-phase second activation control signals.

On the arrival of the measure operation signal Dp, the first timing adjust part 402 receives the measured data signal Da, and generates a first timing signal Fa every first adjust time T1 which responds with the measured data signal Da. In addition, the first timing adjust part 402 shifts its internal state in response to the first timing signal Fa, and changes a first state signal in response to the shift of the internal state. The first timing adjust part 402 outputs a first adjust signal Ja responding with at least the first state signal. Furthermore, the first timing adjust part 402 sets the first state signal to substantially a first predetermined state in response to the measure operation signal Dp.

On the arrival of the measure operation signal Dp, the second timing adjust part 403 receives the measured data signal Da, and generates a second timing signal every second adjust time T2 which responds with the measured data signal Da. In addition, the second timing adjust part 403 shifts its internal state in response to the second timing signal and changes a second state signal in response to the shift of the internal state. The second timing adjust part 403 outputs a second adjust signal Jb responding with the second state signal. Furthermore, the second timing adjust part 403 sets the second state signal to substantially a second predetermined state in response to at least the first timing signal Fa.

Figure 34:
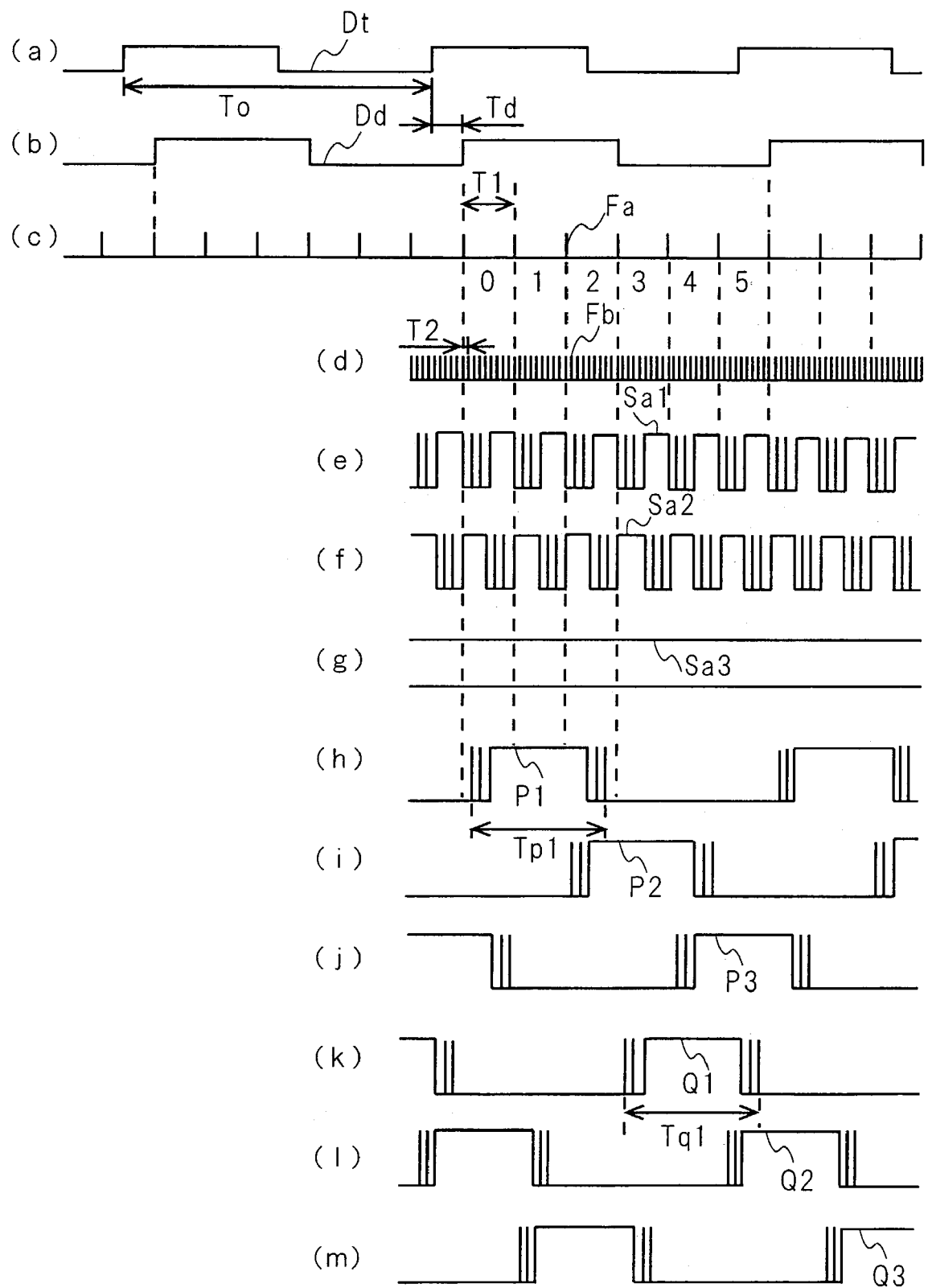
FIG. 34 is a waveform diagram for the description of the operation of the activation control part 600 in accordance with Embodiment 5.
Figure 35:
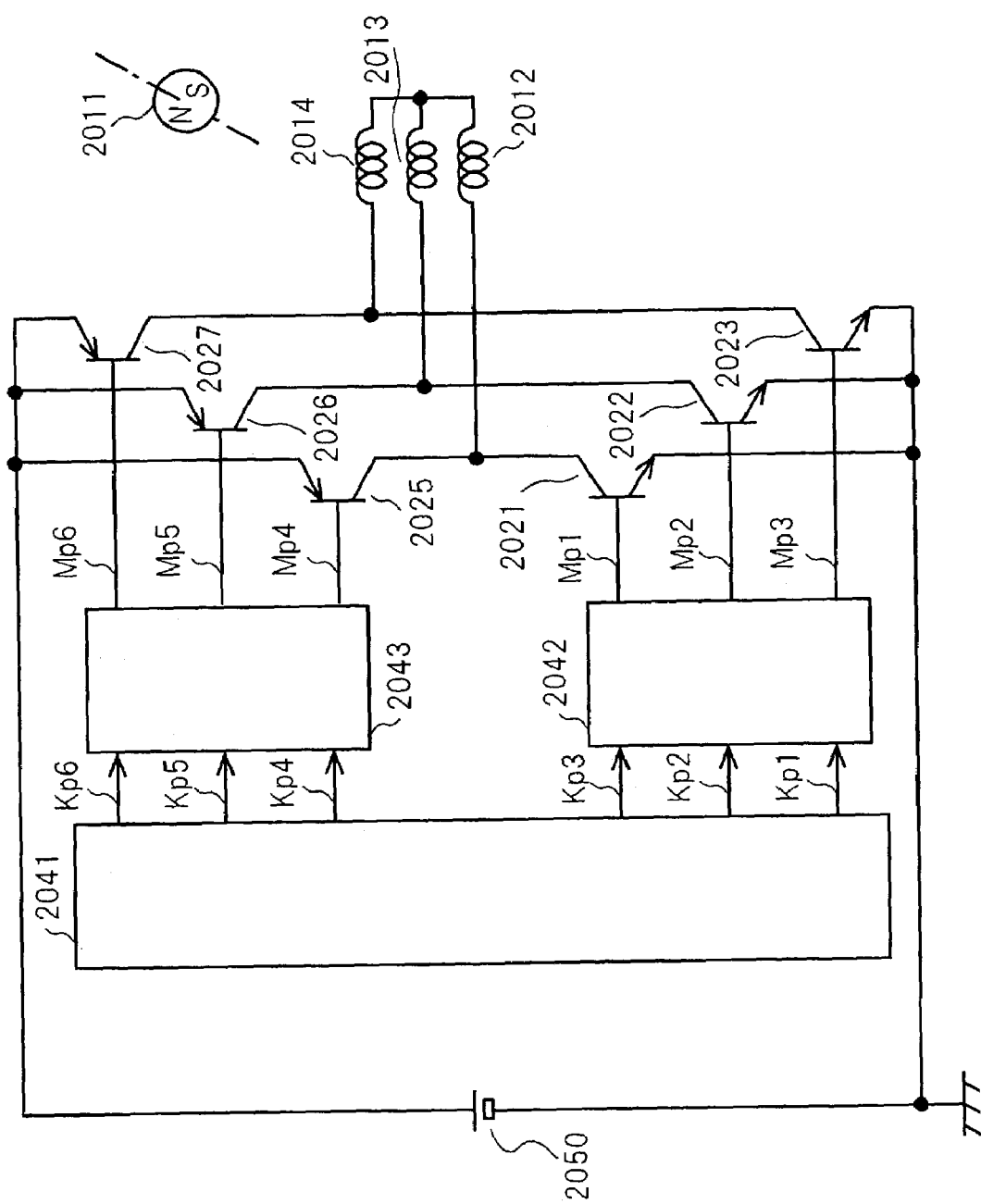
FIG. 35 is a block diagram showing the configuration of the motor for use in the prior art disk drive apparatus.

FIG. 34 is a waveform diagram for explaining the operations of the time measuring part 401, the first timing adjust part 402 and the second timing adjust part 403. Described below is the case wherein the time measuring part 401 measures one period of the position pulse signal Dt. The time measuring part 401 measures the time interval T0 of one period of the position pulse signal Dt shown in a part of FIG. 34. The time measuring part 401 produces the delayed position pulse signal Dd which is delayed wholly from the position pulse signal Dt by the delay time Td which is substantially proportional to the measured time interval T0. Furthermore, the time measuring part 401 produces the measure operation signal Dp in the timing delayed from the measurement edge of the position pulse signal Dt by the desired delay time Td (see a part (b) of FIG. 34). The first timing adjust part 402 generates the first timing signal Fa every first adjust time T1 which responds with the measured time interval T0 (see a part (c) of FIG. 34). The first adjust time T1 is set at T0/6 or approximately T0/6. That is, T1=T0/6. The first timing adjust part 402 sets the first state output signal Jd to substantially a first predetermined state in response to the measure operation signal Dp. Furthermore, the first timing adjust part 402 changes and shifts the first state output signal Jd in response to the first timing signal Fa. The first timing adjust part 402 outputs the first adjust signal Ja responding with the first state output signal Jd. As a result, the first adjust signal Ja changes in six states or approximately six states in one period of the delayed position pulse signal Dd. The second timing adjust part 403 generates the second timing signal Fb every second adjust time T2 which responds with the measured time interval T0 (see a part (d) of FIG. 34). In this embodiment, the second adjust time T2 is set at T0/30 or approximately T0/30. The second timing adjust part 403 sets the second state output signal Je to substantially a second predetermined state in response to the first timing signal Fa and the measure operation signal Dp. In addition, the second timing adjust part 403 changes and shifts the second state output signal Je in response to the second timing signal Fb. The second timing adjust part 403 outputs the second adjust signal Jb responding with the second state output signal Je. As a result, the second adjust signal Jb changes in 30 states or approximately 30 states in each pulse interval of the first timing signal Fa.

Figure 30:
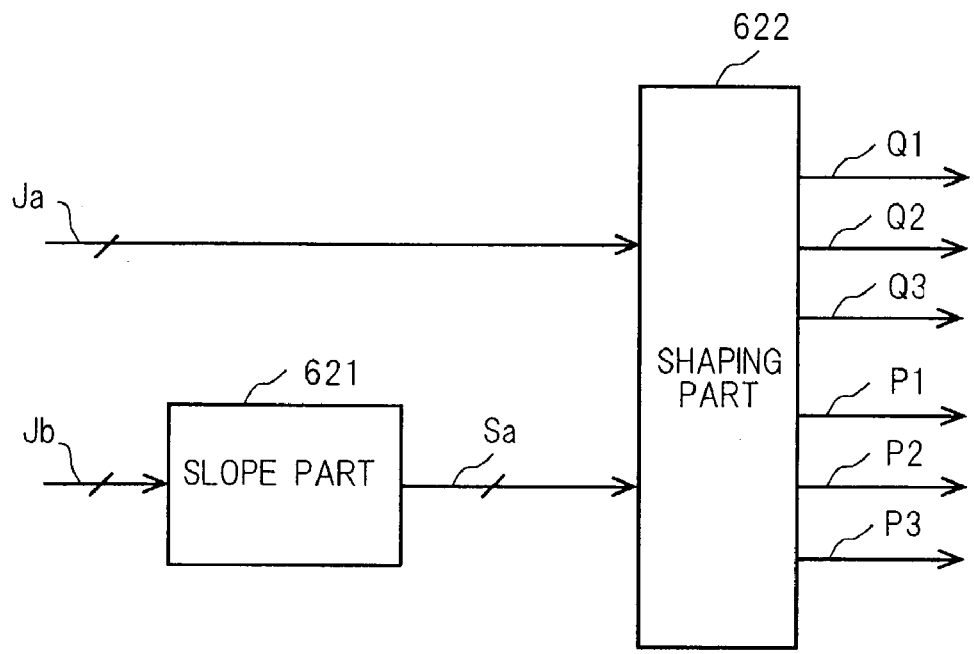
FIG. 30 is a view showing the configuration of a signal producing part 614 in accordance with Embodiment 5.
Figure 31:
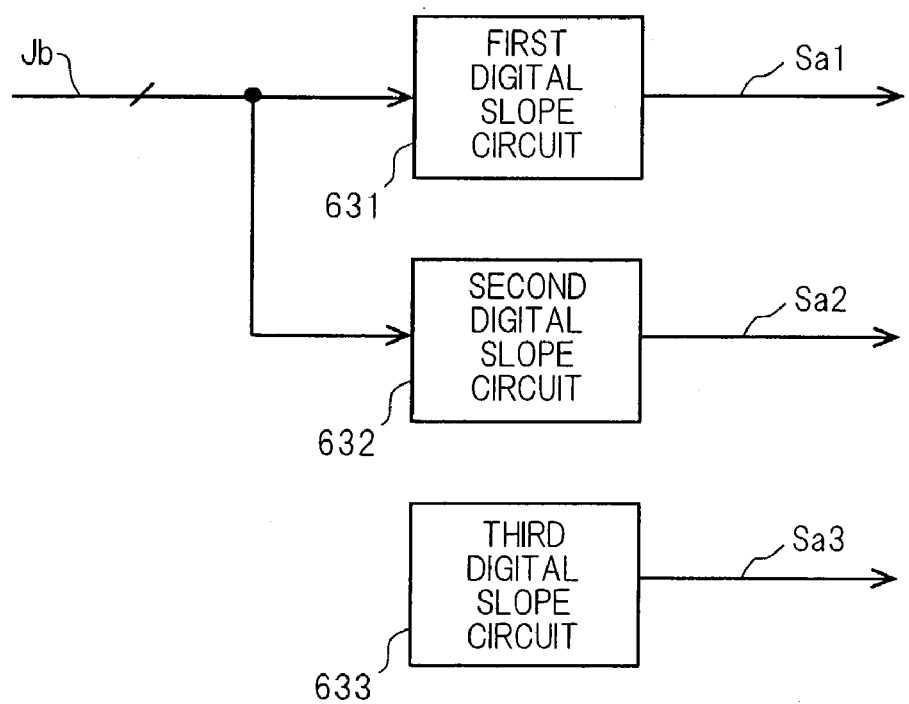
FIG. 31 is a view showing the configuration of the slope part 621 of the signal producing part 614 in accordance with Embodiment 5.

FIG. 30 shows the detailed configuration of the signal producing part 614 shown in FIG. 29. The signal producing part 614 comprises a slope part 621 and a shaping part 622. The slope part 621 outputs a set of digital slope signals Sa having substantially slope portions responding with the second adjust signal Jb. The shaping part 622 outputs the digital three-phase first activation control signals P1, P2 and P3 and the digital three-phase second activation control signals Q1, Q2 and Q3 responding with the first adjust signal Ja and the set of slope signals Sa. FIG. 31 shows the detailed configuration of the slope part 621 of the signal producing part 614.

The slope part 621 shown in FIG. 31 comprises a first digital slope circuit 631, a second digital slope circuit 632 and a third digital slope circuit 633. The first digital slope circuit 631 outputs a digital first slope signal Sa1 responding with the second adjust signal Jb of the second timing adjust part 403. A part (e) of FIG. 34 shows the waveform of the digital first slope signal Sa1. Since the second adjust signal Jb is set to a second predetermined state in response to the first timing signal Fa, the first slope signal Sa1 is set to "Lb" (low level). While the second adjust signal Jb is lower than a first predetermined value, the first slope signal Sa1 is set to "Lb." Several pulses of the first slope signal Sa1 are generated, the width of which increases gradually as the second adjust signal Jb increases. When the second adjust signal Jb reaches a second predetermined value, the first slope signal Sa1 is set to "Hb" (high level). As a result, the first slope signal Sa1 becomes a digital pulse signal synchronized with the first timing signal Fa. The pulse signal becomes a smooth slope signal, the average voltage value of which forms substantially a required slope at each rising portion thereof.

Similarly, the second digital slope circuit 632 outputs a digital second slope signal Sa2 in response to the second adjust signal Jb of the second timing adjust part 403. A part (f) of FIG. 34 shows the waveform of the second slope signal Sa2. Since the second adjust signal Jb is set to a second predetermined state in response to the first timing signal Fa, the second slope signal Sa2 is set to "Hb." While the second adjust signal Jb is lower than a third predetermined value, the second slope signal Sa2 is set at "Hb." When the second adjust signal Jb reaches the third predetermined value or more, several pulses of the second slope signal Sa2 are generated, the width of which increases gradually as the second adjust signal Jb increases. When the second adjust signal Jb reaches a fourth predetermined value, the second slope signal Sa2 is set to "Lb." The third predetermined value may be coincident with the second predetermined value. As a result, the second slope signal Sa2 becomes a digital pulse signal synchronized with the first timing signal Fa. The pulse signal becomes a smooth slope signal, the average voltage value of which forms substantially a required slope at each falling portion thereof. The third digital slope circuit 633 as high-level circuit outputs a digital third slope signal Sa3. In this embodiment, the third slope signal Sa3 is set at "Hb" (see a part (g) of FIG. 34).

The shaping part 622 of the signal producing part 614 shown in FIG. 30 produces the three-phase first activation control signals P1, P2 and P3 and the three-phase second activation control signals Q1, Q2 and Q3 in response to the first adjust signal Ja of the first timing adjust part 402 and the second adjust signal Jb of the second timing adjust part 403.

Figure 32:
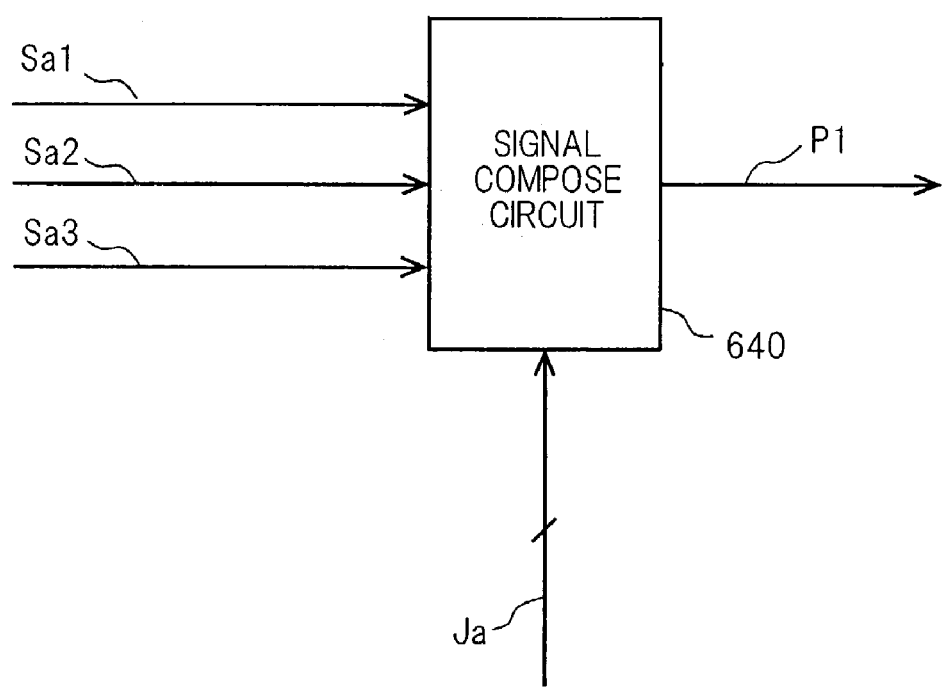
FIG. 32 is a view showing the configuration of a part of the shaping part 622 of the signal producing part 614 in accordance with Embodiment 5.

FIG. 32 is a block diagram showing the configuration of a shaping circuit, a part of the shaping part 622, which produces the first activation control signal P1. The shaping circuit, a part of the shaping part 622 and shown in FIG. 32, comprises a signal compose circuit 640. The signal compose circuit 640 combines the first slope signal Sa1, the second slope signal Sa2 and the third slope signal Sa3 of the slope part 621 in response to the first adjust signal Ja of the first timing adjust part 402, thereby producing the first activation control signal P1 which changes digitally. As a result, the first activation control signal P1 becomes a digital signal responding with the first adjust signal Ja (the first state output signal Jd) of the first timing adjust part 402 and the second adjust signal Jb (the second state output signal Je) of the second timing adjust part 403. Furthermore, the digital signal is obtained by combining the slope signals Sa1, Sa2 and Sa3 in response to the first adjust signal Ja. Since the detailed configurations of the shaping circuits of the shaping part 622 for producing the first activation control signals P2 and P3 and the three-phase second activation control signals Q2 and Q3 other than the first activation control signal P1 are similar to the configuration of the shaping circuit shown in FIG. 32, their detailed descriptions are omitted.

A part (h) of FIG. 34 shows the waveform of the first activation control signal P1. The first activation control signal P1 has a pulse waveform responding with the first slope signal Sa1 in the rising portion, maintains the high level "Hb" in the intermediate portion, and has a pulse waveform responding with the first slope signal Sa2 in the falling portion. The active period Tp1 of the first activation control signal P1 is set at a value considerably longer than the electrical angle of 360/3= 120 degrees. FIGS. 34(i) and 34(j) show the other first activation control signals P2 and P3. As described above, the three-phase first activation control signals P1, P2 and P3 become digital signals responding with the first adjust signal Ja of the first timing adjust part 402 and the second adjust signal Jb of the second timing adjust part 403, and obtained by combining the slope signals Sa1, Sa2 and Sa3 in response to the first adjust signal Ja. The active periods Tp1, Tp2 and Tp3 of the three-phase first activation control signals P1, P2 and P3 are set at values considerably longer than the electrical angle of 120 degrees. In this embodiment, the active periods Tp1, Tp2 and Tp3 are selected in the range from 150 to 180 degrees.

Similarly, parts (k) to (m) in FIG. 34 show the waveforms of the three-phase second activation control signals Q1, Q2 and Q3. The three-phase second activation control signals Q1, Q2 and Q3 become digital signals responding with the first adjust signal Ja of the first timing adjust part 402 and the second adjust signal Jb of the second timing adjust part 403, and obtained by combining the slope signals Sa1, Sa2 and Sa3 in response to the first adjust signal Ja. The active periods Tq1, Tq2 and Tq3 of the three-phase second activation control signals Q1, Q2 and Q3 are set at values considerably longer than the electrical angle of 120 degrees. In this embodiment, the active periods Tq1, Tq2 and Tq3 of are selected in the range from 150 to 180 degrees.

As described above, the activation control part 600 produces the first activation control signals P1, P2 and P3 and the second activation control signals Q1, Q2 and Q3 for rotation control in response to the time interval of the position pulse signal Dt. The first activation control signals and the second activation control signals control the activation operations of the first power amplifying parts and the second power amplifying parts of the power supplying part 20 via the activation drive part 601. Hence, the activation phase of the drive signals to the three-phase windings 12, 13 and 14 is determined in response to the first activation control signals and the second activation control signals synchronized with the position pulse signal Dt.

Next, the case when the rotor 11 and the disk 1 are at rest and when the mode select signal Ms of the rotation judge part 463 is "L" (starting mode) is described below. When the mode select signal Ms is "L," the common contact of the switch part 421 is connected to its contact a, and the common contact of the switch part 422 is connected to its contact a. Hence, instead of the measured data signal Da of the time measuring part 401, the change data signal Ca of the rotation judge part 463 is input to the first timing adjust part 402. Furthermore, instead of the measure operation signal Dp of the time measuring part 401, the "L" level is input to the second timing adjust part 403.

In the starting mode, the first timing adjust part 402, the second timing adjust part 403 and the signal producing part 614 constitute a phase changing block. The phase changing block produces the three-phase first rotation activation control signals P1, P2 and P3 and the three-phase second rotation activation control signals Q1, Q2 and Q3, the timing values of which are adjusted in response to the change data signal Ca. The phase changing block then changes the activation phase of the drive signals to the three-phase windings 12, 13 and 14 sequentially with response to time in the forward rotation direction. In this embodiment, the three-phase first starting activation control signals P1, P2 and P3 and the three-phase second starting activation control signals Q1, Q2 and Q3, which are output from the signal producing part 614, directly become the first activation control signals and the second activation control signals.

The initial phase setting part 461 receives the position pulse signal Dt and the start signal St. The initial phase setting part 461 then generates a pulse of the first initial set signal Hs or the second initial set signal Ls in response to the level of the position pulse signal Dt in the vicinity of the generation time of the start signal St. In other words, when the position pulse signal Dt is "H," the initial phase setting part 461 generates a pulse of the first initial set signal Hs in response to the generation of the start signal St. When the position pulse signal Dt is "L," the initial phase setting part 461 generates a pulse of the second initial set signal Ls in response to the generation of the start signal St.

The first timing adjust part 402 sets the internal state of the first state circuit (similar to the first state circuit 222 shown in FIG. 5) to a first setting state by using the pulse of the first initial set signal Hs, and inputs the change data signal Ca to the first cyclic count circuit (similar to the first cyclic count circuit 221 shown in FIG. 5). The second timing adjust part 403 sets the internal state of the second state circuit (similar to the second state circuit 232 shown in FIG. 5) to a first setting state by using the pulse of the first initial set signal Hs, and inputs the change data signal Ca to the second cyclic count circuit (similar to the second cyclic count circuit 231 shown in FIG. 5). As a result, the first timing adjust part 402 sequentially changes the internal state of the first state circuit (222) in the forward rotation direction every first predetermined time responding with the change data signal Ca. The second timing adjust part 403 sequentially changes the internal state of the second state circuit (232) in the forward rotation direction every second predetermined time which responds with the change data signal Ca. As a result, the three-phase first starting activation control signals P1, P2 and P3 and the three-phase second starting activation control signals Q1, Q2 and Q3 of the signal producing part 614 are set to the first setting state. The activation phase of the drive signals to the three-phase windings 12, 13 and 14 is then changed sequentially in the forward rotation direction. As a result, the rotor 11 and the disk 1 start rotation in the forward rotation direction.

The first timing adjust part 402 sets the internal state of the first state circuit (222) to a second setting state by using the pulse of the second initial set signal Ls, and inputs the change data signal Ca to the first cyclic count circuit (221). The second timing adjust part 403 sets the internal state of the second state circuit (232) to a second setting state by using the pulse of the second initial set signal Ls, and inputs the change data signal Ca to the second cyclic count circuit (231). As a result, the first timing adjust part 402 sequentially changes the internal state of the first state circuit (222) in the forward rotation direction every first predetermined time which responds with the change data signal Ca. The second timing adjust part 403 sequentially changes the internal state of the second state circuit (232) in the forward rotation direction every second predetermined time which responds with the change data signal Ca. As a result, the three-phase first starting activation control signals P1, P2 and P3 and the three-phase second starting activation control signals Q1, Q2 and Q3 of the signal producing part 614 are set to the second setting state. The activation phase of the drive signals to the three-phase windings 12, 13 and 14 is then changed sequentially in the forward rotation direction with respect to time. As a result, the rotor 11 and the disk 1 start rotation in the forward rotation direction.

The phase correcting part 462 receives the position pulse signal Dt and the start signal St. After the start signal St is generated, the phase correcting part 462 detects both (or one) of the level changes of the position pulse signal Dt. The phase correcting part 462 outputs a pulse of the first correct signal Rs in response to the level change (rising edge) from "L" to "H" of the position pulse signal Dt. The phase correcting part 462 outputs the a pulse of the second correct signal Fs in response to the level change (falling edge) from "H" to "L" of the position pulse signal Dt.

The first timing adjust part 402 corrects the internal state of the first state circuit (222) to a third setting state by using the pulse of the first correct signal Rs. The change data signal Ca is input again to the first cyclic count circuit (221). The second timing adjust part 403 sets the internal state of the second state circuit (232) to the third setting state by using the pulse of the first correct signal Rs. The change data signal Ca is input again to the second cyclic count circuit (231). Accordingly, the first timing adjust part 402 sequentially changes the internal state of the first state circuit (222) in the forward rotation direction every first predetermined time which responds with the change data signal Ca. The second timing adjust part 403 sequentially changes the internal state of the second state circuit (232) in the forward rotation direction every second predetermined time which responds with the change data signal Ca. As a result, the three-phase first starting activation control signals P1, P2 and P3 and the three-phase second starting activation control signals Q1, Q2 and Q3 of the signal producing part 614 are corrected to the third setting state. The activation phase of the drive signals to the three-phase windings 12, 13 and 14 is then changed sequentially in the forward rotation direction with respect to time. As a result, the rotor 11 and the disk 1 rotate further in the forward rotation direction.

The first timing adjust part 402 sets the internal state of the first state circuit (222) to a fourth setting state by using the pulse of the second correct signal Fs. The change data signal Ca is input again to the first cyclic count circuit (221). The second timing adjust part 403 sets the internal state of the second state circuit (232) to the fourth setting state by using the pulse of the second correct signal Fs. The change data signal Ca is input again to the second cyclic count circuit (231). Accordingly, the first timing adjust part 402 sequentially changes the internal state of the first state circuit (222) in the forward rotation direction every first predetermined time which responds with the change data signal Ca. The second timing adjust part 403 sequentially changes the internal state of the second state circuit (232) in the forward rotation direction every second predetermined time which responds with the change data signal Ca. As a result, the three-phase first starting activation control signals P1, P2 and P3 and the three-phase second starting activation control signals Q1, Q2 and Q3 of the signal producing part 614 are corrected to the fourth setting state. The activation phase of the drive signals to the three-phase windings 12, 13 and 14 is then changed sequentially in the forward rotation direction with respect to time. As a result, the rotor 11 and the disk 1 rotate further in the forward rotation direction.

The rotation judge part 463 receives the position pulse signal Dt and the start signal St. The rotation judge part 463 then outputs the mode select signal Ms and the change data signal Ca in response to the occurrence states of both (or one) of the level changes of the position pulse signal Dt. It is considered that the rotation judge part 463 is configured on the basis of two kinds of methods. In one of the methods (a first selection method), the mode select signal Ms is changed in response to the number of the level changes of the position pulse signal Dt. In the other method (a second selection method), the mode select signal Ms is changed in response to the time interval of the level changes of the position pulse signal Dt. Since the first selection method and the second selection method have already been described above, their detailed descriptions are omitted. Hereafter, descriptions are given by using the first selection method.

At the starting and during the rotation, the activation control part 600 produces the first activation control signals P1, P2 and P3 and the second activation control signals Q1, Q2 and Q3 as digital signals having substantially smooth slope portions which responds with the position pulse signal Dt. In other words, each of the first activation control signals P1, P2 and P3 and the second activation control signals Q1, Q2 and Q3 has substantially a slope portion formed of a digital pulse which responds with the slope signal of the slope part 621 in at least one of the rising and falling slope portions.

Figure 33:
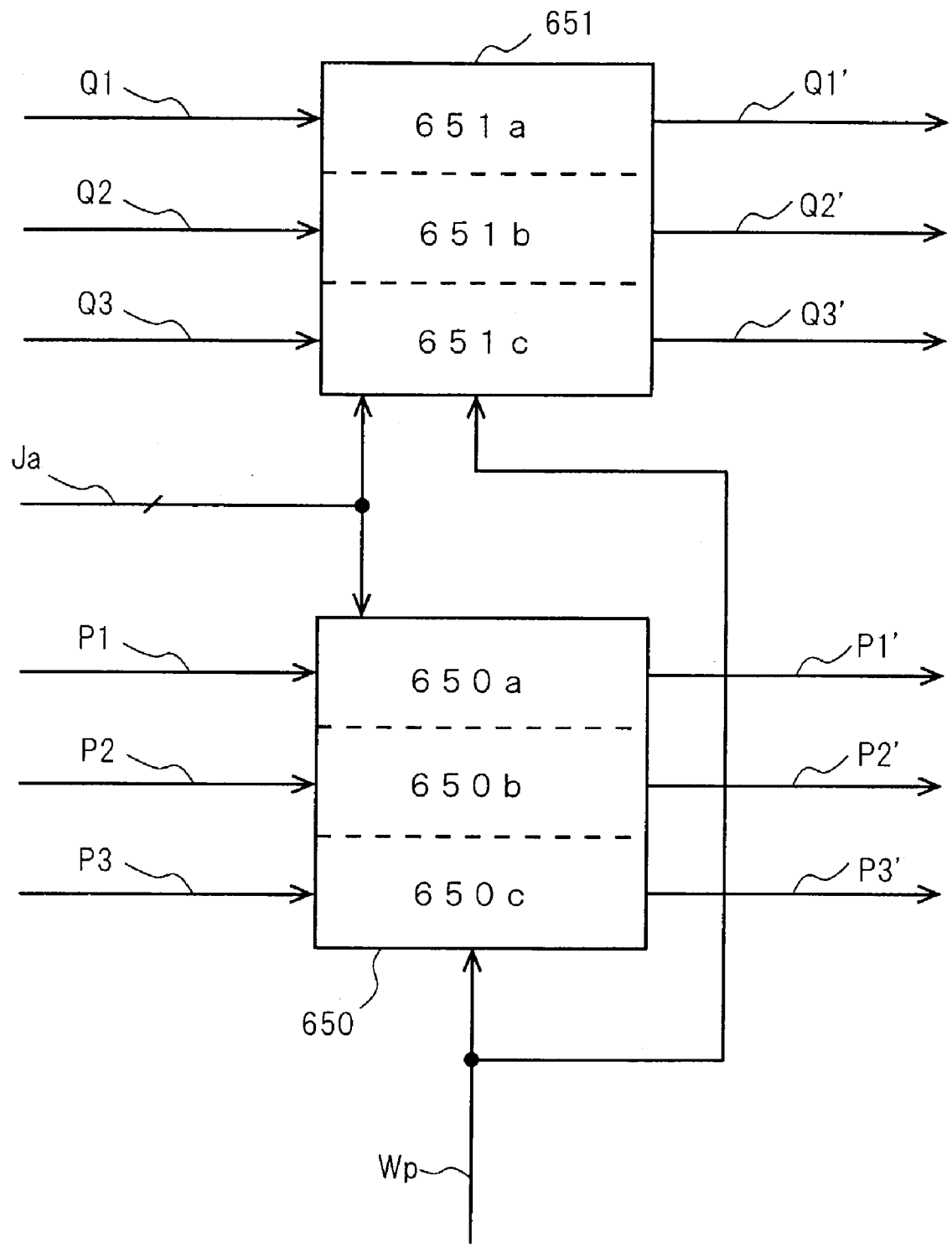
FIG. 33 is a view showing the configuration of an activation drive part 601 in accordance with Embodiment 5.

The activation drive part 601 shown in FIG. 28 logically combines the first activation control signals P1, P2 and P3 and/or the second activation control signals Q1, Q2 and Q3 of the activation control part 600 with the switching pulse signal Wp of the switching control part 37. The activation drive part 601 then produces third activation control signals P1', P2' and P3' and fourth activation control signals Q1', Q2' and Q3'. FIG. 33 is a block diagram showing the detailed configuration of the activation drive part 601.

The activation drive part 601 shown in FIG. 33 comprises a first activation operating logic part 650 and a second activation operating logic part 651. A first compose logic circuit 650a of the first activation operating logic 650 produces the third activation control signal P1' by logically combining the first activation control signal P1 with the switching pulse signal Wp in a desired period in response to the first adjust signal Ja. Similarly, a first compose logic circuit 650b of the first activation operating logic 650 produces the third activation control signal P2' by logically combining the first activation control signal P2 with the switching pulse signal Wp in a desired period in response to the first adjust signal Ja. Similarly, a first compose logic circuit 650c of the first activation operating logic 650 produces the third activation control signal P3' by logically combining the first activation control signal P3 with the switching pulse signal Wp in a desired period in response to the first adjust signal Ja.

A second compose logic circuit 651a of the second activation operating logic 651 produces the fourth activation control signal Q1' by logically combining the second activation control signal Q1 with the switching pulse signal Wp in a desired period in response to the first adjust signal Ja. Similarly, a second compose logic circuit 651b of the second activation operating logic 651 produces the fourth activation control signal Q2' by logically combining the second activation control signal Q2 with the switching pulse signal Wp in a desired period in response to the first adjust signal Ja. Similarly, a second compose logic circuit 651c of the second activation operating logic 651 produces the fourth activation control signal Q3' by logically combining the second activation control signal Q3 with the switching pulse signal Wp in a desired period in response to the first adjust signal Ja.

The third activation control signals P1', P2' and P3' may be produced, for example, by computing the AND of the first activation control signals P1, P2 and P3 with the switching pulse signal Wp. Furthermore, the fourth activation control signals Q1', Q2' and Q3' may be produced by directly outputting the second activation control signals Q1, Q2 and Q3.

The three-phase third activation control signals P1', P2' and P3' and the three-phase fourth activation control signals Q1', Q2' and Q3' of the activation drive part 601 shown in FIG. 28 are supplied to the power supplying part 20. The power supplying part 20 comprises the three first power amplifying parts 351, 352 and 353 and the three second power amplifying parts 355, 356 and 357 (see FIG. 8). The power supplying part 20 alters the activation phases of the drive signals supplied to the three-phase windings 12, 13 and 14 in response to the three-phase first activation control signals P1, P2 and P3 and the three-phase second activation control signals Q1, Q2 and Q3. The circuit configuration shown in FIG. 24 is used for each of the first power amplifying parts 351, 352 and 353, and the circuit configuration shown in FIG. 25 is used for each of the second power amplifying parts 355, 356 and 357.

The three first power amplifying parts 351, 352 and 353 of the power supplying part 20 perform high-frequency switching operation in response to the third activation control signals P1', P2' and P3'. The three second power amplifying parts 355, 356 and 357 of the power supplying part 20 perform high-frequency switching operation in response to the fourth activation control signals Q1', Q2' and Q3'.

The current detecting part 33 shown in FIG. 28 detects the composed supply current Ig supplied from the voltage supplying part 25 to the three-phase windings 12, 13 and 14 via the three first power amplifying parts 351, 352 and 353 of the power supplying part 20. The current detecting part 33 then outputs the current detection signal Ad which responds with the composed supply current Ig. The switching pulse signal Wp of the switching control part 37 becomes a high-frequency switching signal responding with the result of the comparison between the current detection signal Ad and the command signal Ac. As a result, the composed supply current Ig is controlled in response to the command signal Ac. Hence, the drive current signals I1, I2 and I3 supplied to the three-phase windings 12, 13 and 14 can be controlled accurately in response to the command signal Ac. This can reduce the pulsation of the generated drive force. In other words, it is possible to remarkably reduce the vibration and acoustic noise of the disk 1 and the rotor 11.

In each of the three-phase first activation control signals P1, P2 and P3 and the three-phase second activation control signals Q1, Q2 and Q3 of the activation control part 600, at least one of the rising and falling portions is changed smoothly so as to have substantially a slope portion in response to the slope signal of the signal producing part 614.

The three-phase third activation control signals P1', P2' and P3' are produced in response to the three-phase first activation control signals P1, P2 and P3 and the switching pulse signal Wp. The three first power amplifying parts 351, 352 and 353 are subjected to high-frequency switching operation in response to the three-phase third activation control signals P1', P2' and P3'. In addition, the three-phase fourth activation control signals Q1', Q2' and Q3' are produced in response to the three-phase second activation control signals Q1, Q2 and Q3 and the. switching pulse signal Wp. The three second power amplifying parts 355, 356 and 357 are operated in response to the three-phase third activation control signals Q1', Q2' and Q3'. Hence, the drive current signals I1, I2 and I3 supplied to the three-phase windings 12, 13 and 14 change smoothly. This reduces the pulsation of the generated drive force. In other words, it is possible to remarkably reduce the vibration and acoustic noise of the disk 1 and the rotor 11.

In Embodiment 5, as described above, the power transistors for supplying the drive current signals to the three-phase windings 12, 13 and 14 are subjected to ON-OFF high-frequency switching operation, whereby the power losses of the power transistors are reduced remarkably. In other words, the first power transistors of the first power amplifying parts 351, 352 and 353 and/or the second power transistors of the second power amplifying parts 355, 356 and 357 are subjected to ON-OFF high-frequency switching operation, whereby the power losses of the power transistors are reduced remarkably. This remarkably reduces the power consumption and heat generation of the disk drive apparatus and the motor. As a result, temperature rise is lowered, and recording and/or reproduction can be carried out stably on a recordable disk. In Embodiment 5, the current detecting part 33 and the switching control part 37 constitute a switching operation block 146. This block is configured so as to subject at least one of the three first power transistors and the three second power transistors to high-frequency switching operation.

The activation operation block 605 produces the three-phase first, second, third and fourth activation control signals as digital signals. At least one of the rising and falling portions of each of the activation control signals is changed so as to have substantially a slope portion in response to a digital slope signal. As a result, the current paths to the three-phase windings 12, 13 and 14 are altered smoothly. In other words, the pulse width is changed gradually at the rising portion or the falling portion of the slope signal, and the average voltage value of the signal has substantially a smooth slope portion. As a result, in Embodiment 5, the rising portion or the falling portion of each activation control signal changes so as to have substantially a slope portion. The three-phase drive current signals I1, I2 and I3 having smooth slope portions can thus be supplied to the three-phase windings 12, 13 and 14 via the first power amplifying parts 351, 352 and 353 and the second power amplifying parts 355, 356 and 357 of the power supplying part 20. This reduces the pulsation of the generated drive force, thereby reducing the vibration and the acoustic noise of the disk 1 and the rotor 11.

The switching operation block 146 compares the current detection signal Ad of the current detecting part 33 with the command signal Ac of the commanding part 32, and produces the switching pulse signal Wp responding with the comparison result. The first power amplifying parts and/or the second power amplifying parts are subjected to high-frequency switching operation in response to the switching pulse signal Wp. Hence, the magnitudes of the drive current signals I1, I2 and I3 supplied to the three-phase windings 12, 13 and 14 can be controlled accurately in response to the command signal Ac. This results in reducing the pulsation of the generated drive force. It is thus possible to realize a disk drive apparatus and a motor with high performance, low vibration and low acoustic noise.

Furthermore, Embodiment 5 can also have various advantages similar to those of Embodiment 1, Embodiment 2, Embodiment 3 or Embodiment 4 described above.

In Embodiment 5, the slope signals Sa1 and Sa2 may be simple pulse signals, and this configuration is also included within the scope of the present invention. For example, the first slope signal Sa1 and the second slope signal Sa2 are produced so as to overlap with each other. The first and second activation control signals are generated by combining the slope signals Sa1, Sa2 and Sa3. Accordingly, the period of "Hb" (active period) of each activation control signal is made considerably longer than the electrical angle of 120 degrees. As a result, the active period of each of the third and fourth activation control signals becomes considerably longer than the electrical angle of 120 degrees. Therefore, the current paths to the three-phase windings are altered relatively smoothly. In other words, the active period of each of the first and second activation control signals is made longer than the period of 120 degrees by changing the first and second activation control signals so as to have rectangular waveforms in response to the first and second adjust signals. Hence, the active period of each of the third and fourth activation control signals becomes longer than the period of 120 degrees. As a result, the current paths to the three-phase windings are altered relatively smoothly. The vibration and the acoustic noise of the disk are reduced relatively. Furthermore, these activation control signals can be produced accurately in response to the single position signal.

Various modifications are possible for the detailed configurations of the above-mentioned embodiments. For example, the winding of each phase may be composed of a plurality of partial windings connected in series or in parallel. The three-phase windings are not restricted to star-connection, but may form a delta-connection. In addition, the number of phases of the windings is not restricted to three. Generally, it is possible to realize a configuration having plural-phase windings. Furthermore, the number of magnetic poles of the field part of the rotor is not restricted to two, but may be more than two.

In addition, each power transistor of the power supplying part can be composed of an NPN-type bipolar transistor, a PNP-type bipolar transistor, an N-channel FET transistor, a P-channel FET transistor, an IGBT transistor or the like. Since the power transistors are subjected to high-frequency switching operation, the power losses and heat generation of the power transistors are reduced. The power transistors can thus be integrated easily into an IC. Furthermore, various modifications are possible for the configurations of the power amplifying parts of the power supplying part and the high-frequency switching operation of the power transistors. Still further, the drive currents supplied to the windings may be altered smoothly while the power losses of the power transistors are reduced by subjecting the FET power transistors to high-frequency switching operation between the ON state (full ON or half ON) and the OFF state.

Furthermore, various modifications are possible for the high-frequency switching operation of the power transistors of the power supplying part, and these modifications are obviously included within the scope of the present invention. For example, each of the first power transistors and each of the second power transistors may be used as a pair and subjected to high-frequency ON-OFF switching operation alternatively or simultaneously.

Moreover, in the case when the first timing adjust part is operated on the basis of the time interval T0 which corresponds to one period of the position signal, the number of states of the first state output signal and the first adjust signal in the first timing adjust part is not restricted to six in one period of the position signal, but may be 12, for example. Generally, an accurate first timing signal can be produced by setting the number of the states to an integral multiple of the number of phases of the windings during one period of the position signal.

Besides, in the case when the first timing adjust part is operated on the basis of the time interval T0 which corresponds to a half period of the position signal, the number of states of the first state output signal and the first adjust signal in the first timing adjust part is not restricted to three in a half period of the position signal, but may be six, for example. Generally, an accurate first timing signal can be produced by setting the number of the states to an integral multiple of the number of phases of the windings during a half period of the position signal.

Still further, an accurate estimation value of the rotational electrical angle can be obtained from the first state signal and the second state signal responding with the single position signal. Accordingly, the motor can rotate accurately over a wide rotational speed range from a low speed to a high speed by obtaining the estimation value of the rotational electrical angle which responds with the first state signal and the second state signal and by outputting motor drive signals. This configuration is obviously included within the scope of the present invention. In particular, the first state signal can be obtained accurately even during the high-speed rotation of the motor. This reduces the pulsation of the drive signal and thus remarkably reduces the vibration and acoustic noise during high-speed rotation.

The motor in accordance with the present invention is suitable for disk drive apparatuses and widely applicable to office automation equipment, audio-visual equipment and the like. Furthermore, the motor can generally be used widely as a motor for speed control.

In addition, the configuration of the present invention can be modified variously without departing from the purpose of the present invention, and it is needless to say that such modifications can also be included in the scope of the present invention.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

What is claimed is:

1. A motor comprising:
a rotor having a field part which generates field fluxes;
Q-phase windings wherein Q is an integer of 3 or more;
voltage supplying means, including two output terminals, for supplying a DC voltage;
Q first power amplifying means, each of said Q first power amplifying means including a first power transistor for forming a current path between one output terminal side of said voltage supplying means and one of said Q-phase windings;
Q second power amplifying means, each of said Q second power amplifying means including a second power transistor for forming a current path between the other output terminal side of said voltage supplying means and one of said Q-phase windings;
position detecting means for producing a position signal which responds with a rotation of said rotor; and
activation operation means for controlling active operation of said Q first power amplifying means and said Q second power amplifying means responding with said position signal of said position detecting means;
and that
said activation operation means includes starting operation means which starts activation of said Q first power amplifying means and said Q second power amplifying means in response to a start signal, and
said starting operation means comprises:
initial phase setting means for setting an initial activation phase of drive signals to said Q-phase windings by said Q first power amplifying means and said Q second power amplifying means in response to the level of said position signal of the position detecting means at or around the timing of the occurrence of said start signal;
phase changing means for changing sequentially the activation phase of the drive signals to said Q-phase windings by said Q first power amplifying means and said Q second power amplifying means in the positive direction in response to time; and
phase correcting means for correcting the activation phase of the drive signals to said Q-phase windings in response to either or both of the rising and falling edges of said position signal.

2. A motor comprising:
a rotor having a field part which generates field fluxes;
Q-phase windings wherein Q is an integer of 3 or more;
voltage supplying means, including two output terminals, for supplying a DC voltage;
Q first power amplifying means, each of said Q first power amplifying means including a first power transistor for forming a current path between one output terminal side of said voltage supplying means and one of said Q-phase windings;
Q second power amplifying means, each of said Q second power amplifying means including a second power transistor for forming a current path between the other output terminal side of said voltage supplying means and one of said Q-phase windings;
position detecting means for producing a position signal which responds with a rotation of said rotor; and
activation operation means for controlling active operation of said Q first power amplifying means and said Q second power amplifying means responding with said position signal of said position detecting means;
and that
said activation operation means includes:
starting operation means for starting activation of said Q first power amplifying means and said Q second power amplifying means in response to a start signal; and
rotation control means for controlling activation of said Q first power amplifying means and said Q second power amplifying means in response to said position signal after the operation of said starting operation means,
said starting operation means comprises:
initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal; and mode select means for selecting said rotation control means in response to occurrences of said position signal, and said rotation control means comprises:

time measuring means for measuring a time interval T0 which responds with an interval of said position signal; and phase adjusting means for changing the activation phase of the drive signals to said Q-phase windings in time in response to the measured value of said measuring means.

3. The motor in accordance with claim 2, wherein said mode select means counts the occurrence of edges of said position signal, and selects said rotation control means after the count value reaches a predetermined value.

4. The motor in accordance with claim 2, wherein said phase adjusting means includes:

signal producing means for producing at least an activation control signal which responds with an output signal of said time measuring means, thereby controlling an active period of at least one power amplifying means among said Q first power amplifying means and said Q second power amplifying means responding with said at least an activation control signal;

and said signal producing means includes:

slope means for producing a slope signal whose cyclic interval responds with said time interval T0 of said time measuring means, said slope signal repeating a slope waveform substantially a plural times during one period of said position signal; and shaping means for producing said at least an activation control signal which varies substantially smoothly in at least one of rising and falling slopes responding with said slope signal.

5. The motor in accordance with claim 2, wherein said phase adjusting means includes:

first timing means for changing the state of a first state signal at an interval of a first adjust time T1 which responds with said time interval T0 and is less than T0/2;

second timing means for changing the state of a second state signal at an interval of a second adjust time T2 which responds with said time interval T0 and is less than T1/2; and signal producing means for producing at least an activation control signal which responds with said first state signal and said second state signal, thereby controlling an active period of at least one power amplifying means among said Q first power amplifying means and said Q second power amplifying means responding with said at least an activation control signal.

6. The motor in accordance with claim 5, wherein said first timing means sets said first timing signal substantially to a first predetermined state responding with the measuring operation of said time measuring means.

7. The motor in accordance with claim 5, wherein said second timing means sets said second timing signal substantially to a second predetermined state responding with a changing operation of said first state signal.

8. The motor in accordance with claim 5, wherein said time measuring means measures said time interval T0 which is substantially equal to one period of said position signal, said first timing means changes the state of said first state signal so that the number of the states of said first state signal in the one period of said position signal is substantially equal to MQ wherein M is a positive integer, and said signal producing means produces a slope signal which responds with said second state signal, and produces Q-phase activation control signals which respond with said first state signal and said slope signal.

9. The motor in accordance with claim 5, wherein said time measuring means measures said time interval T0 which is substantially equal to a half period of said position signal, said first timing means changes the state of said first state signal so that the number of the states of said first state signal in the half period of said position signal is substantially equal to NQ wherein N is a positive integer, and said signal producing means produces a slope signal which responds with said second state signal, and produces Q-phase activation control signals which respond with at least said first state signal and said slope signal.

10. The motor in accordance with claim 5, wherein said signal producing means produces a slope signal which responds with said second state signal, and produces Q-phase first activation control signals which respond with at least said first state signal and said slope signal so as to control the active operation of said Q first power amplifying means, each of said Q-phase first activation control signals varying substantially smoothly in at least one of rising and falling slopes responding with said slope signal.

11. The motor in accordance with claim 5, wherein said signal producing means produces a slope signal which responds with said second state signal, and produces Q-phase second activation control signals which respond with at least said first state signal and said slope signal so as to control the active operation of said Q first power amplifying means, each of said Q-phase second activation control signals varying substantially smoothly in at least one of rising and falling slopes responding with said slope signal.

12. The motor in accordance with claim 4, further comprising commanding means for producing a command signal which responds with a rotational speed of said rotor, and said activation control means being adapted to change said at least an activation control signal responding with said command signal.

13. The motor in accordance with claim 2, further comprising commanding means for producing a command signal which responds with a rotational speed of said rotor, and switching operation means for causing at least one power amplifying means among said Q first power amplifying means and said Q second power amplifying means to perform high-frequency switching responding with said command signal.

14. The motor in accordance with claim 13, wherein
said switching operation means produces a switching pulse signal which responds with said command signal and causes one or two of said Q first power amplifying means to perform high-frequency switching simultaneously responding with said switching pulse signal.

15. The motor in accordance with claim 13, wherein
said switching operation means comprises:
current detecting means for producing a current detection signal which responds with or corresponds to a composed current to said Q-phase windings from said voltage supplying means, and
switching control means for causing said at least one power amplifying means to perform high-frequency switching responding with said current detection signal and said command signal.

16. The motor in accordance with claim 13, wherein
said switching operation means controls the peak of the composed current to said Q-phase windings from said voltage supplying means responding with said command signal.

17. The motor in accordance with claim 2, wherein
said position detecting means includes a position sensor which detects a field flux of said field part of said rotor so as to produce said position signal.

18. A motor comprising: a rotor, plural-phase windings, a DC voltage source, a plurality of first power transistors and a plurality of second power transistors forming current paths from said DC voltage source to said plural-phase windings, position detecting means producing a position signal in response to a rotation of said rotor, and activation operation means controlling activation of said first power transistors and said second power transistors,
characterized in that
said activation operation means includes starting operation means which comprises:
initial phase setting means for setting an initial activation phase of drive signals to said plural-phase windings by said first power transistors and said second power transistors in response to the level of said position signal of the position detecting means at or around the timing of the occurrence of said start signal;
phase changing means for changing sequentially the activation phase of the drive signals to said plural-phase windings by said first power transistors and said second power transistors in the positive direction in response to time; and
phase correcting means for correcting the activation phase of the drive signals to said plural-phase windings in response to either or both of the rising and falling edges of said position signal.

19. A motor comprising: a rotor, plural-phase windings, a DC voltage source, a plurality of first power transistors and a plurality of second power transistors forming current paths from said DC voltage source to said plural-phase windings, position detecting means producing a position signal in response to a rotation of said rotor, and activation operation means controlling activation of said first power transistors and said second power transistors,
characterized in that
said activation operation means includes:
starting operation means for starting activation of said first power transistors and said second power transistors in response to a start signal; and
rotation control means for controlling activation of said first power transistors and said second power transistors in response to said position signal after the operation of said starting operation means,
said starting operation means comprises:
initial phase setting means for setting an initial activation phase of drive signals to said plural-phase windings by said first power transistors and said second power transistors in response to the level of said position signal of the position detecting means at or around the timing of the occurrence of said start signal;
phase changing means for changing sequentially the activation phase of the drive signals to said plural-phase windings by said first power transistors and said second power transistors in the positive direction in response to time; and
phase correcting means for correcting the activation phase of the drive signals to said plural-phase windings in response to either or both of the rising and falling edges of said position signal; and
mode select means for selecting said rotation control means in response to occurrences of said position signal, and
said rotation control means comprises:
time measuring means for measuring a time interval T0 which responds with an interval of said position signal; and
phase adjusting means for changing the activation phase of the drive signals to said plural-phase windings in time in response to the measured value of said measuring means.

20. The motor in accordance with claim 19, wherein
said mode select means counts the occurrence of edges of said position signal, and selects said rotation control means after the count value reaches a predetermined value.

21. A disk drive apparatus comprising:
head means for at least reproducing a signal from a disk or recording a signal on said disk;
processing means for at least processing an output signal from said head means and outputting a reproduced signal, or processing a signal and outputting a recording signal into said head means;
a rotor, having a field part which generates field fluxes, for driving said disk;
Q-phase windings wherein Q is an integer of 3 or more;
voltage supplying means, including two output terminals, for supplying a DC voltage;
Q first power amplifying means, each of said Q first power amplifying means including a first power transistor for forming a current path between one output terminal side of said voltage supplying means and one of said Q-phase windings;
Q second power amplifying means, each of said Q second power amplifying means including a second power transistor for forming a current path between the other output terminal side of said voltage supplying means and one of said Q-phase windings;
position detecting means for producing a position signal which responds with a rotation of said rotor; and
activation operation means for controlling active operation of said Q first power amplifying means and said Q second power amplifying means responding with said position signal of said position detecting means;
and that
said activation operation means includes starting operation means which starts activation of said Q first power amplifying means and said Q second power amplifying means in response to a start signal, and said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal.

22. A disk drive apparatus comprising:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving said disk;

Q-phase windings wherein Q is an integer of 3 or more;

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means includes:

starting operation means for starting activation of said Q first power amplifying means and said Q second power amplifying means in response to a start signal; and rotation control means for controlling activation of said Q first power amplifying means and said Q second power amplifying means in response to said position signal after the operation of said starting operation means, said starting operation means comprises:

initial phase setting means for setting an initial activation phase of drive signals to said Q-phase windings by said Q first power amplifying means and said Q second power amplifying means in response to the level of said position signal of the position detecting means at or around the timing of the occurrence of said start signal;

phase changing means for changing sequentially the activation phase of the drive signals to said Q-phase windings by said Q first power amplifying means and said Q second power amplifying means in the positive direction in response to time; and phase correcting means for correcting the activation phase of the drive signals to said Q-phase windings in response to either or both of the rising and falling edges of said position signal; and mode select means for selecting said rotation control means in response to occurrences of said position signal, and said rotation control means comprises:

time measuring means for measuring a time interval T0 which responds with an interval of said position signal; and phase adjusting means for changing the activation phase of the drive signals to said Q-phase windings in time in response to the measured value of said measuring means.

23. The disk drive apparatus in accordance with claim 22, wherein said mode select means counts the occurrence of edges of said position signal, and selects said rotation control means after the count value reaches a predetermined value.

24. The disk drive apparatus in accordance with claim 22, wherein said phase adjusting means includes:

signal producing means for producing at least an activation control signal which responds with an output signal of said time measuring means, thereby controlling an active period of at least one power amplifying means among said Q first power amplifying means and said Q second power amplifying means responding with said at least an activation control signal;

and said signal producing means includes:

slope means for producing a slope signal whose cyclic interval responds with said time interval T0 of said time measuring means, said slope signal repeating a slope waveform substantially a plural times during one period of said position signal; and shaping means for producing said at least an activation control signal which varies substantially smoothly in at least one of rising and falling slopes responding with said slope signal.

25. The disk drive apparatus in accordance with claim 22, wherein said phase adjusting means includes:

first timing means for changing the state of a first state signal at an interval of a first adjust time T1 which responds with said time interval T0 and is less than T0/2;

second timing means for changing the state of a second state signal at an interval of a second adjust time T2 which responds with said time interval T0 and is less than T1/2; and signal producing means for producing at least an activation control signal which responds with said first state signal and said second state signal, thereby controlling an active period of at least one power amplifying means among said Q first power amplifying means and said Q second power amplifying means responding with said at least an activation control signal.

26. The disk drive apparatus in accordance with claim 25, wherein said first timing means sets said first timing signal substantially to a first predetermined state responding with the measuring operation of said time measuring means.

27. The disk drive apparatus in accordance with claim 25, wherein
said second timing means sets said second timing signal substantially to a second predetermined state responding with a changing operation of said first state signal.

28. The disk drive apparatus in accordance with claim 25, wherein
said time measuring means measures said time interval T0 which is substantially equal to one period of said position signal,
said first timing means changes the state of said first state signal so that the number of the states of said first state signal in the one period of said position signal is substantially equal to MQ wherein M is a positive integer, and
said signal producing means produces a slope signal which responds with said second state signal, and produces Q-phase activation control signals which respond with said first state signal and said slope signal.

29. The disk drive apparatus in accordance with claim 25, wherein
said time measuring means measures said time interval T0 which is substantially equal to a half period of said position signal,
said first timing means changes the state of said first state signal so that the number of the states of said first state signal in the half period of said position signal is substantially equal to NQ wherein N is a positive integer, and
said signal producing means produces a slope signal which responds with said second state signal, and produces Q-phase activation control signals which respond with at least said first state signal and said slope signal.

30. The disk drive apparatus in accordance with claim 25, wherein
said signal producing means produces a slope signal which responds with said second state signal, and produces Q-phase first activation control signals which respond with at least said first state signal and said slope signal so as to control the active operation of said Q first power amplifying means, each of said Q-phase first activation control signals varying substantially smoothly in at least one of rising and falling slopes responding with said slope signal.

31. The disk drive apparatus in accordance with claim 25, wherein
said signal producing means produces a slope signal which responds with said second state signal, and produces Q-phase second activation control signals which respond with at least said first state signal and said slope signal so as to control the active operation of said Q first power amplifying means, each of said Q-phase second activation control signals varying substantially smoothly in at least one of rising and falling slopes responding with said slope signal.

32. The disk drive apparatus in accordance with claim 24, further comprising
commanding means for producing a command signal which responds with a rotational speed of said rotor, and
said activation control means being adapted to change said at least an activation control signal responding with said command signal.

33. The disk drive apparatus in accordance with claim 22, further comprising
commanding means for producing a command signal which responds with a rotational speed of said rotor, and
switching operation means for causing at least one power amplifying means among said Q first power amplifying means and said Q second power amplifying means to perform high-frequency switching responding with said command signal.

34. The disk drive apparatus in accordance with claim 33, wherein
said switching operation means produces a switching pulse signal which responds with said command signal and causes one or two of said Q first power amplifying means to perform high-frequency switching simultaneously responding with said switching pulse signal.

35. The disk drive apparatus in accordance with claim 33, wherein
said switching operation means comprises:
current detecting means for producing a current detection signal which responds with or corresponds to a composed current to said Q-phase windings from said voltage supplying means, and
switching control means for causing said at least one power amplifying means to perform high-frequency switching responding with said current detection signal and said command signal.

36. The disk drive apparatus in accordance with claim 33, wherein
said switching operation means controls the peak of the composed current to said Q-phase windings from said voltage supplying means responding with said command signal.

37. The disk drive apparatus in accordance with claim 22, wherein
said position detecting means includes a position sensor which detects a field flux of said field part of said rotor so as to produce said position signal.

38. A disk drive apparatus comprising: head means reproducing a signal from a disk, processing means processing an output signal from said head means and outputting a reproduced signal, a rotor driving said disk, plural-phase windings, a DC voltage source, a plurality of first power transistors and a plurality of second power transistors forming current paths from said DC voltage source to said plural-phase windings, position detecting means producing a position signal in response to a rotation of said rotor, and activation operation means controlling activation of said first power transistors and said second power transistors,
characterized in that
said activation operation means includes starting operation means which comprises:
initial phase setting means for setting an initial activation phase of drive signals to said plural-phase windings by said first power transistors and said second power transistors in response to the level of said position signal of the position detecting means at or around the timing of the occurrence of said start signal;
phase changing means for changing sequentially the activation phase of the drive signals to said plural-phase windings by said first power transistors and said second power transistors in the positive direction in response to time; and phase correcting means for correcting the activation phase of the drive signals to said plural-phase windings in response to either or both of the rising and falling edges of said position signal.

39. A disk drive apparatus comprising: head means reproducing a signal from a disk, processing means processing an output signal from said head means and outputting a reproduced signal, a rotor driving said disk, plural-phase windings, a DC voltage source, a plurality of first power transistors and a plurality of second power transistors forming current paths from said DC voltage source to said plural-phase windings, position detecting means producing a position signal in response to a rotation of said rotor, and activation operation means controlling activation of said first power transistors and said second power transistors, characterized in that said activation operation means includes:

starting operation means for starting activation of said first power transistors and said second power transistors in response to a start signal; and rotation control means for controlling activation of said first power transistors and said second power transistors in response to said position signal after the operation of said starting operation means, said starting operation means comprises:

initial phase setting means for setting an initial activation phase of drive signals to said plural-phase windings by said first power transistors and said second power transistors in response to the level of said position signal of the position detecting means at or around the timing of the occurrence of said start signal;

phase changing means for changing sequentially the activation phase of the drive signals to said plural-phase windings by said first power transistors and said second power transistors in the positive direction in response to time; and phase correcting means for correcting the activation phase of the drive signals to said plural-phase windings in response to either or both of the rising and falling edges of said position signal; and mode select means for selecting said rotation control means in response to occurrences of said position signal, and said rotation control means comprises:

time measuring means for measuring a time interval T0 which responds with an interval of said position signal; and phase adjusting means for changing the activation phase of the drive signals to said plural-phase windings in time in response to the measured value of said measuring means.

40. The disk drive apparatus in accordance with claim 39, wherein said mode select means counts the occurrence of edges of said position signal, and selects said rotation control means after the count value reaches a predetermined value.

* * * * *